US012715457B2

(12) United States Patent
Yang et al.

(10) Patent No.: US 12,715,457 B2
(45) Date of Patent: Aug. 25, 2026

(54) VEHICLE CONTROL SYSTEM TO CONTROL VEHICLE COMPONENT IN A DOMAIN VIA NETWORK

(71) Applicant: BYD COMPANY LIMITED, Shenzhen (CN)

(72) Inventors: Dongsheng Yang, Shenzhen (CN); Guoxiang Lu, Shenzhen (CN); Xuli Zhuang, Shenzhen (CN); Lizhong Tang, Shenzhen (CN); Boliang Xu, Shenzhen (CN); Zhaoyu Lei, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 112 days.

(21) Appl. No.: 18/782,830

(22) Filed: Jul. 24, 2024

(65) Prior Publication Data

US 2025/0083683 A1 Mar. 13, 2025

Related U.S. Application Data

(63) Continuation of application No. PCT/CN2024/073253, filed on Jan. 19, 2024.

(30) Foreign Application Priority Data

Sep. 11, 2023 (CN) ......................... 202311164098.X

(51) Int. Cl.
*B60W 50/035* (2012.01)
*B60W 10/08* (2006.01)
(Continued)

(52) U.S. Cl.
CPC .......... *B60W 50/035* (2013.01); *B60W 10/08* (2013.01); *B60W 10/20* (2013.01); *B60W 50/0205* (2013.01); *B60W 2720/14* (2013.01)

(58) Field of Classification Search
CPC .... B60W 50/035; B60W 10/08; B60W 10/20; B60W 50/0205; B60W 2720/14;
(Continued)

(56) References Cited

U.S. PATENT DOCUMENTS

2018/0229610 A1 8/2018 Lian et al.
2023/0192139 A1 6/2023 Apeksha et al.

FOREIGN PATENT DOCUMENTS

CN 107040483 A 8/2017
CN 108566439 A 9/2018
(Continued)

OTHER PUBLICATIONS

D. Wang and S. Ganesan, "Automotive Domain Controller," 2020 International Conference on Computing and Information Technology (ICCIT-1441), Tabuk, Saudi Arabia, 2020, pp. 1-5, doi: 10.1109/ICCIT-144147971.2020.9213824.*

*Primary Examiner* — Brian P Sweeney
(74) *Attorney, Agent, or Firm* — Wenye Tan

(57) ABSTRACT

A vehicle control system includes: a central controller and a plurality of vehicle components belonging to a plurality of different functional domains. At least one vehicle component in a first functional domain of the plurality of different functional domains and another vehicle component in the first functional domain are connected to each other through a first network, and are directly connected to the central controller. At least one vehicle component in a second functional domain of the plurality of different functional domains and another vehicle component in the second functional domain are connected to each other through a second network, and are directly connected to the central controller. At least one vehicle component in the first functional domain is connected to at least one vehicle component in the second functional domain through a third network.
(Continued)

The central controller can send control information to at least one vehicle component.

21 Claims, 11 Drawing Sheets

(51) Int. Cl.
*B60W 10/20* (2006.01)
*B60W 50/02* (2012.01)

(58) Field of Classification Search
CPC .......... B60W 30/045; B60W 2540/18; B60W 2710/083; B60W 2720/28; B60W 30/02; B60W 50/00; B60W 50/02; B60W 50/029; B60W 2050/0006; B60W 2050/0292; B60W 50/023; B60W 50/06; B60W 10/18; B60W 30/18172; B60W 40/02; B60W 50/0098; B60W 50/0225; B60W 2050/0022; B60W 2050/0026; B60W 2420/403; B60W 2420/408; B60W 2520/10; B60W 2520/14; B60W 2556/35; B60R 16/0231; B60L 15/20
See application file for complete search history.

(56) References Cited

FOREIGN PATENT DOCUMENTS

| | | | | |
|---|---|---|---|---|
| CN | 112477781 | A | | 3/2021 |
| CN | 113895448 | A | | 1/2022 |
| CN | 109474912 | B | | 2/2022 |
| CN | 218570302 | U | | 3/2023 |
| CN | 116620192 | A | * | 8/2023 |
| CN | 116890770 | A | | 10/2023 |
| CN | 117533292 | A | | 2/2024 |
| JP | 2010215008 | A | * | 9/2010 |
| JP | 2023108756 | A | | 8/2023 |

* cited by examiner

VEHICLE CONTROL SYSTEM TO CONTROL VEHICLE COMPONENT IN A DOMAIN VIA NETWORK

CROSS-REFERENCE TO RELATED APPLICATIONS

The present application is a continuation application of PCT application No. PCT/CN2024/073253, filed on Jan. 19, 2024, which claims priority to Chinese Patent Application No. 202311164098.X, entitled "VEHICLE CONTROL SYSTEM AND METHOD, AND VEHICLE" and filed on Sep. 11, 2023, content of all of which is incorporated herein by reference in its entirety.

FIELD

The present disclosure relates to the field of vehicle technologies, and in particular, to a vehicle control system and method, and a vehicle.

BACKGROUND

In the related art, there are two types of automotive electronic control systems. In one type of automotive electronic control system, an automobile component is communicatively connected to a central computing platform (CCP) through a domain controller. Because data of the automobile component passes through the domain controller, there is a communication delay between the automobile component and the CCP. In the other type of automotive electronic control system, an automobile component is no longer communicatively connected to the CCP through the domain controller, but may be directly communicatively connected to the CCP. In this way, the vehicle cannot safely travel once the CCP fails.

SUMMARY

The present disclosure aims to solve one of the technical problems in the related art at least to some extent. To this end, a first objective of the present disclosure is to provide a vehicle control system.

A second objective of the present disclosure is to provide a vehicle.

A third objective of the present disclosure is to provide a vehicle control method.

To achieve the foregoing objectives, an embodiment of a first aspect of the present disclosure provides a vehicle control system, including: a central controller and a plurality of vehicle components. The plurality of vehicle components belong to a plurality of different functional domains. At least one vehicle component in a first functional domain of the plurality of different functional domains and another vehicle component in the first functional domain are connected to each other through a first network, and are directly connected to the central controller. At least one vehicle component in a second functional domain of the plurality of different functional domains and another vehicle component in the second functional domain are connected to each other through a second network, and are directly connected to the central controller. At least one vehicle component in the first functional domain is connected to at least one vehicle component in the second functional domain through a third network. The central controller is configured to send control information to at least one vehicle component.

According to the vehicle control system of this embodiment of the present disclosure, by directly communicatively connecting vehicle components in a domain to the central controller, uniform and coordinated control of domains is implemented, and a communication delay can be reduced. By interconnecting at least two vehicle components in a domain, information interchange between the interconnected components in the same functional domain is implemented, and when the central controller fails, at least some functions of the corresponding functional domain are maintained, thereby improving traveling safety of the vehicle. By interconnecting vehicle components in different functional domains, when the central controller fails, the interconnected vehicle components may implement some functions of the central controller, to ensure basic traveling safety of the vehicle. In addition, vehicle components in a domain are first interconnected and then directly connected to the central controller, which can reduce a wiring harness length and reduce costs of a vehicle control system.

To achieve the foregoing objectives, an embodiment of a second aspect of the present disclosure provides a vehicle, including the foregoing vehicle control system.

According to the vehicle of this embodiment of the present disclosure, through the foregoing vehicle control system, by directly communicatively connecting vehicle components in a domain to the central controller, uniform and coordinated control of domains is implemented, and a communication delay can be reduced. By interconnecting at least two vehicle components in a domain, information interchange between the interconnected components in the same functional domain is implemented, and when the central controller fails, at least some functions of the corresponding functional domain are maintained, thereby improving traveling safety of the vehicle. By interconnecting vehicle components in different functional domains, when the central controller fails, the interconnected vehicle components may implement some functions of the central controller, to ensure basic traveling safety of the vehicle. In addition, vehicle components in a domain are first interconnected and then directly connected to the central controller, which can reduce a wiring harness length and reduce costs of a vehicle control system.

To achieve the foregoing objectives, an embodiment of a third aspect of the present disclosure provides a vehicle control method, applied to the foregoing vehicle control system, the method including: identifying, by the central controller, a vehicle driving scenario; and sending, by the central controller, control information to at least one vehicle component according to the vehicle driving scenario.

According to the vehicle control method of this embodiment of the present disclosure, based on the foregoing vehicle control system, by directly communicatively connecting vehicle components in a domain to the central controller, uniform and coordinated control of domains is implemented, and a communication delay can be reduced. By interconnecting at least two vehicle components in a domain, information interchange between the interconnected components in the same functional domain is implemented, and when the central controller fails, at least some functions of the corresponding functional domain are maintained, thereby improving traveling safety of the vehicle. By interconnecting vehicle components in different functional domains, when the central controller fails, the interconnected vehicle components may implement some functions of the central controller, to ensure basic traveling safety of the vehicle. In addition, vehicle components in a domain are first interconnected and then directly connected to the central controller, which can reduce a wiring harness length and reduce costs of a vehicle control system.

Other aspects and advantages of the present disclosure will be given in the following description, some of which will become apparent from the following description or may be learned from practices of the present disclosure.

DETAILED DESCRIPTION

Reference will be made in detail to embodiments of the present disclosure. The embodiments described herein with reference to drawings are explanatory, illustrative, and should be used to generally understand the present disclosure, rather than limiting the present disclosure.

The following describes, with reference to the accompanying drawings, a vehicle control system and method, and a vehicle provided in the embodiments of the present disclosure.

Figure 1:
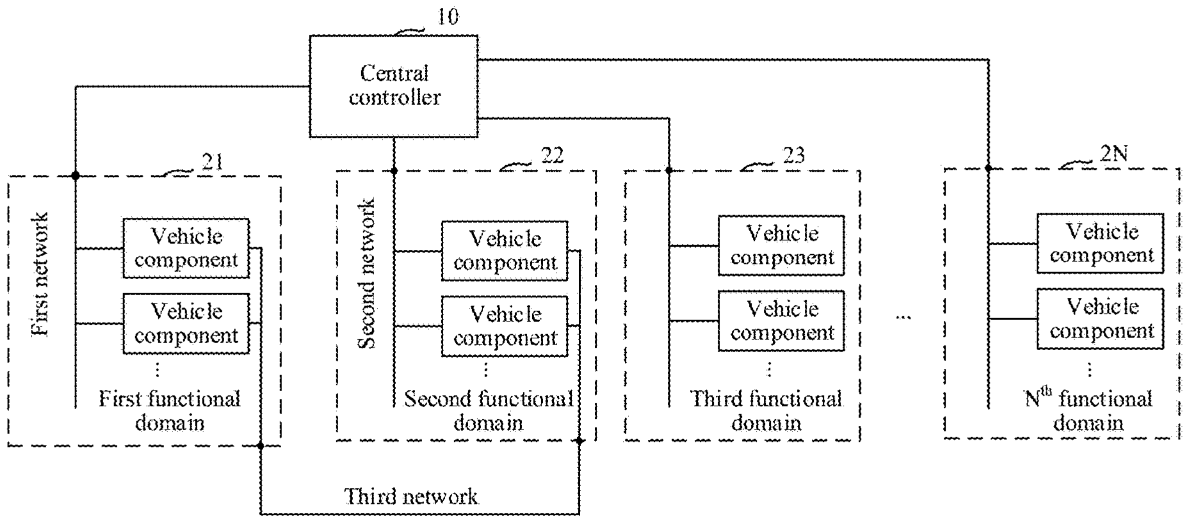
FIG. 1 is a schematic structural diagram of a vehicle control system according to an embodiment of the present disclosure.

FIG. 1 is a schematic structural diagram of a vehicle control system according to an embodiment of the present disclosure. Referring to FIG. 1, the vehicle control system may include: a central controller 10 and a plurality of vehicle components.

The plurality of vehicle components belong to a plurality of different functional domains. At least one vehicle component in a first functional domain 21 of the plurality of different functional domains and another vehicle component in the first functional domain 21 are connected to each other through a first network, and are directly connected to the central controller 10. At least one vehicle component in a second functional domain 22 of the plurality of different functional domains and another vehicle component in the second functional domain 22 are connected to each other through a second network, and are directly connected to the central controller 10. At least one vehicle component in the first functional domain 21 is connected to at least one vehicle component in the second functional domain 22 through a third network. The central controller 10 is configured to send control information to at least one vehicle component.

According to the vehicle control system of this embodiment of the present disclosure, by directly communicatively connecting vehicle components in a domain to the central controller, uniform and coordinated control of domains is implemented, a communication delay can be reduced, a communication load of a functional domain can be reduced, and communication efficiency can be improved, so that the central controller can learn various state information of the vehicle more quickly and comprehensively, and provide strong data support for vehicle control. By interconnecting at least two vehicle components in a domain, information interchange between the interconnected components in the same functional domain is implemented, and when the central controller fails, the interconnected vehicle components may implement some functions of the central controller, to ensure basic traveling safety of the vehicle. Vehicle components in a domain are first interconnected and then directly connected to the central controller, which can reduce a wiring harness length and reduce costs of a vehicle control system. Through mutual communication between different domains, direct control between the different domains may be implemented, thereby further improving safety performance of the vehicle. Information in domains is shared, and controllers between at least two different domains are directly interconnected, so that functions of the vehicle are complete, and the vehicle can be ensured to safely and controllably travel or stop when the central controller fails.

Specifically, the vehicle component may specifically include an electronic control unit (ECU) and an execution element, for example, a sensor or an actuator on the vehicle. The ECU is located inside the vehicle component and is configured to provide an electronic control function for the vehicle component, such as a motor controller in a drive assembly, a braking controller in a braking system, a steering controller in a steering system, and a suspension controller in a suspension system. The plurality of vehicle components are divided into a plurality of different functional domains, and each functional domain is a virtual domain. For example, referring to FIG. 1, the plurality of different functional domains include a first functional domain 21, a second functional domain 22, a third functional domain 23, . . . , and an $N^{th}$ functional domain 2N, where N is an integer greater than 1.

In the plurality of different functional domains, intra-domain vehicle components of at least two functional domains are interconnected. For example, at least two vehicle components in the first functional domain 21 are interconnected by the first network, and at least two vehicle components in the second functional domain 22 are interconnected by the second network. The first network and the second network may be the same or different. For example, each of the first network and the second network is a local area network such as a controller area network (CAN). For another example, the first network is a local area network such as a CAN, and the second network is an Ethernet. This is not specifically limited herein. Because vehicle components in the same functional domain can be interconnected through an intra-domain communication network, information interchange between the interconnected components in the same functional domain can be implemented. When the central controller 10 fails, at least some functions of the central controller 10 can be maintained, thereby improving traveling safety of the vehicle.

The intra-domain vehicle components in the at least two functional domains are interconnected and then are directly communicatively connected to the central controller 10. For example, vehicle components in the first functional domain 21 are directly connected to the central controller 10 through the first network, and vehicle components in the second functional domain 22 are directly connected to the central controller 10 through the second network, to eliminate a domain controller, reduce a communication delay in perceiving sensing information and execution instructions, and improve real-time performance of signals. By directly communicatively connecting vehicle components in a domain to the central controller 10, uniform and coordinated control of domains is implemented, a communication delay can be reduced, a communication load of a functional domain can be reduced, and communication efficiency can be improved, so that the central controller can learn various state information of the vehicle more quickly and comprehensively, and provide strong data support for vehicle control. The central controller 10 coordinates information of domains, overcomes the problem existing in the related art that domain controllers are lack of coordination and collaboration, implements centralized data processing, centralized decision-making, and collaborative execution, provides a strong guarantee for stable and flexible operations of the vehicle, and routes only an extremely small amount of necessary information among the domains, thereby reducing repeated communication of the same information among the domains, reducing an amount of data exchange, reducing a communication load, and improving communication accuracy. Vehicle components in a domain are first interconnected and then directly connected to the central controller 10, which can reduce a wiring harness length and reduce costs of a vehicle control system.

The vehicle components of the at least two functional domains are further interconnected between domains. For example, the first functional domain 21 and the second functional domain 22 are independently communicatively connected to each other. Vehicle components in the first functional domain 21 are connected to vehicle components in the second functional domain 22 through the third network. In this way, through mutual communication between different domains, direct control between the different domains can be implemented, and safety performance of the vehicle can be further improved. Information in domains is shared, and controllers between at least two different domains are directly interconnected, so that functions of the vehicle are complete, and the vehicle can be ensured to safely and controllably travel or stop when the central controller fails.

Figure 2:
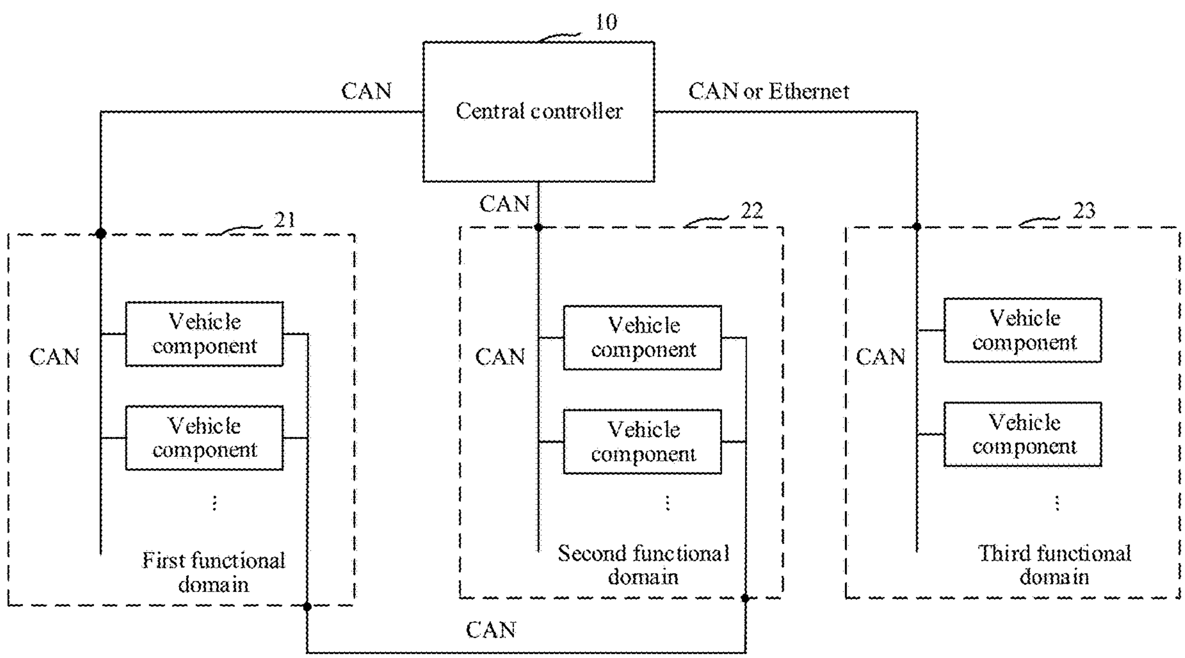
FIG. 2 is a schematic structural diagram of a vehicle control system according to an embodiment of the present disclosure.

As an example, referring to FIG. 2, a plurality of different functional domains include a first functional domain 21, a second functional domain 22, and a third functional domain 23. The first functional domain 21 is a power domain, the second functional domain 22 is a chassis domain, and the third functional domain 23 is an intelligent driving domain. The power domain is mainly configured to optimize power performance of a vehicle and ensure power safety of the vehicle, and functions in the power domain include but are not limited to battery management, power allocation management, velocity limit management, engine management, energy saving management, and the like. The chassis domain is mainly configured to control a traveling behavior and a traveling attitude of the vehicle, and functions in the chassis domain include but are not limited to braking system management, steering system management, suspension system management, airbag system management, and the like. The intelligent driving domain is mainly configured to implement and control an autonomous driving function of the vehicle, and needs to have a receiving capability, a processing capability, a determining capability for image information, a navigation and path planning capability, and a fast determining and decision-making capability for a real-time situation.

Vehicle components in the power domain are directly communicatively connected to a central controller 10 through a CAN, vehicle components in the chassis domain are directly communicatively connected to the central controller 10 through a CAN, and vehicle components in the intelligent driving domain are directly communicatively connected to the central controller 10 through a CAN or an Ethernet. The central controller 10 obtains information of the domains, and performs uniform and coordinated control of the domains.

The vehicle component in the power domain is further communicatively connected to the vehicle component in the chassis domain through a CAN, so that the power domain is controlled through the chassis domain to implement driving, braking, and steering control of the vehicle, or the chassis domain is controlled through the power domain to implement braking control and steering control of the vehicle. For example, a braking controller and a steering controller in the chassis domain may communicate with a motor controller in the power domain. In a non-intelligent driving mode, when the central controller 10 fails, the braking controller or the steering controller sends a corresponding instruction to the motor controller based on a control demand, and the motor controller controls the drive motor to perform a corresponding action, to implement driving, braking, and steering control of the vehicle. Alternatively, the motor controller sends a corresponding instruction to the braking controller and the steering controller based on a control demand, the braking controller performs braking, and the steering controller performs steering, to implement braking control and steering control of the vehicle. In this way, in collaboration with the chassis domain and the power domain, redundant traveling, stop, and steering of the vehicle in the non-intelligent driving mode may be implemented, thereby improving safety performance of the vehicle.

A vehicle component in the power domain is communicatively connected to a vehicle component in the intelligent driving domain through the CAN or the Ethernet, to control the power domain through the intelligent driving domain to implement driving, braking, and steering control of the vehicle. For example, in the intelligent driving mode, when the central controller 10 fails, an intelligent driving controller may send a corresponding instruction to the motor controller based on a control demand, and the motor controller controls the drive motor to perform a corresponding action, to implement driving, braking, and steering control of the vehicle. In this way, in collaboration with the intelligent driving domain and the power domain, redundant traveling, stop, and steering of the vehicle in the intelligent driving mode can be implemented, thereby improving safety performance of the vehicle.

A vehicle component in the chassis domain is communicatively connected to a vehicle component in the intelligent driving domain through the CAN or the Ethernet, to control the chassis domain through the intelligent driving domain to implement braking control and steering control of the vehicle. For example, the intelligent driving controller in the intelligent driving domain may communicate with the braking controller and the steering controller in the chassis domain. In the intelligent driving mode, when the central controller 10 fails, the intelligent driving controller may send a corresponding instruction to the braking controller and the steering controller based on a control demand, braking is performed by the braking controller, and steering is performed by the steering controller, to implement braking control and steering control of the vehicle. In this way, in collaboration with the intelligent driving domain and the chassis domain, redundant stop and steering of the vehicle in the intelligent driving mode can be implemented, thereby improving safety performance of the vehicle.

Figure 3:
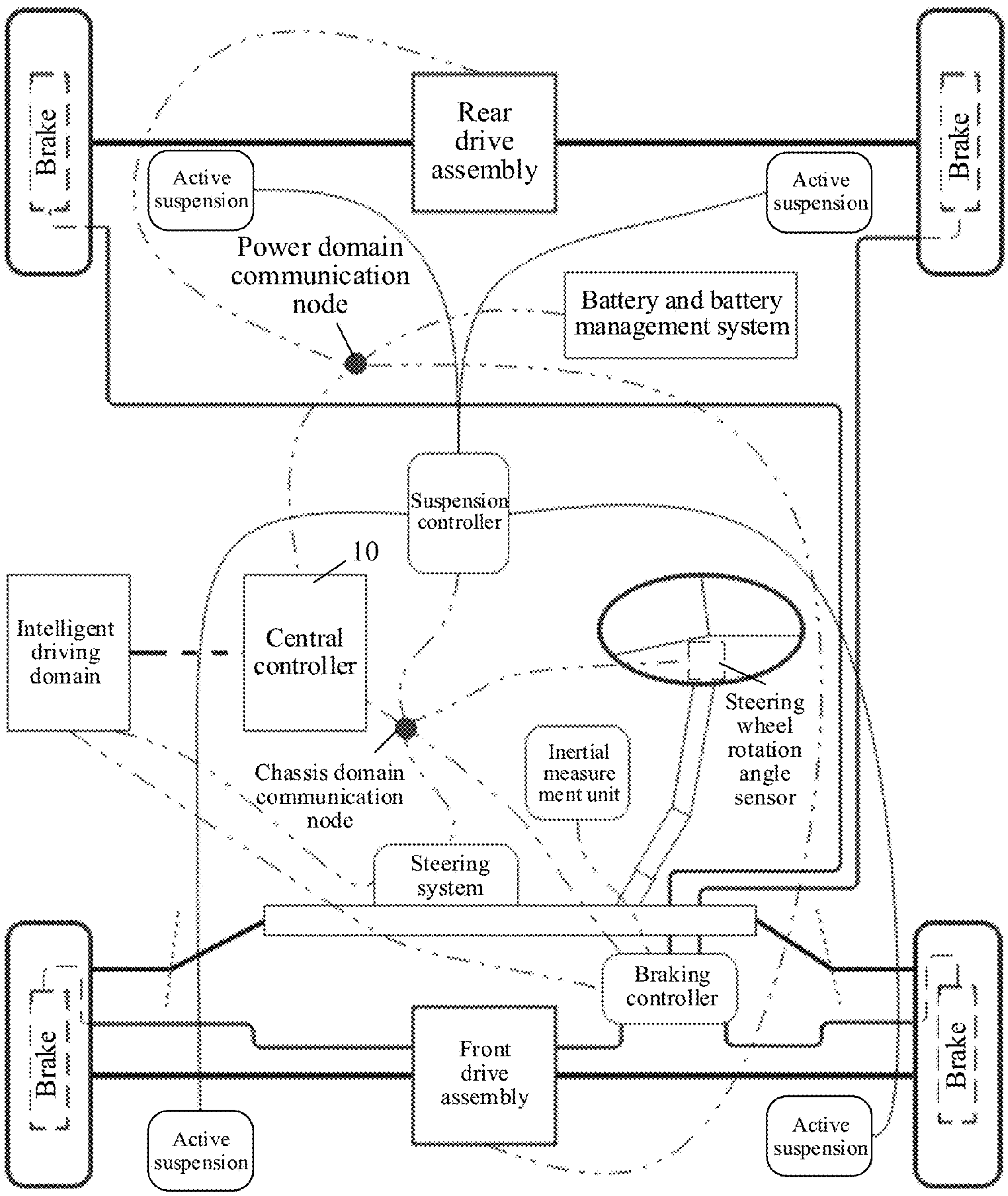
FIG. 3 is a schematic structural diagram of a vehicle control system according to still another embodiment of the present disclosure.

As a specific example, referring to FIG. 3, a vehicle includes a plurality of vehicle components such as a drive assembly, a braking system, a steering system, an inertial measurement unit, a steering wheel rotation angle sensor, a battery, a battery management system, and a wheel velocity sensor. It should be noted that the figure is merely an exemplary description, and some vehicle components are not specifically shown in the figure, but this is not intended to limit the present disclosure. The plurality of vehicle components on the vehicle are divided to obtain a plurality of different functional domains, such as a power domain, a chassis domain, and an intelligent driving domain.

Figure 4:
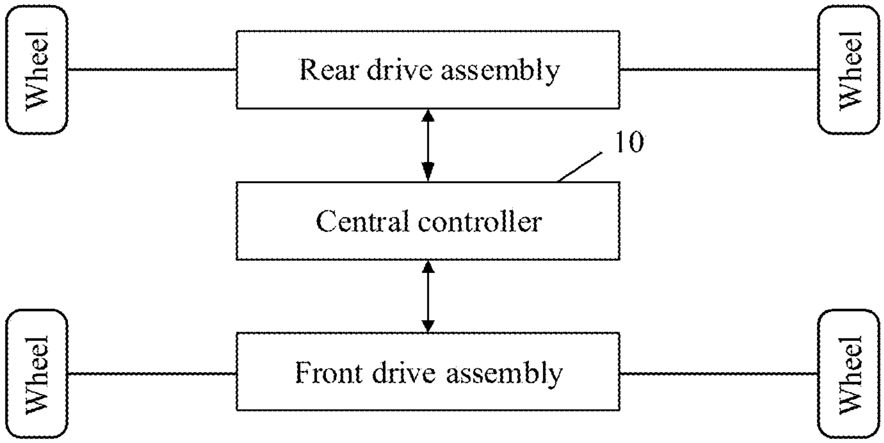
FIG. 4 is a schematic structural diagram of a plurality of drive assemblies according to an embodiment of the present disclosure.

The power domain mainly includes the drive assembly, the battery, the battery management system, and the like, and may be connected to a central controller 10 through a power domain communication node. Optionally, the power domain may further include an engine, a charging system, and the like, which are specifically determined according to a vehicle model. The drive assembly adopts a four-motor power architecture, so that a fast and high-precision torque can be independently provided to each wheel, thereby increasing degrees of freedom and capabilities of vehicle control, and improving control safety of the vehicle. With reference to FIG. 3 and FIG. 4, the drive assembly may include a front drive assembly and a rear drive assembly with the same structure.

Figure 5A:
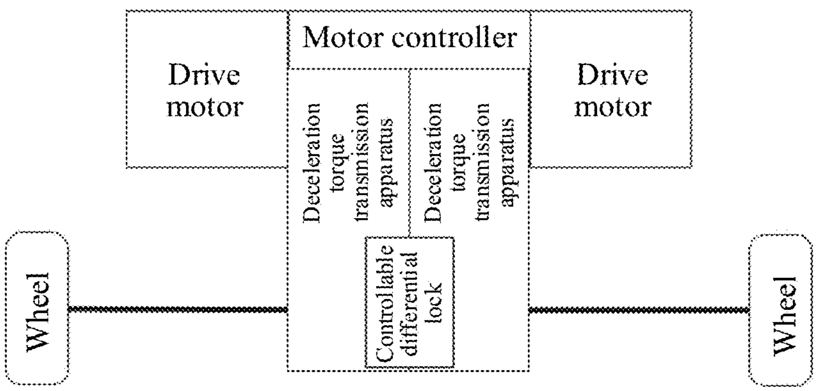
FIG. 5A is a schematic structural diagram of a drive assembly according to an embodiment of the present disclosure.

For example, referring to FIG. 5A, the front drive assembly and the rear drive assembly each include two drive motors, two deceleration torque transmission apparatuses (such as velocity reducers), one controllable differential lock, and one motor controller. The two drive motors are located at two ends of the corresponding drive assembly. Each drive motor transfers power to a corresponding wheel through a connected deceleration torque transmission apparatus. The controllable differential lock is located in the middle of the two deceleration torque transmission apparatuses.

Further, the front drive assembly is used as an example. The front drive assembly mainly includes a left front drive motor, a left front deceleration torque transmission apparatus, a right front drive motor, a right front deceleration torque transmission apparatus, a front controllable differential lock, a front motor controller, and the like. The left front drive motor and the right front drive motor are located at two ends of the front drive assembly. The left front drive motor and the right front drive motor transfer power to corresponding wheels through the left front deceleration torque transmission apparatus and the right front deceleration torque transmission apparatus respectively. This architectural arrangement can effectively reduce transmission vibration and provide system reliability and durability. The front controllable differential lock is located in the middle of the left front deceleration torque transmission apparatus and the right front deceleration torque transmission apparatus. The left front drive motor may rotate forward or reversely, and may provide a forward torque or a reverse torque to a left front wheel. The left front deceleration torque transmission apparatus can transfer a rotation velocity and a torque from the left front drive motor to the left front wheel, and implement deceleration and torque increase from the left front drive motor to the left front wheel during the transfer. The right front drive motor may rotate forward or reversely, and may provide a forward torque or a reverse torque to a right front wheel. The right front deceleration torque transmission apparatus can transfer a rotation velocity and a torque from the right front drive motor to the right front wheel, and implement deceleration and torque increase from the right front drive motor to the right front wheel during the transfer. The front controllable differential lock may synchronize or not synchronize the left front deceleration torque transmission apparatus with the right front deceleration torque transmission apparatus. When the front controllable differential lock is locked, the left front deceleration torque transmission apparatus is synchronized with the right front deceleration torque transmission apparatus, so that the wheel velocities of the left front and right front wheels are synchronized and the torques of the left front drive motor and the right front drive motor are shared. The front motor controller is responsible for driving the left front drive motor and the right front drive motor, and may respond to a rotation velocity or torque control request from an external controller. The front motor controller is further responsible for driving control of the front controllable differential lock, and may respond to a locking or unlocking request instruction of the external controller. When the front controllable differential lock is unlocked, the left front drive motor and the right front drive motor may operate independently. The left front drive motor is provided with a resolver, so that rotation velocity information of the left front drive motor can be perceived, and high-accuracy left front wheel velocity information can be calculated based on the physical parameter information of the left front deceleration torque transmission apparatus and the rotation velocity information of the left front drive motor. The right front drive motor is provided with a resolver, so that rotation velocity information of the right front drive motor can be perceived, and high-accuracy right front wheel velocity information can be calculated based on the physical parameter information of the right front deceleration torque transmission apparatus and the rotation velocity information of the right front drive motor. When one of the left front drive motor or the right front drive motor fails, normal driving of a front axle of the vehicle may be implemented through the locking control of the front controllable differential lock.

Figure 5B:
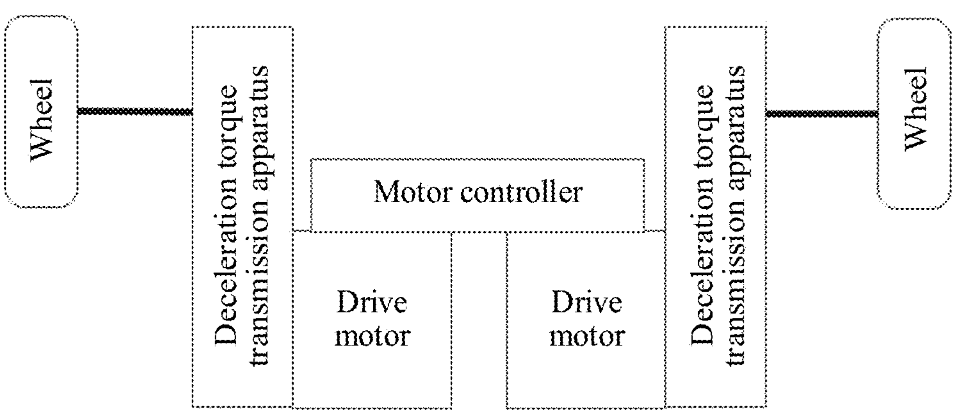
FIG. 5B is a schematic structural diagram of a drive assembly according to another embodiment of the present disclosure.

It should be noted that the front drive assembly and the rear drive assembly may alternatively adopt the architecture shown in FIG. 5B. The architecture integrates two drive motors in the middle, and two deceleration torque transmission apparatuses are respectively located on two sides of the drive motors. The whole form is integrally designed, thereby improving the applicability of a multi-platform and multi-polarization vehicle, and also improving the power density of the assembly. Details are not described herein again.

The battery is responsible for supplying power to each drive motor and collecting regenerative electric energy generated by each drive motor during regenerative braking. In addition, the battery can only supply power to the same drive motor or collect regenerative braking electric energy at the same moment. The battery supplies power to each drive motor or collects regenerative braking electric energy at the same moment independent of each other. The battery management system is responsible for managing performance, a charge-discharge function rate, and the like of the battery, and may adjust charging and discharging performance of the battery in response to a request from the external controller.

The chassis domain is related to traveling of the vehicle, implements steering, braking, and suspension control of the vehicle, mainly includes a braking system, a steering system, a suspension system, a steering wheel rotation angle sensor, an inertial measurement unit, and the like, and may be connected to the central controller 10 through a chassis domain communication node.

The braking system mainly includes a braking pedal, a braking controller, a braking line, a brake, a wheel velocity sensor, and the like. The braking pedal is mechanically connected to a braking controller push rod, and the braking pedal can urge the braking controller push rod to move, to represent a braking demand of a driver. The braking line is responsible for transferring a braking fluid from the braking controller to each brake. The brake is a braking force implementing apparatus, and generates a hydraulic braking force for each wheel under the action of the braking fluid. The braking controller includes a pressure detection apparatus, a hydraulic pressure adjustment apparatus, a push rod travel detection apparatus, a braking controller, and the like, and may implement driver braking demand recognition, active pressure building, and independent control of each brake pressure. The wheel velocity sensor may be a dual-chip wheel velocity sensor, and may provide two independent ways of wheel velocity information. One way of wheel velocity information is directly connected to the braking controller, and the other way of wheel velocity information is connected to the central controller 10. Wheel velocity sensors are arranged at wheels, and connected to the wheels in the same manner. The inertial measurement unit is directly connected to the braking controller of the braking system. The braking controller may transmit processed six-degrees-of-freedom inertia information, wheel velocity information, pressure information, and the like to the central controller 10, which can independently implement braking control and stability control of the vehicle, and can independently adjust each brake pressure in response to a demand of the external controller.

The steering system mainly includes a steering wheel, a steering column, a steering gear, a motor power-assisted apparatus, a steering controller, a steering linkage, and the like, and may be a conventional front-axle power-assisted steering system or a front-axle steering-by-wire system. The steering system may implement steering control in response to a steering demand inputted by the driver through the steering wheel, may respond to a rotation angle control request from the external controller, may provide actual steering shaft rotation angle information, and may send the actual steering shaft rotation angle information to the central controller 10 in the form of equivalent steering wheel rotation angle information.

The suspension system is an active suspension control system, including a suspension and a suspension controller. The suspension system is provided with a height sensor, which can independently perceive suspension height information of a corresponding wheel and is directly connected to the suspension controller, so that suspension height adjustment and damping adjustment can be implemented. The suspension controller is responsible for driving the suspension, and may respond to a height adjustment request and a damping adjustment request from the external controller for each suspension.

The steering wheel rotation angle sensor is configured to obtain steering wheel rotation angle information, and the steering wheel rotation angle sensor is directly connected to the central controller 10.

Figure 6:
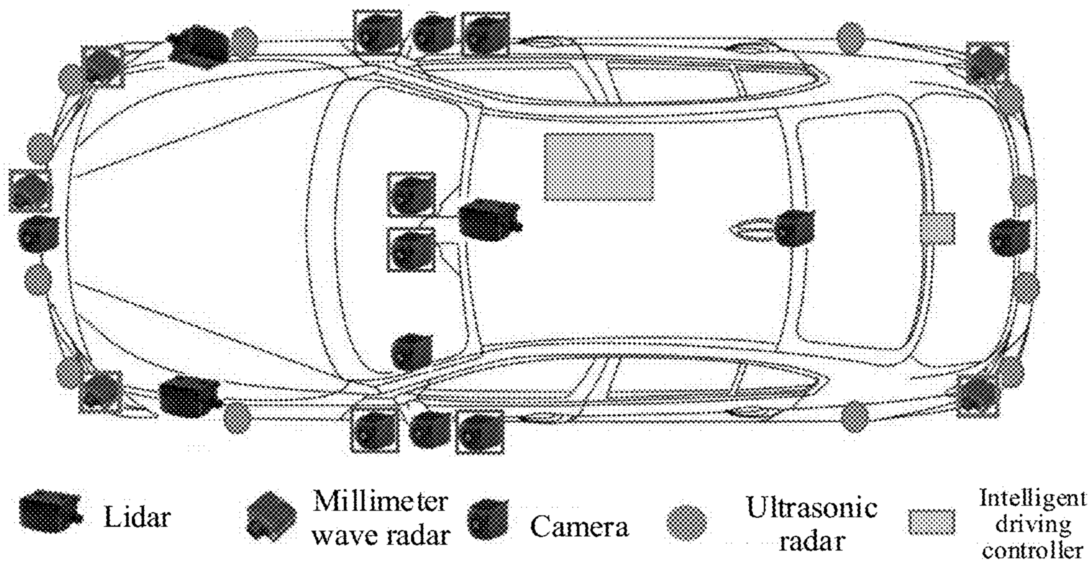
FIG. 6 is a schematic diagram of mounting of vehicle components in an intelligent driving domain according to an embodiment of the present disclosure.

Referring to FIG. 6, an intelligent driving domain mainly includes perceiving elements such as radars, cameras, and high-accuracy positioning apparatuses, an intelligent driving controller, and the like. It should be noted that the figure is merely an exemplary description, and some vehicle components are not specifically shown in the figure, but this is not intended to limit the present disclosure. The radars may include a lidar, a front long-range millimeter wave radar, a medium-range millimeter wave radar, an ultrasonic radar, and the like, and can detect moving and stationary objects at long, medium, and short ranges around a vehicle, and draw a real-time surroundings space. The cameras mainly include a front-view camera, a rear-view camera, a test camera, a surround-view camera, and the like, and can recognize moving and stationary objects at long and short ranges around the vehicle. The high-accuracy positioning apparatuses may provide information such as a real-time position and a vehicle velocity of the vehicle. At least two intelligent driving controllers may be included, to achieve safety of intelligent driving information perceiving and backup decision-making.

Figure 7:
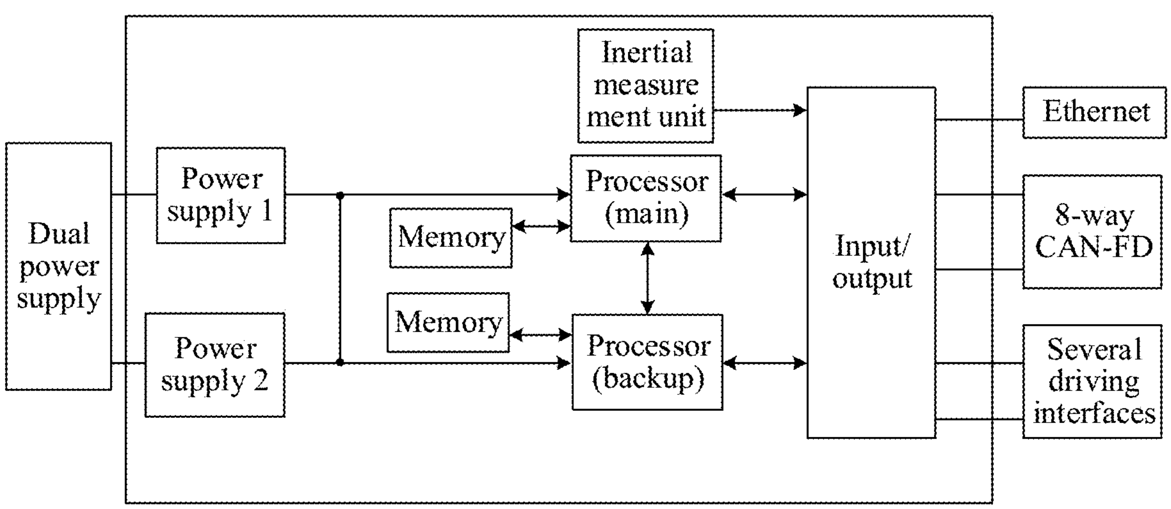
FIG. 7 is a schematic structural diagram of a central controller according to an embodiment of the present disclosure.

Referring to FIG. 7, a central controller 10 mainly includes a power supply apparatus, a data storage apparatus, a processor, an input/output processing apparatus, an inertial measurement unit, and the like. The power supply apparatus has two independent power connections: a power supply 1 and a power supply 2, so that power supply safety of the central controller 10 can be maximized. The processor is a redundant processor including a main processor and a backup processor. Normal data processing is mutual verification. When one of the processors fails, the remaining normal processor can still work. The main processor and the backup processor are each provided with an independent data storage apparatus. The input/output processing apparatus includes an Ethernet interface, an 8-way Controller Area Network Flexible Data Rate (CAN-FD) communication interface, and several driving interfaces, and may be connected to an intelligent driving domain, a chassis domain, a power domain, a sensor, an actuator, and the like according to requirements, to implement information exchange processing and control. The inertial measurement unit is connected to a drive interface of the input/output processing apparatus, and can provide the central controller 10 with six-degrees-of-freedom inertial information of the center of mass of the vehicle. Both the processor and the power supply safety level of the central controller 10 can reach an Automotive Safety Integration Level (ASIL) D.

Vehicle components in each in the power domain, the chassis domain, and the intelligent driving domain are directly communicatively connected to the central controller 10. Communication between the vehicle components in the power domain and the central controller 10 and communication between the vehicle components in the chassis domain and the central controller 10 are local area network communication, such as CAN-FD. Communication between the vehicle components in the intelligent driving domain and the central controller 10 may be local area network communication or Ethernet communication, and may be specifically determined based on a volume of transmitted data. The central controller 10 serves as a core of the system, and may implement data fusion for a plurality of functional domains, such as perceptual fusion, decision-making fusion, and control fusion, generate control information, and send the control information to the functional domains, to implement coordinated control of vehicle components of the plurality of functional domains.

Specifically, during perceptual fusion, an intelligent driving controller in the intelligent driving domain performs preliminary processing on perceiving information of perceiving elements such as radars, cameras, and high-accuracy positioning apparatuses, a motor controller in the power domain performs preliminary processing on an actual driving torque, resolving information, and the like of each wheel, a braking controller in the chassis domain performs preliminary processing on an actual braking torque of each wheel, a wheel velocity, six-degrees-of-freedom inertia information of the vehicle, and the like, and a steering controller in the chassis domain performs preliminary processing on a wheel rotation angle, and the like of each wheel. Each functional domain transmits the preliminarily processed data to the central controller 10. The central controller 10 performs centralized fusion based on the data transmitted by each functional domain and the data of the directly connected inertial measurement unit and the wheel velocity sensor, and finally obtains accurate and predictive vehicle state data, ground state data, and the like, to realize decentralized processing of complex information, exhibit coordination, reduce a workload of the central controller 10, and improve centralized fusion efficiency.

During decision-making fusion, the central controller 10 may make a control decision based on the vehicle state data, the ground state data, and the like obtained through perceptual fusion in combination with the motion execution capability fed back by control fusion, and with specific performance such as power, comfort, and control as a priority principle; and may further perform optimal trajectory planning in combination with vehicle surrounding space data obtained through perceptual fusion, to provide driving advice for the driver, or to determine a most appropriate moving trajectory in an autonomous driving mode. Diversity of control fusion can provide more trajectory execution possibilities for decision-making and planning, which can improve convenience of use of the vehicle and safety performance in extreme cases.

During control fusion, the motor controller in the power domain estimates the drive motor torque execution capability of each wheel, the steering system in the chassis domain estimates the steering wheel rotation angle execution capability, and the braking system in the chassis domain estimates the execution capability of the hydraulic braking torque and the master cylinder braking torque of each wheel. The central controller 10 performs re-evaluation and centralized analysis on the execution capabilities of the functional domains, performs compensation and fusion by using the fast response characteristic of the four-motor power architecture and the execution capability in the chassis domain, and forms motion execution capabilities of the system, including a longitudinal torque execution capability, a steering execution capability, a yaw torque execution capability, and the like, to provide a basis for decision-making of the central controller 10. After being issued, a decision-making instruction of the central controller 10 is decomposed to an executor of a specific domain, to achieve a balance between response velocity and stability, thereby achieving an improvement in extreme safety performance of the whole vehicle. In addition, when the braking system or the steering system in the chassis domain fails to operate, necessary steering and braking capabilities of the vehicle may be implemented based on the four-motor power architecture in the power domain, thereby improving emergency safety performance. In addition, control fusion is scalable, and after the active suspension control system is configured, fusion of longitudinal execution capabilities can be implemented, further improving comfort performance and safety performance of the vehicle.

In this way, collaborative control of the plurality of functional domains can be implemented based on the central controller, thereby helping realize user's expectation of extreme safety of using the vehicle, significantly reducing a communication load of each functional domain, improving communication efficiency, and improving versatility of each functional domain.

In some embodiments, at least one vehicle component in the first functional domain 21 is configured to send a control instruction to at least one vehicle component in the second functional domain 22 when the central controller 10 fails.

Specifically, because the first functional domain 21 and the second functional domain 22 can communicate with each other, and the first functional domain 21 and the second functional domain 22 have independent decision-making or execution capabilities, safety control of the vehicle can be implemented through the first functional domain 21 and the second functional domain 22 when the central controller 10 fails.

For example, the first functional domain 21 is an intelligent driving domain, and the second functional domain 22 is a power domain. When the central controller 10 fails, the intelligent driving domain may send a control instruction to the power domain, to implement braking control and steering control of the vehicle through the power domain, so that the vehicle can stop safely. For example, an intelligent driving controller in the intelligent driving domain sends a forward torque or a reverse torque of each drive motor to a motor controller in the power domain, to control each drive motor to operate through the motor controller, to implement braking control and steering control of the vehicle.

For another example, the first functional domain 21 is an intelligent driving domain, and the second functional domain 22 is a chassis domain. When the central controller 10 fails, the intelligent driving domain may send a control instruction to the chassis domain, to implement braking control and steering control of the vehicle through the chassis domain, so that the vehicle can stop safely. For example, an intelligent driving controller in the intelligent driving domain sends a braking torque of each wheel to a braking controller in the chassis domain, to control, through the braking controller, a brake corresponding to each wheel to operate, to achieve braking control of the vehicle.

For another example, the first functional domain 21 is a power domain, and the second functional domain 22 is a chassis domain. When the central controller 10 fails, the chassis domain may send a control instruction to the power domain, to implement braking control and steering control of the vehicle in collaboration with the power domain when the chassis domain has an insufficient braking capability, an insufficient steering capability, or insufficient braking and steering capabilities, so that the vehicle can stop safely. Alternatively, the power domain sends a control instruction to the chassis domain, to implement braking control and steering control of the vehicle in collaboration with the chassis domain when the power domain has an insufficient braking capability, an insufficient steering capability, or insufficient braking and steering capabilities, so that the vehicle can stop safely. For example, when a braking capability in the chassis domain is insufficient, the braking controller in the chassis domain may send a control instruction carrying a to-be-supplemented braking torque to the motor controller in the power domain, to control each drive motor to provide the to-be-supplemented braking torque through the motor controller, so that braking control of the vehicle is implemented in collaboration with the power domain. It should be noted that Details are not described herein again for other cases.

In the foregoing embodiment, through mutual communication between the plurality of functional domains, direct control between the plurality of functional domains may be implemented when the central controller fails, thereby maximizing safety control of the vehicle.

In some embodiments, the first functional domain 21 is an intelligent driving domain, and the second functional domain 22 is a power domain. When the central controller 10 fails, an intelligent driving controller in the intelligent driving domain sends a deceleration and/or differential control instruction to a drive assembly in the power domain to perform braking and/or steering control on the vehicle. The drive assembly includes a motor controller and a plurality of drive motors that are arranged in a one-to-one correspondence with wheels and that independently drive the wheels.

Specifically, the intelligent driving domain and the power domain have independent decision-making or execution capabilities. When the central controller 10 fails, the intelligent driving domain may send a deceleration control instruction, a differential control instruction, or a deceleration control instruction and a differential control instruction to the power domain, to perform braking control, steering control, or braking control and steering control on the vehicle, so that the vehicle can stop safely and steer safely.

For example, as described above, the intelligent driving domain includes a plurality of perceiving elements and an intelligent driving controller. The intelligent driving controller may perform preliminary processing on perceiving information of the perceiving elements. When the central controller 10 fails, the intelligent driving controller may further process the preliminarily processed information to obtain a corresponding deceleration control instruction, a differential control instruction, or a deceleration control instruction and a differential control instruction, and send the deceleration control instruction, the differential control instruction, or the deceleration control instruction and the differential control instruction to the plurality of drive assemblies in the power domain. The motor controllers in the plurality of drive assemblies control the drive motors of the wheels, to implement braking control, steering control, or braking control and steering control of the vehicle, so that the vehicle can stop safely and steer safely.

In this way, based on the independent communicative connection between the intelligent driving domain and the power domain, when the central controller fails, redundant stop of the vehicle in the intelligent driving mode can be realized through collaboration between the intelligent driving domain and the power domain, so that safety control of the vehicle can be maximized.

In some other embodiments, the first functional domain 21 is an intelligent driving domain, and the second functional domain 22 is a chassis domain. When the central controller 10 fails, an intelligent driving controller in the intelligent driving domain sends a deceleration control instruction and/or a differential control instruction to a braking system and a steering system in the chassis domain, to perform braking control and/or steering control on the vehicle.

Specifically, the intelligent driving domain and the chassis domain have independent decision-making or execution capabilities. When the central controller 10 fails, the intelligent driving domain may send a deceleration control instruction, a differential control instruction, or a deceleration control instruction and a differential control instruction to the chassis domain, to perform braking control, steering control, or braking control and steering control on the vehicle, so that the vehicle can stop safely and steer safely.

For example, as described above, the intelligent driving domain includes a plurality of perceiving elements and an intelligent driving controller. The intelligent driving controller may perform preliminary processing on perceiving information of the perceiving elements. When the central controller 10 fails, the intelligent driving controller may further process the preliminarily processed information to obtain a corresponding deceleration control instruction, a differential control instruction, or a deceleration control instruction and a differential control instruction, and send the deceleration control instruction, the differential control instruction, or the deceleration control instruction and the differential control instruction to the braking system and the steering system in the chassis domain. The braking controller in the braking system controls the brakes of the wheels, and in collaboration with the steering system, braking control, steering control, or braking control and steering control of the vehicle are implemented, so that the vehicle can stop safely and steer safely.

In this way, based on the independent communicative connection between the intelligent driving domain and the chassis domain, when the central controller fails, redundant stop of the vehicle in the intelligent driving mode can be realized through collaboration between the intelligent driving domain and the chassis domain, so that safety control of the vehicle can be maximized.

In still some other embodiments, the first functional domain 21 is a power domain, and the second functional domain 22 is a chassis domain. When the central controller 10 fails, a drive assembly in the power domain sends a deceleration control instruction and/or a differential control instruction to a braking system and a steering system in the chassis domain to perform braking control and/or steering control on the vehicle. The drive assembly includes a motor controller and a plurality of drive motors that are arranged in a one-to-one correspondence with wheels and that independently drive the wheels.

Specifically, the power domain and the chassis domain have independent decision-making or execution capabilities.

When the central controller 10 fails, the power domain may send a deceleration control instruction, a differential control instruction, or a deceleration control instruction and a differential control instruction to the chassis domain, to perform braking control, steering control, or braking control and steering control on the vehicle, so that the vehicle can stop safely and steer safely.

For example, as described above, the power domain includes a plurality of drive assemblies. Each drive assembly includes a motor controller. The motor controllers of the plurality of drive assemblies may communicate with each other. The motor controllers may perform preliminary processing on actual driving torques, resolving information, and the like of corresponding wheels. When the central controller 10 fails, one of the motor controllers may further process the preliminarily processed information to obtain a corresponding deceleration control instruction, a differential control instruction, or a deceleration control instruction and a differential control instruction. Based on the deceleration control instruction, the differential control instruction, or the deceleration control instruction and the differential control instruction and another motor controller, the drive motor of each wheel is controlled to implement braking control, steering control, or braking control and steering control. During control, if the drive motor of each wheel cannot satisfy the braking demand, the steering demand, or the braking demand and steering demand, one of the motor controllers may further send the deceleration control instruction, the differential control instruction, or the deceleration control instruction and the differential control instruction to the braking system and the steering system in the chassis domain. The braking controller in the braking system controls the brakes of the wheels, and in collaboration with the steering system, braking control, steering control, or braking control and steering control of the vehicle are implemented, so that the vehicle can stop safely and steer safely.

In this way, when the central controller fails, based on the independent communicative connection between the power domain and the chassis domain, safety control of the vehicle can be maximized.

In still some other embodiments, the first functional domain 21 is a chassis domain, the second functional domain 22 is a power domain, and when the central controller 10 fails, a steering system and/or a braking system in the chassis domain sends a deceleration control instruction and/or a differential control instruction to a drive assembly in the power domain, to perform braking control and/or steering control on a vehicle, the drive assembly including a motor controller and a plurality of drive motors that are arranged in a one-to-one correspondence with wheels and that independently drive the wheels.

Specifically, the power domain and the chassis domain have independent decision-making or execution capabilities. When the central controller 10 fails, a braking system, a steering system, or a braking system and a steering system in the chassis domain may send a deceleration control instruction, a differential control instruction, or a deceleration control instruction and a differential control instruction to the power domain, to perform braking control, steering control, or braking control and steering control on the vehicle, so that the vehicle can stop safely and steer safely.

For example, as described above, the chassis domain includes the braking system and the steering system. The braking controller in the braking system may perform preliminary processing on the actual braking torque of each wheel, the wheel velocity, the six-degrees-of-freedom inertia information of the vehicle, and the like. The steering controller in the steering system may perform preliminary processing on the wheel rotation angle of each wheel, and the like. The braking controller may communicate with the steering controller. When the central controller 10 fails, the braking controller may further process the preliminarily processed information to obtain the corresponding deceleration control instruction, the differential control instruction, or the deceleration control instruction and the differential control instruction. The brake of each wheel is controlled based on the deceleration control instruction, the differential control instruction, or the deceleration control instruction and the differential control instruction, and braking control, steering control, or braking control and steering control are implemented in collaboration with the steering controller. During control, if the braking force and the steering force provided by the braking system and the steering system cannot satisfy the braking demand, the steering demand, or the braking demand and the steering demand, the braking controller may further send the deceleration control instruction, the differential control instruction, or the deceleration control instruction and the differential control instruction to the plurality of drive assemblies in the power domain, and the motor controllers in the plurality of drive assemblies control the drive motors of the wheels to implement braking control, steering control, or braking control and steering control of the vehicle, so that the vehicle can stop safely and steer safely.

In this way, when the central controller fails, based on the independent communicative connection between the power domain and the chassis domain, safety control of the vehicle can be maximized.

In some embodiments, the control information includes first control information and/or second control information, the first control information being configured for instructing the vehicle component to perform a corresponding action, and the second control information being configured for instructing the vehicle component to feed back data information to the central controller 10.

Specifically, the central controller 10 serves as the core of the system and may deliver control information to various functional domains. The control information may be a data obtaining instruction. Through the instruction, a vehicle component is controlled to feed back data information to the central controller 10. For example, the central controller 10 may send a data obtaining instruction to perceiving elements such as radars and cameras in the intelligent driving domain, and after receiving the data obtaining instruction, the perceiving elements such as radars and cameras in the intelligent driving domain feed back data information to the central controller 10. The control information may alternatively be an execution instruction. Through the instruction, a vehicle component is controlled to perform a corresponding action. For example, the central controller 10 may send a control request to the motor controller in the power domain. When receiving the control request, the motor controller in the power domain controls the drive motor to perform a corresponding action.

In this way, coordinated control of a plurality of functional domains by the central controller can be implemented.

In some embodiments, the central controller 10 is further configured to implement data inter-transmission between different functional domains.

Specifically, each functional domain has a capability of independent decision-making or execution, and corresponding functional domains have data required for independent decision-making or execution. The central controller 10 may serve as a gateway to transfer necessary data between the functional domains to satisfy demands of the functional domains for the data. In this way, data redundancy can be implemented, and dependence of each functional domain on a single sensor is reduced, thereby improving data security and robustness.

For example, in the power domain, each drive motor is provided with a resolver, and a wheel velocity of each wheel may be obtained based on resolving information outputted by the resolver. In the chassis domain, each wheel is provided with a wheel velocity sensor, and a wheel velocity of each wheel may be obtained through the wheel velocity sensor. When the resolver in the power domain fails, the wheel velocity outputted by the wheel velocity sensor in the chassis domain is transmitted to the power domain through the central controller 10, thereby achieving data redundancy in the power domain. When the wheel velocity sensor in the chassis domain fails, the wheel velocity in the power domain is transmitted to the chassis domain through the central controller 10, thereby achieving data redundancy in the chassis domain.

In this way, data transmission between different functional domains is implemented through the central controller, so that data redundancy can be implemented, thereby improving security and robustness of the data.

In some embodiments, the first functional domain 21 is a chassis domain, the second functional domain 22 is a power domain, and the central controller 10 is configured to send, when a braking system and/or a steering system in the chassis domain fails, a deceleration control instruction and/or a differential control instruction to a drive assembly in the power domain, to perform braking control and/or steering control on a vehicle, where the drive assembly includes a motor controller and a plurality of drive motors that are arranged in a one-to-one correspondence with wheels and that independently drive the wheels.

That is to say, when the chassis domain fails, the central controller 10 may send a deceleration control instruction, a differential control instruction, or a deceleration control instruction and a differential control instruction to the power domain, to perform braking control, steering control, or braking control and steering control on the vehicle, so that the vehicle can stop safely and steer safely.

For example, during failure in the chassis domain, when braking is required, the central controller 10 may generate a corresponding deceleration control instruction, and send the deceleration control instruction to the plurality of drive assemblies in the power domain, and the motor controllers in the plurality of drive assemblies control the drive motors of the wheels to implement braking control of the vehicle, so that the vehicle can stop safely; when steering is required, the central controller 10 may generate a corresponding differential control instruction, and send the differential control instruction to the plurality of drive assemblies in the power domain, and the motor controllers in the plurality of drive assemblies control the drive motors of the wheels to implement steering control of the vehicle, so that the vehicle can steer safely; and when braking and steering are required, the central controller 10 may generate corresponding deceleration and differential control instructions, and send the deceleration and differential control instructions to the plurality of drive assemblies in the power domain, and the motor controllers in the plurality of drive assemblies control the drive motors of the wheels to implement braking control and steering control of the vehicle, so that the vehicle can stop safely and steer safely.

In some embodiments, the motor controller determines a reverse torque of the drive motor in response to the deceleration control instruction, and controls the drive motor according to the reverse torque, to perform braking control on the vehicle; and/or determines a reverse torque or a forward torque of the drive motor in response to the differential control instruction, and controls the drive motor according to the reverse torque or the forward torque, to perform steering control on the vehicle.

For example, as described above, the power domain includes a plurality of drive assemblies. Each drive assembly includes two drive motors and one motor controller. Each drive motor corresponds to one wheel. The motor controller may implement independent control of the two drive motors, so that the two drive motors control their respective corresponding wheels. When controlling the vehicle through the power domain, the central controller 10 may send a deceleration control instruction and a differential control instruction to the motor controller of each drive assembly, to control the drive motor corresponding to each wheel through the motor controller, to implement braking control, steering control, or braking control and steering control of the vehicle.

For example, when braking is required, the central controller 10 may send a deceleration control instruction to the motor controller, and the motor controller determines, when receiving the deceleration control instruction, a reverse torque of the drive motor based on the deceleration control instruction, and controls the drive motor according to the reverse torque, to perform braking control on the vehicle; and when steering is required, the central controller 10 may send a differential control instruction to the motor controller, and the motor controller determines, when receiving the differential control instruction, a reverse torque or a forward torque of the drive motor based on the differential control instruction, and controls the drive motor according to the reverse torque or the forward torque, to perform steering control on the vehicle.

In this way, necessary braking and steering of the vehicle can be implemented based on the four-motor power architecture, thereby maximizing safety control of the vehicle and improving emergency safety performance of the vehicle. It should be noted that When the motor controllers of the plurality of drive assemblies are connected, safe traveling of the vehicle during failure of the three or fewer drive motors can be further achieved based on the motor controllers, thereby achieving emergency safety performance.

In some embodiments, the plurality of vehicle components include at least one or more of a drive assembly, a braking system, a steering system, an inertial measurement unit, an intelligent driving controller, a steering wheel rotation angle sensor, a wheel velocity sensor, a camera, and a radar.

In some embodiments, the central controller 10 is further configured to obtain first data of at least one component in the first functional domain 21 and second data of at least one component in the second functional domain 22, perform fusion processing on the first data and the second data according to a current state and/or a target state of a vehicle, and send first control information to the vehicle component based on the fusion processed data, the first control information being adapted to indicate that steering control, transverse control, longitudinal control, or height direction control is performed on the vehicle.

Specifically, the central controller 10 may perform fusion processing such as the foregoing control fusion on the first data and the second data of two of the plurality of functional domains, for example, the first functional domain 21 and the second functional domain 22, to obtain data quickly and accurately, and control the vehicle precisely, stably, and safely. For example, the central controller 10 performs fusion processing on the first data and the second data based on the current state of the vehicle, the target state of the vehicle, or the current state and the target state of the vehicle, to implement fusion control of the vehicle, including, for example, but not limited to, steering control, transverse control, longitudinal control, or height direction control.

Further, the first data represents performance of at least one vehicle component in the first functional domain 21, and the second data represents performance of at least one vehicle component in the second functional domain 22.

For example, the first functional domain 21 may be a power domain, and the second functional domain 22 may be a chassis domain. Correspondingly, the performance of at least one vehicle component in the first functional domain 21 may include estimated drive capabilities of drive motors corresponding to the wheels. In other words, the first data includes drive capability data of the drive assembly in the power domain. The performance of at least one vehicle component in the second functional domain 22 may include estimated braking capabilities corresponding to the wheels, steering capabilities of the steering system, and damping characteristics of the suspensions corresponding to the wheels. In other words, the second data includes one or more of braking capability data of the braking system, steering capability data of the steering system, and the damping characteristics of the suspensions in the chassis domain. By performing re-evaluation and centralized analysis on the performance of the first functional domain 21 and the second functional domain 22, and performing compensation and fusion by using the fast response characteristic of the four-motor power architecture and the performance of the chassis domain, the central controller 10 can control the vehicle precisely, stably, and safely, for example, control the vehicle precisely, stably, and safely in the steering direction, the transverse direction, the longitudinal direction, or the height direction.

In some embodiments, the first functional domain 21 is a power domain, the power domain includes a drive assembly, the drive assembly includes a motor controller and a plurality of drive motors that are arranged in a one-to-one correspondence with wheels and that independently drive the wheels, the second functional domain 22 is a chassis domain, the chassis domain includes a braking system and a steering system, the first data includes at least drive capability data of the drive assembly in the power domain, the second data includes braking capability data of the braking system, steering capability data of the steering system, and a suspension damping characteristic of a suspension system in the chassis domain, and the central controller 10 is configured to perform fusion processing on the first data and the second data according to the current state and/or the target state of the vehicle, and send the first control information to the vehicle component based on the fusion processed data, the first control information including steering fusion control information, yaw fusion control information, longitudinal fusion control information, and suspension height control information.

Specifically, the central controller 10 may perform control fusion on the first data and the second data in the power domain and the chassis domain in combination with a vehicle control demand, for example, perform re-evaluation and centralized analysis on the drive capabilities of the drive motors corresponding to the wheels in the power domain, the braking capabilities of hydraulic cylinders corresponding to the wheels and the master cylinder in the chassis domain, the steering capability of the steering system in the chassis domain, and the suspension damping characteristic in the chassis domain, and perform compensation and fusion by using the fast response characteristic of the four-motor power architecture and the performance of the chassis domain, to achieve steering control fusion, yaw control fusion, longitudinal control fusion, and the like, thereby controlling the vehicle precisely, stably, and safely.

In some embodiments, the central controller 10 is configured to perform fusion processing on the first data and the second data according to a current vehicle velocity and a target turning radius, and send the steering fusion control information to the vehicle component based on fusion processed data.

Specifically, the central controller 10 may perform steering control fusion based on a current vehicle velocity of the vehicle, a target turning radius, a drive capability of a drive motor corresponding to each wheel in the power domain, a steering capability of the steering system in the chassis domain, a suspension damping characteristic in the chassis domain, and the like.

In some embodiments, the central controller 10 is configured to: send, when the current vehicle velocity is in a first vehicle velocity interval and the target turning radius is in a first turning radius interval, the steering fusion control information to the steering system based on the steering capability data of the steering system, to implement steering control; send, when the current vehicle velocity is in a second vehicle velocity interval and the target turning radius is in a second turning radius interval, the steering fusion control information to the steering system, the drive assembly, and the suspension system based on the steering capability data of the steering system, the drive capability data of the drive assembly, and the suspension damping characteristic of the suspension system, to implement differential steering control; send, when the current vehicle velocity is in a third vehicle velocity interval and the target turning radius is in a third turning radius interval, the steering fusion control information to the steering system and the drive assembly based on the steering capability data of the steering system and the drive capability data of the drive assembly, to implement differential steering control at a steering wheel limit rotation angle; and send, when the current vehicle velocity is in a fourth vehicle velocity interval and the target turning radius is in a fourth turning radius interval, the steering fusion control information to the drive assembly based on the drive capability data of the drive assembly, to implement differential steering control at a steering wheel zero rotation angle. A vehicle velocity in the first vehicle velocity interval>a vehicle velocity in the second vehicle velocity interval>a vehicle velocity in the third vehicle velocity interval>a vehicle velocity in the fourth vehicle velocity interval, and a turning radius in the first turning radius interval>a turning radius in the second turning radius interval>a turning radius in the third turning radius interval>a turning radius in the fourth turning radius interval.

Specifically, steering control fusion means that steering control of the vehicle from going straight ahead to a turning radius of zero is implemented based on the drive capability data of the drive assembly in the power domain, the steering capability data of the steering system in the chassis domain, and the suspension damping characteristic of the vehicle. The drive capability data may be a currently estimated drive capability of the drive assembly, for example, a drive capability of a drive motor corresponding to each wheel in the four-motor power architecture in the power domain, which is referred to as a four-wheel independent drive capability briefly. The steering capability data may be a currently estimated steering capability of the steering system, for example, a steering wheel rotation angle execution capability in the chassis domain.

Figure 8:
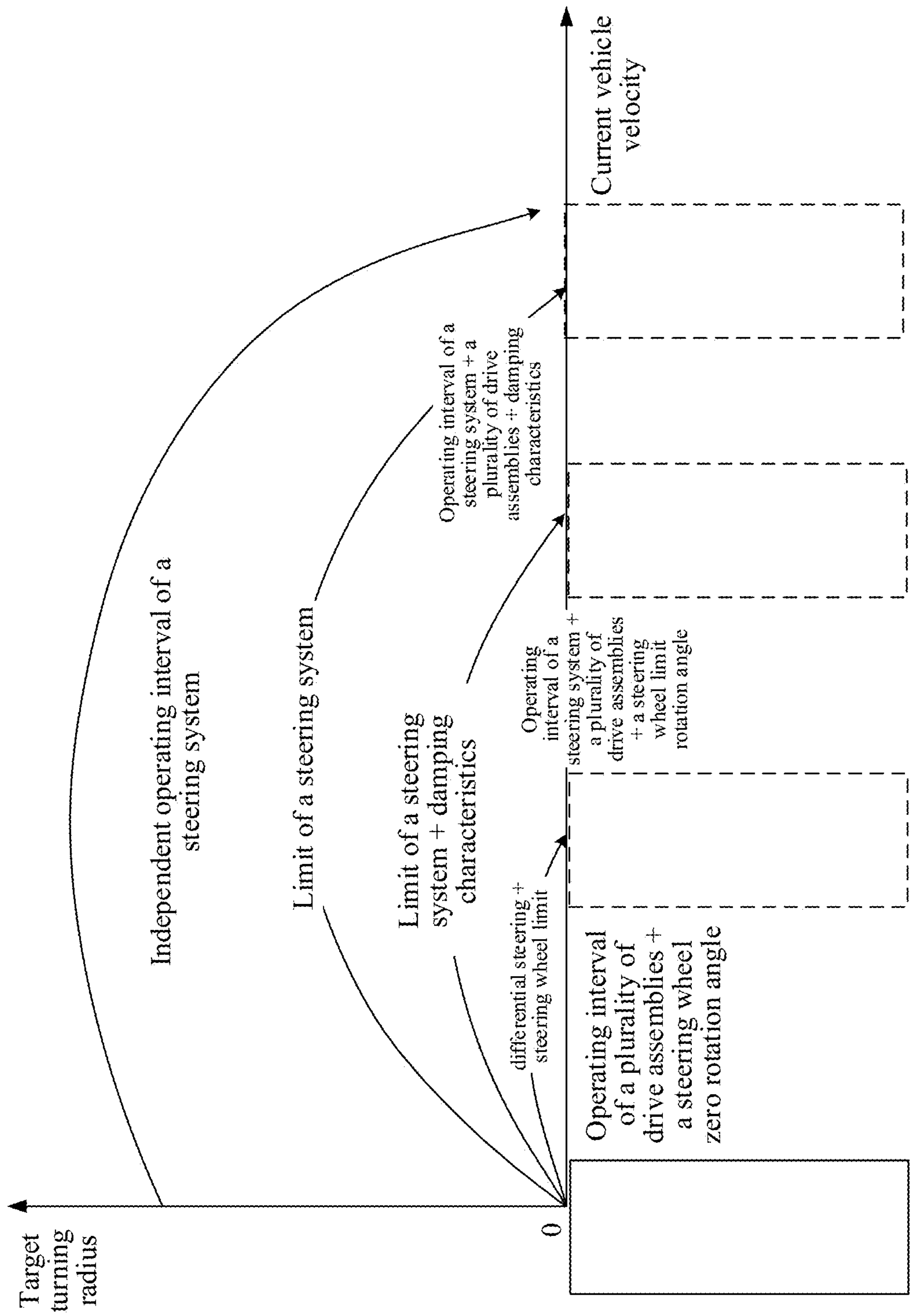
FIG. 8 is a schematic diagram of steering control fusion according to an embodiment of the present disclosure.

In actual application, a specific steering execution manner may be determined according to information such as a current vehicle velocity, a target turning radius, and a steering wheel rotation angle change rate of the vehicle, to implement steering control of the vehicle from going straight ahead to a turning radius of 0, which brings convenience or steering safety to vehicle control. For example, referring to FIG. 8, the abscissa represents the current vehicle velocity, the ordinate represents the target turning radius, the solid box represents the position of the vehicle before turning, and the dashed box represents the position of the vehicle after turning.

When the current vehicle velocity is in the first vehicle velocity interval and the target turning radius is in the first turning radius interval, that is, when the current vehicle velocity is very high and the target turning radius is very large, turning of the vehicle may be implemented based on the steering system. Therefore, the steering execution manner in this case is steering control implemented based on the steering capability of the steering system. Correspondingly, the steering fusion control information includes steering torque information that is determined based on the steering capability of the steering system and that is configured for controlling the action of the steering system. The central controller 10 sends the steering fusion control information to the steering controller in the steering system to implement the steering control through the steering system.

When the current vehicle velocity is in the second vehicle velocity interval and the target turning radius is in the second turning radius interval, that is, the current vehicle velocity is high and the target turning radius is large, the required steering capability exceeds the steering capability of the steering system. In this case, steering control needs to be implemented in collaboration with the four-motor power architecture. Therefore, the steering execution manner in this case is differential steering control implemented based on the steering capability of the steering system, the four-wheel independent drive capability of the four-motor power architecture, and the damping characteristics of the suspensions of the vehicle. Correspondingly, the steering fusion control information includes steering torque information that is determined based on the steering capability of the steering system, the four-wheel independent drive capability of the four-motor power architecture, and the damping characteristics of the suspensions, and that is configured for controlling the action of the steering system, the torque allocation information configured for controlling the action of each drive motor, and the damping adjustment instruction configured for adjusting the damping of each suspension. The central controller 10 sends the steering fusion control information to the steering controller in the steering system, the motor controller in the drive assembly, and the suspension controller in the suspension system, to implement differential steering control through the steering system, the four-motor power architecture, and the suspensions. The differential steering control means that the driving forces and the driving directions of the wheels are differentially controlled under the action of the four motors during steering.

When the current vehicle velocity is in the third vehicle velocity interval and the target turning radius is in the third turning radius interval, that is, the current vehicle velocity is low and the target turning radius is small, the required steering capability exceeds the maximum damping characteristic of the suspensions of the vehicle. In this case, more participation by the four-motor power architecture is required. Therefore, the steering execution manner in this case is differential steering control at the steering wheel limit rotation angle implemented based on the steering capability of the steering system and the four-wheel independent drive capability of the four-motor power architecture. Correspondingly, the steering fusion control information includes steering torque information that is determined based on the steering capability of the steering system and the four-wheel independent drive capability of the four-motor power architecture and that is configured for controlling the action of the steering system and the torque allocation information configured for controlling the action of each drive motor. The central controller 10 sends the steering fusion control information to the steering controller in the steering system and the motor controller in the drive assembly, to implement differential steering control at the steering wheel limit rotation angle through the steering system and the four-motor power architecture. The differential steering control at the steering wheel limit rotation angle means that during steering, the steering wheel is at the limit rotation angle, and the driving forces and the driving directions of the wheels are differentially controlled.

When the current vehicle velocity is in the fourth vehicle velocity interval and the target turning radius is in the fourth turning radius interval, that is, when the current vehicle velocity is very low and the target turning radius is very small, the required steering capability exceeds the steering capability of the steering wheel at the limit rotation angle. Therefore, the steering execution manner in this case is differential steering control at the steering wheel zero rotation angle implemented based on the four-wheel independent drive capability. Correspondingly, the steering fusion control information includes torque allocation information that is determined based on the four-wheel independent drive capability of the four-motor power architecture and that is configured for controlling the actions of the drive motors. The central controller 10 sends the steering fusion control information to the motor controller in the drive assembly, to implement differential steering control at the steering wheel zero rotation angle through the four-motor power architecture. The differential steering control at the steering wheel zero rotation angle means that during steering, the steering wheel is at the zero rotation angle, and the driving forces and the driving directions of the wheels are differentially controlled.

In some embodiments, when the current vehicle velocity is zero and the target turning radius is zero, the steering fusion control information includes a reverse torque of a drive motor corresponding to an inner steered wheel and a forward torque of a drive motor corresponding to an outer steered wheel, to implement in-place U-turn control at the steering wheel zero rotation angle.

Specifically, in an extreme case, for example, when the current vehicle velocity is zero and the target turning radius is zero, in-place U-turn control at the steering wheel zero rotation angle may be implemented based on the four-wheel independent drive capability of the four-motor power architecture. For example, a reverse torque may be applied to the drive motor corresponding to the inner steered wheel, and a forward torque may be applied to the drive motor corresponding to the outer steered wheel. The differential torque of the inner steered wheel and the outer steered wheel generates a yaw torque at the center of mass of the vehicle.

When the yaw torque is large enough, the vehicle breaks through the ground attachment and starts rotating, and during rotation, the center of mass of the vehicle is not displaced, thereby implementing in-place U-turn.

In this way, based on the four-wheel independent drive capability in the power domain, in-place U-turn in an extreme case can be implemented.

In the foregoing embodiment, by fusing data in the power domain and the chassis domain, the central controller can achieve ease of vehicle control and steering safety. It should be noted that Both the power domain and the chassis domain can implement steering control. When the four-wheel independent drive capability in the power domain and the steering system in the chassis domain fail, the steering control request can still be responded to, thereby giving consideration to both comfort control and safety control of steering.

In some embodiments, the central controller 10 is further configured to perform fusion processing on the first data and the second data according to a target yaw torque and a target yaw torque change rate, and send the yaw fusion control information to the vehicle component based on the fusion processed data.

Specifically, the central controller 10 may perform yaw control fusion according to the target yaw torque, the target yaw torque change rate, the four-wheel independent drive capability in the power domain, and the braking capability of the braking system in the chassis domain, to achieve stable yaw control of the vehicle.

In some embodiments, the central controller 10 is configured to: send, when the target yaw torque is less than a preset yaw torque, the yaw fusion control information to the drive assembly based on the drive capability data of the drive assembly, to implement yaw control; send, when the target yaw torque is greater than or equal to the preset yaw torque and the target yaw torque change rate is greater than a preset yaw torque change rate, the yaw fusion control information to the drive assembly based on the drive capability data of the drive assembly, to implement yaw control; and send, when the target yaw torque is greater than or equal to the preset yaw torque and the target yaw torque change rate is less than or equal to the preset yaw torque change rate, the yaw fusion control information to the braking system based on the braking capability data of the braking system, to implement yaw control.

Specifically, the yaw control fusion means that yaw control of the vehicle is implemented based on the four-wheel independent drive capability in the power domain and the braking capability of the braking system in the chassis domain, for example, the four-wheel independent braking capability.

In actual application, a specific yaw torque execution manner may be determined according to information such as the target yaw torque and the target yaw torque change rate. By using the characteristics that the power domain can quickly respond and adjust the yaw torque of the vehicle and the chassis domain has a more stable yaw torque, fast and accurate control of the yaw torque of the vehicle is implemented, thereby achieving stable control of the yaw of the vehicle, and achieving the objective of extreme safety of the yaw.

Figure 9:
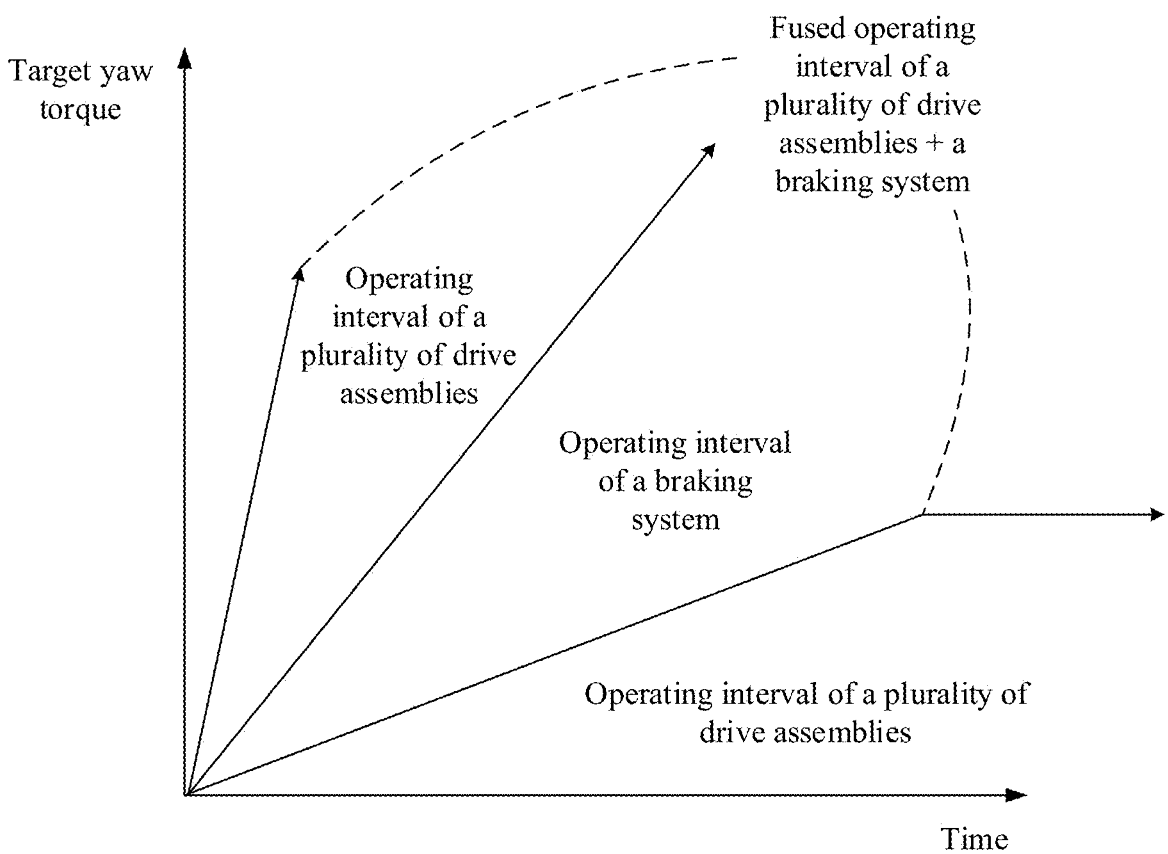
FIG. 9 is a schematic diagram of yaw control fusion according to an embodiment of the present disclosure.

For example, referring to FIG. 9, the abscissa represents time, the ordinate represents the target yaw torque, and the curve slope represents the target yaw torque change rate.

When the target yaw torque is less than the preset yaw torque, the yaw control of the vehicle may be implemented by both the four-wheel independent drive capability provided by the power domain and the four-wheel independent braking capability provided by the chassis domain. Considering that the power domain has the characteristic of quickly responding and adjusting the yaw torque of the vehicle, the yaw torque execution manner in this case is the yaw control implemented based on the four-wheel independent drive capability. Correspondingly, the yaw fusion control information includes the torque allocation information that is determined based on the four-wheel independent drive capability of the four-motor power architecture and that is configured for controlling the actions of the drive motors. The central controller 10 sends the yaw fusion control information to the motor controller in the drive assembly, to achieve yaw control through the four-motor power architecture.

When the target yaw torque is greater than or equal to the preset yaw torque, and the target yaw torque change rate is greater than the preset yaw torque change rate, although the target yaw torque becomes larger, the target yaw torque change rate is larger. Therefore, a high response velocity is required in this case. Therefore, the yaw torque execution manner in this case is still the yaw control implemented based on the four-wheel independent drive capability. Correspondingly, the yaw fusion control information includes the torque allocation information that is determined based on the four-wheel independent drive capability of the four-motor power architecture and that is configured for controlling the actions of the drive motors. The central controller 10 sends the yaw fusion control information to the motor controller in the drive assembly, to achieve yaw control through the four-motor power architecture.

When the target yaw torque is greater than or equal to the preset yaw torque, and the target yaw torque change rate is less than or equal to the preset yaw torque change rate, because a high response velocity is not required in this case, and in consideration of the characteristic that the chassis domain has a more stable yaw torque, the yaw torque execution manner in this case is the yaw control implemented based on the four-wheel independent braking capability. Correspondingly, the yaw fusion control information includes the braking torque information that is determined based on the four-wheel independent braking capability of the braking system and that is configured for controlling the actions of the braking system. The central controller 10 sends the yaw fusion control information to the braking controller in the braking system, to implement the yaw control through the braking system.

It should be noted that for the latter two cases, the yaw torque execution manner may alternatively be yaw control combined based on an execution capability of the braking system and based on a drive capability in the power domain. The difference is that when the target yaw torque change rate is greater than the preset yaw torque change rate, the power domain is dominating, and when the target yaw torque change rate is less than or equal to the preset yaw torque change rate, the chassis domain is dominating.

In the foregoing embodiment, by fusing data in the power domain and the chassis domain, the central controller can quickly control the yaw stability of the vehicle. It should be noted that Both the power domain and the chassis domain can implement yaw control. When the four-wheel independent drive capability in the power domain and the four-wheel braking capability in the chassis domain fail, the yaw control can still be implemented, thereby giving consideration to both the comfort control and the extreme safety control of the yaw.

In some embodiments, the central controller 10 is configured to perform fusion processing on the first data and the second data according to a target longitudinal torque and a target longitudinal torque change rate, and send the longitudinal fusion control information to the vehicle component based on the fusion processed data.

Specifically, the central controller 10 may perform longitudinal control fusion according to the target longitudinal torque, the target longitudinal torque change rate, the four-wheel independent drive capability in the power domain, and the four-wheel independent braking capability in the chassis domain, to achieve safe longitudinal control of the vehicle.

In some embodiments, the central controller 10 is configured to: send, when the target longitudinal torque is a positive torque, the longitudinal fusion control information to the drive assembly based on the drive capability data of the drive assembly, to implement longitudinal control; send, when the target longitudinal torque is a negative torque and the target longitudinal torque change rate is greater than a preset longitudinal torque change rate, the longitudinal fusion control information to the drive assembly based on the drive capability data of the drive assembly, to implement longitudinal control; and send, when the target longitudinal torque is a negative torque and the target longitudinal torque change rate is less than or equal to the preset longitudinal torque change rate, the longitudinal fusion control information to the braking system based on the braking capability data of the braking system, to implement longitudinal control.

Specifically, the longitudinal control fusion means that longitudinal control of the wheels is implemented based on the four-wheel independent drive capability in the power domain and the four-wheel independent braking capability in the chassis domain.

In actual application, a specific longitudinal torque execution manner may be determined according to information such as the target longitudinal torque and the target longitudinal torque change rate. By using the characteristics that the power domain can quickly respond and adjust the longitudinal torque of each wheel and the longitudinal torque in the chassis domain is more stable, fast and accurate control of the longitudinal torque of each wheel is implemented, thereby achieving longitudinal stable control of the vehicle, and achieving the objective of longitudinal extreme safety.

Figure 10:
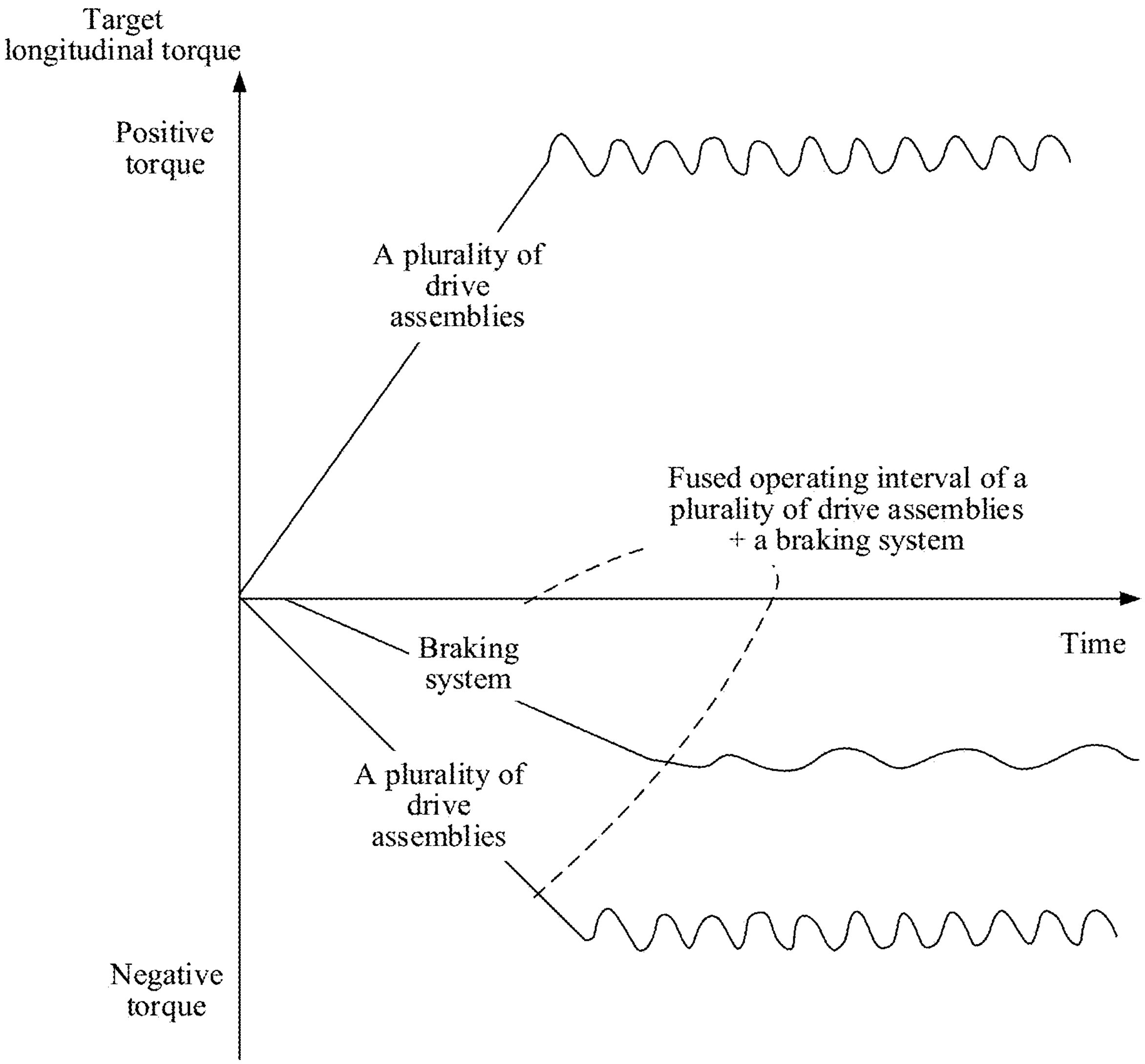
FIG. 10 is a schematic diagram of longitudinal control fusion according to an embodiment of the present disclosure.

For example, referring to FIG. 10, the abscissa represents time, the ordinate represents the target longitudinal torque, and the curve slope represents the target longitudinal torque change rate.

When the target longitudinal torque is a positive torque, because the power domain can provide the positive torque, a longitudinal torque execution manner in this case is longitudinal control implemented based on the four-wheel independent drive capability. Correspondingly, the longitudinal fusion control information includes the torque allocation information that is determined based on the four-wheel independent drive capability of the four-motor power architecture and that is configured for controlling the actions of the drive motors. The central controller 10 sends the longitudinal fusion control information to the motor controller in the drive assembly, to achieve longitudinal control through the four-motor power architecture.

When the target longitudinal torque is a negative torque, and the target longitudinal torque change rate is greater than the preset longitudinal torque change rate, both the power domain and the chassis domain can provide the negative torque. However, in this case, the target longitudinal torque change rate is greater than the preset longitudinal torque change rate, and a high response velocity is required. Considering that the power domain has the characteristic of quickly responding and adjusting the longitudinal torque of each wheel, the longitudinal torque execution manner in this case is the longitudinal control implemented based on the four-wheel independent drive capability. Correspondingly, the longitudinal fusion control information includes the torque allocation information that is determined based on the four-wheel independent drive capability of the four-motor power architecture and that is configured for controlling the actions of the drive motors. The central controller 10 sends the longitudinal fusion control information to the motor controller in the drive assembly, to achieve longitudinal control through the four-motor power architecture.

When the target longitudinal torque is a negative torque, and the target longitudinal torque change rate is less than or equal to the preset longitudinal torque change rate, both the power domain and the chassis domain can provide the negative torque. However, in this case, the target longitudinal torque change rate is less than or equal to the preset longitudinal torque change rate, and a high response velocity is not required in this case. In consideration of the characteristic that the chassis domain has a more stable longitudinal torque, the longitudinal torque execution manner in this case is the longitudinal control implemented based on the four-wheel independent braking capability. Correspondingly, the longitudinal fusion control information includes the braking torque information that is determined based on the four-wheel independent braking capability of the braking system and that is configured for controlling the actions of the braking system. The central controller 10 sends the longitudinal fusion control information to the braking controller in the braking system, to implement the longitudinal control through the braking system.

It should be noted that for the latter two cases, the longitudinal torque execution manner may alternatively be longitudinal control combined based on a four-wheel independent braking capability of the braking system and based on a four-wheel independent drive capability in the power domain. The difference is that when the target longitudinal torque change rate is greater than the preset longitudinal torque change rate, the power domain is dominating, and when the target longitudinal torque change rate is less than or equal to the preset longitudinal torque change rate, the chassis domain is dominating.

In the foregoing embodiment, by fusing data in the power domain and the chassis domain, the central controller can quickly control the longitudinal stability of the vehicle. It should be noted that The power domain can implement braking control. When the braking system in the chassis domain fails, reliable braking of the vehicle can still be implemented by the four-wheel independent drive capability in the power domain, thereby implementing emergency safety of the vehicle.

In the foregoing embodiments, the central controller fuses, based on a regular control demand of the vehicle, execution capabilities of the actuators in the functional domains, to implement the steering fusion control, the yaw fusion control, and the longitudinal fusion control of the vehicle, fully exploits the execution capabilities of the actuators on the vehicle, and implements the steering control, the yaw control, and the longitudinal control of the vehicle better and faster, thereby improving the safety performance of the vehicle.

In some embodiments, the central controller 10 is further configured to send, based on actual ground profile information of each wheel, the suspension height control information to the suspension in the chassis domain for suspension height adjustment.

Specifically, during traveling of the vehicle, the central controller 10 may predict a motion trajectory of the vehicle, obtain trajectory planning information of the vehicle, and then predict trajectory planning information of each wheel; then determine, according to the trajectory planning information of each wheel, actual ground profile information such as an actual ground profile curve of each wheel at the predicted trajectory, where for details, reference may be made to the following, and details are not described herein again; and finally adjust the suspension height of each wheel in advance based on the actual ground profile information of each wheel, the distance between the profile and each wheel, and the current wheel velocity of each wheel, and in combination with the adjustment velocity of the vehicle suspension height in the chassis domain, to maximize control of the longitudinal comfort of the vehicle, and additionally may also adjust the suspension damping, to maximize control of the longitudinal comfort of the vehicle.

It should be noted that When the vehicle is in the autonomous driving mode, the central controller 10 may further improve the longitudinal comfort of the vehicle by adjusting the longitudinal motion velocity of the suspension of each wheel.

In the foregoing embodiment, the suspension of each wheel in the chassis domain is adjusted in advance based on the actual ground profile information of each wheel, which can improve the comfort of the vehicle when traveling on an uneven ground.

In some embodiments, the plurality of different functional domains further include a third functional domain 23, and the central controller 10 is further configured to obtain first data of at least one vehicle component in the first functional domain 21, second data of at least one vehicle component in the second functional domain 22, and third data of at least one vehicle component in the third functional domain 23, and perform fusion processing on the first data, the second data, and the third data, to obtain vehicle operating condition information.

Specifically, the central controller 10 may perform fusion processing such as the foregoing perceptual fusion on the first data, the second data, and the third data of three of the plurality of functional domains such as the first functional domain 21, the second functional domain 22, and the third functional domain 23, to obtain vehicle state data, ground state data, and the like closer to actuality, thereby facilitating more accurate control of the vehicle.

Further, the first data represents a vehicle state obtained by the at least one vehicle component in the first functional domain 21, the second data represents a vehicle state obtained by the at least one vehicle component in the second functional domain 22, and the third data represents a vehicle state obtained by the at least one vehicle component in the third functional domain 23.

For example, the first functional domain 21 may be a power domain, the second functional domain 22 may be a chassis domain, and the third functional domain 23 may be an intelligent driving domain. A vehicle traveling state obtained by at least one component in the first functional domain 21 may be a preliminarily processed actual driving torque of each wheel, a wheel velocity of each wheel obtained based on the resolving information, and the like. In other words, the first data may include the actual driving torque and the wheel velocity of each wheel. The vehicle traveling state obtained by at least one component in the second functional domain 22 may be a preliminarily processed actual braking torque of each wheel, the wheel velocity, the wheel rotation angle, the steering wheel rotation angle, the six-degrees-of-freedom inertia information of the vehicle, and the like. In other words, the second data includes the actual braking torque of each wheel, the wheel velocity, the wheel rotation angle, the steering wheel rotation angle, the six-degrees-of-freedom inertia information of the vehicle, and the like. The vehicle traveling state obtained by at least one component in the third functional domain 23 may be preliminarily processed distance information, ground image information, position information, and the like. In other words, the third data may include the distance information, the ground image information, the position information, and the like. The central controller 10 may perform centralized fusion based on the data transmitted by each functional domain and the data of the directly connected inertial measurement unit and the wheel velocity sensor, and finally obtains accurate and predictive vehicle state data, ground state data, and the like.

In some embodiments, the first functional domain 21 is a power domain, the second functional domain 22 is a chassis domain, the third functional domain 23 is an intelligent driving domain, and the central controller 10 is configured to perform perceptual fusion on the first data, the second data, and the third data, to obtain the vehicle operating condition information, and the vehicle operating condition information includes at least vehicle state data, ground state data, or vehicle surrounding space data.

Specifically, during traveling of the vehicle, if vehicle state data, ground state data, vehicle surrounding space data, and the like can be obtained clearly and accurately, the vehicle can be better controlled, and vehicle state data, ground state data, vehicle surrounding space data, and the like closer to actuality can be obtained through information fusion. Therefore, the central controller 10 can perform perceptual fusion on data in the power domain, the chassis domain, and the intelligent driving domain, mainly including estimation of the vehicle state, recognition of the ground state, recognition of the surroundings of the vehicle, and the like, to obtain vehicle state data, ground state data, vehicle surrounding space data, and the like closer to actuality, thereby facilitating improvement in safety, comfort, and the like of vehicle control.

In some embodiments, the first data includes a first wheel velocity of each wheel, the second data includes a second wheel velocity of each wheel, first six-degrees-of-freedom inertia information, and a steered wheel rotation angle, the third data includes a first vehicle velocity, and the central controller 10 is configured to perform fusion based on the first wheel velocity of each wheel, the second wheel velocity of each wheel, the first six-degrees-of-freedom inertia information, the steered wheel rotation angle, and the first vehicle velocity, to obtain the vehicle state data.

Specifically, the first functional domain 21 is a power domain, and corresponding first data may include wheel velocities (denoted as first wheel velocities) of the wheels. The second functional domain 22 is a chassis domain, and corresponding second data may include wheel velocities (denoted as second wheel velocities) of the wheels, six-degrees-of-freedom inertia information of the vehicle (denoted as first six-degrees-of-freedom inertia information), and a steered wheel rotation angle. The third functional domain 23 is an intelligent driving domain, and corresponding third data may include a vehicle velocity (denoted as first vehicle velocity) obtained based on the high-accuracy positioning apparatus. The central controller 10 may perform fusion based on the first wheel velocity of each wheel, the second wheel velocity of each wheel, the first six-degrees-of-freedom inertia information, the steered wheel rotation angle, and the first vehicle velocity, to obtain the vehicle state data. The first wheel velocity may be obtained by performing preliminary processing on the resolving information of each wheel. Specifically, a rotation velocity of the drive motor is collected by a resolver arranged on the drive motor, and then the first wheel velocity is obtained by performing conversion based on the rotation velocity and a reduction ratio of the velocity reducer. That is to say, the first wheel velocity is a ratio of the rotation velocity to the reduction ratio. The second wheel velocity is detected by the wheel velocity sensor.

In some embodiments, the first data further includes a driving torque of each wheel, the second data further includes a braking torque of each wheel and a steering wheel rotation angle, and the central controller 10 is configured to perform fusion based on the first wheel velocity of each wheel, the second wheel velocity of each wheel, the driving torque of each wheel, the first six-degrees-of-freedom inertia information, the braking torque of each wheel, and the steering wheel rotation angle, to obtain the vehicle state data.

That is to say, the central controller 10 may further perform fusion based on the first wheel velocities of the wheels and the driving torques of the wheels in the power domain, the second wheel velocities of the wheels in the chassis domain, the first six-degrees-of-freedom inertia information, the braking torques of the wheels, and the steering wheel rotation angle, to obtain the vehicle state data.

In some embodiments, the vehicle state data includes a current vehicle velocity, and the central controller 10 is configured to: fuse the first wheel velocity of each wheel, the second wheel velocity of each wheel, and a third wheel velocity of each wheel for a vehicle component directly connected to the central controller 10, to obtain a current wheel velocity of each wheel; fuse the first six-degrees-of-freedom inertia information and second six-degrees-of-freedom inertia information of the vehicle component directly connected to the central controller 10, to obtain current six-degrees-of-freedom inertia information; and determine the current vehicle velocity based on the current wheel velocity of each wheel, the current six-degrees-of-freedom inertia information, the steered wheel rotation angle, and the first vehicle velocity.

Specifically, the central controller 10 is further directly connected to a plurality of wheel velocity sensors and an inertial measurement unit, obtains the wheel velocities of the wheels (denoted as the third wheel velocities) through the plurality of wheel velocity sensors, and obtains the six-degrees-of-freedom inertial information of the vehicle (denoted as the second six-degrees-of-freedom inertial information) through the inertial measurement unit.

When obtaining the current vehicle velocity, the central controller 10 may first perform wheel velocity fusion on the first wheel velocity of each wheel in the power domain, the second wheel velocity of each wheel in the chassis domain, and the third wheel velocity of each wheel directly connected to the central controller, to obtain the current wheel velocity of each wheel, and perform inertia information fusion on the first six-degrees-of-freedom inertia information of the vehicle in the power domain and the second six-degrees-of-freedom inertia information of the vehicle directly connected to the central controller, to obtain the current six-degrees-of-freedom inertia information of the vehicle; and then obtain the current vehicle velocity based on the current wheel velocity of each wheel, the current six-degrees-of-freedom inertia information, the steered wheel rotation angle in the chassis domain, and the first vehicle velocity in the intelligent driving domain.

For example, the central controller 10 may first verify the third wheel velocity of each wheel and the second wheel velocity of each wheel in the chassis domain to obtain a fourth wheel velocity of each wheel; and then verify the fourth wheel velocity of each wheel and the first wheel velocity of each wheel in the power domain, to obtain the current wheel velocity of each wheel.

Using one of the wheels as an example, during wheel velocity fusion, the central controller 10 first verifies a third wheel velocity of the wheel and a second wheel velocity of the wheel. When both the third wheel velocity and the second wheel velocity are normal (valid and within a normal range) and a difference between the third wheel velocity and the second wheel velocity is within a first preset threshold range, an average value of the third wheel velocity and the second wheel velocity is obtained to obtain a fourth wheel velocity. When the third wheel velocity and the second wheel velocity are both normal and the difference between the third wheel velocity and the second wheel velocity is not within the first preset threshold range, the third wheel velocity prevails, that is, the fourth wheel velocity is equal to the third wheel velocity. When only one of the third wheel velocity and the second wheel velocity is normal, the normal wheel velocity is used as the fourth wheel velocity. Then, the central controller 10 verifies the fourth wheel velocity of the wheel and the first wheel velocity. When the fourth wheel velocity and the first wheel velocity are both normal and a difference between the fourth wheel velocity and the first wheel velocity falls within the first preset threshold range, an average value of the fourth wheel velocity and the first wheel velocity is obtained to obtain a current wheel velocity. When the fourth wheel velocity and the first wheel velocity are both normal and the difference between the fourth wheel velocity and the first wheel velocity is not within the first preset threshold range, the fourth wheel velocity prevails, that is, the current wheel velocity is equal to the fourth wheel velocity. When only one of the fourth wheel velocity and the first wheel velocity is normal, the normal wheel velocity is used as the current wheel velocity.

It should be noted that a process of determining the current wheel velocities of the other wheels is the same as the foregoing process, and details are not described herein again. In addition, when the current wheel velocity is determined, the first wheel velocity and the second wheel velocity may be verified first, and then the third wheel velocity is verified; the first wheel velocity and the third wheel velocity are verified first, and then the second wheel velocity is verified; or the first wheel velocity, the second wheel velocity, and the third wheel velocity are verified simultaneously. In actual application, one of the manners may be selected based on the data transmission delay to determine the current wheel velocity. For example, in consideration of a transmission delay of the first wheel velocity, the third wheel velocity and the second wheel velocity may be verified first, and then the first wheel velocity is verified. In this way, a delay of the first wheel velocity caused by the transmission path can be eliminated, so that a wheel velocity with both high real-time performance and high accuracy can be obtained.

In addition, the central controller 10 may perform inertia information fusion on the first six-degrees-of-freedom inertia information of the vehicle in the chassis domain and the second six-degrees-of-freedom inertia information of the vehicle directly connected to the central controller, to obtain the current six-degrees-of-freedom inertia information. It should be noted that The process may alternatively be earlier than the determining the current wheel velocities of the wheels.

For example, when the inertia information fusion is performed, the central controller 10 verifies the first six-degrees-of-freedom inertia information and the second six-degrees-of-freedom inertia information. When both the first six-degrees-of-freedom inertia information and the second six-degrees-of-freedom inertia information are normal (valid and in a normal range) and a difference between the first six-degrees-of-freedom inertia information and the second six-degrees-of-freedom inertia information falls within a second preset threshold range, an average value of the first six-degrees-of-freedom inertia information and the second six-degrees-of-freedom inertia information is obtained to obtain the current six-degrees-of-freedom inertia information. When the first six-degrees-of-freedom inertia information and the second six-degrees-of-freedom inertia information are both normal and a difference between the first six-degrees-of-freedom inertia information and the second six-degrees-of-freedom inertia information is not within the second preset threshold range, the second six-degrees-of-freedom inertia information prevails, that is, the current six-degrees-of-freedom inertia information is equal to the second six-degrees-of-freedom inertia information. When only one of the first six-degrees-of-freedom inertia information and the second six-degrees-of-freedom inertia information is normal, the normal six-degrees-of-freedom inertia information is used as the current six-degrees-of-freedom inertia information. It should be noted that Before the first six-degrees-of-freedom inertia information and the second six-degrees-of-freedom inertia information are fused, appropriate coordinate transformation may be first performed, to obtain the current six-degrees-of-freedom inertia information based on the center of mass of the vehicle.

Finally, the central controller 10 obtains the current vehicle velocity based on the current wheel velocity of each wheel, the current six-degrees-of-freedom inertia information, the steered wheel rotation angle in the chassis domain, and the first vehicle velocity in the intelligent driving domain.

For example, the central controller 10 may fuse the current wheel velocity of each wheel, the current six-degrees-of-freedom inertia information, and the steered wheel rotation angle in the chassis domain, to obtain the second vehicle velocity, then perform weighting processing on the second vehicle velocity and the first vehicle velocity in the intelligent driving domain to obtain a weighted vehicle velocity, and estimate, based on the weighted vehicle velocity, the current vehicle velocity of the vehicle in a Kalman filtering manner.

In some embodiments, the central controller 10 is configured to: convert, based on the current six-degrees-of-freedom inertia information and the steered wheel rotation angle, the current wheel velocity of each wheel to an initial center of mass vehicle velocity based on a center of mass of a vehicle, and obtain an average center of mass vehicle velocity; determine a motion state of each wheel based on the first vehicle velocity and the current wheel velocity of each wheel; perform weighting processing on the average center of mass vehicle velocity and the first vehicle velocity based on the motion state of each wheel, to obtain a weighted vehicle velocity; and determine the current vehicle velocity based on the weighted vehicle velocity, the current six-degrees-of-freedom inertia information, and the motion state of each wheel.

Specifically, there are various manners of determining the current vehicle velocity. For example, the central controller 10 may first calculate a transverse acceleration, a longitudinal acceleration, a yaw rate, and the like of the vehicle based on the geometric parameters of the vehicle and the current six-degrees-of-freedom inertia information, convert the current wheel velocity of each wheel into an initial center of mass vehicle velocity according to a wheel track, a wheelbase, a steering wheel rotation angle (when the steered wheel is a front wheel, the steering wheel rotation angle is a front wheel rotation angle), a yaw rate, and the like of the vehicle, and calculate an average value of the initial center of mass vehicle velocities to obtain an average center of mass vehicle velocity; then determine slipping or rotatable sliding of each wheel according to a relationship between the first vehicle velocity and the current wheel velocity of each wheel, for example, during braking of the vehicle, if the first vehicle velocity is greater than a current wheel velocity of a wheel (an appropriate error range may also be added), it is determined that the wheel is in a slipping state; or during driving of the vehicle, if the first vehicle velocity is less than a current wheel velocity of a wheel (an appropriate error range may also be added), it is determined that the wheel is in a rotatable sliding state; then perform, based on a determination result of slipping or rotatable sliding of each wheel, weighting processing on the average center of mass vehicle velocity and the first vehicle velocity, to obtain a weighted vehicle velocity, for example, a more severe slipping or rotatable sliding status indicates a higher weight of the first vehicle velocity; and finally determine the current vehicle velocity based on the weighted vehicle velocity, the current six-degrees-of-freedom inertia information, and the motion state of each wheel, for example, the weighted vehicle velocity is used as the measured value, the current vehicle velocity is used as the estimated value, the longitudinal acceleration (obtained based on the current six-degrees-of-freedom inertia information) is used as the control quantity, the noise is used as the calibration quantity, the observation matrix is obtained from the output matrix of the slipping status of each wheel, and Kalman filtering is performed to obtain the current vehicle velocity.

In the foregoing embodiment, the central controller performs fusion by using the resolving information in the power domain, the wheel velocity information and the six-degrees-of-freedom inertia information in the chassis domain, the high-accuracy positioning signal in the intelligent driving domain, and the six-degrees-of-freedom inertia information built into the central controller, and estimates the vehicle velocity by using the Kalman filtering algorithm, so that the current vehicle velocity can be identified more accurately, which is conducive to accurate control of the vehicle.

In some embodiments, the vehicle state data includes an actual whole vehicle mass, and the central controller 10 is configured to: fuse the first wheel velocity of each wheel, the second wheel velocity of each wheel, and a third wheel velocity of each wheel for a vehicle component directly connected to the central controller 10, to obtain a current wheel velocity of each wheel; fuse the first six-degrees-of-freedom inertia information and second six-degrees-of-freedom inertia information of the vehicle component directly connected to the central controller 10, to obtain current six-degrees-of-freedom inertia information; and determine the actual whole vehicle mass based on the current wheel velocity of each wheel, the current six-degrees-of-freedom inertia information, the steering wheel rotation angle, the driving torque of each wheel, and the braking torque of each wheel.

Specifically, the central controller 10 may obtain the current wheel velocity of each wheel and the current six-degrees-of-freedom inertia information based on the foregoing manner, where for details, refer to the foregoing, and details are not described herein again; and then estimate the whole vehicle mass based on a recursive least squares method and based on the current wheel velocity of each wheel, the current six-degrees-of-freedom inertia information, the steering wheel rotation angle in the chassis domain, the driving torque of each wheel in the power domain, the braking torque of each wheel in the chassis domain, and the like, to obtain the actual whole vehicle mass. There are various manners of obtaining the actual whole vehicle mass. For example, it can be learned from Newton's second law F=ma that, when the force F and the acceleration a are obtained, the initial whole vehicle mass m can be calculated. F may be calculated according to the driving torque of each wheel and the braking torque of each wheel; and a may be calculated according to the current six-degrees-of-freedom inertia information, the steering wheel rotation angle, and the current wheel velocity. For example, a longitudinal acceleration a1 of the vehicle is determined according to the current six-degrees-of-freedom inertia information, a1 is corrected by using the steering wheel rotation angle, an acceleration a2 is obtained through differential calculation by using the current wheel velocity, and finally weighted calculation is performed on the corrected longitudinal acceleration a1 and the acceleration a2 to obtain a. Finally, m may be calculated based on Newton's second law formula, and the calculated m is corrected by using the recursive least squares method, to finally obtain the actual whole vehicle mass.

In the foregoing embodiment, by fusing information in the power domain, the chassis domain, and the intelligent driving domain, the central controller can more accurately identify the vehicle state data, such as the actual whole vehicle mass, thereby facilitating control of the vehicle.

In some embodiments, the first data includes a first wheel velocity of each wheel and a driving torque of each wheel, the second data includes a second wheel velocity of each wheel, a braking torque of each wheel, first six-degrees-of-freedom inertia information, and a steered wheel rotation angle, the third data includes a first vehicle velocity and ground image information, and the central controller 10 is configured to perform fusion based on the first wheel velocity of each wheel, the driving torque of each wheel, the second wheel velocity of each wheel, the braking torque of each wheel, the first six-degrees-of-freedom inertia information, the steered wheel rotation angle, the first vehicle velocity, and the ground image information, to obtain the ground state data.

Specifically, the first functional domain 21 is a power domain, and corresponding first data may include a first wheel velocity and a driving torque of each wheel. The second functional domain 22 is a chassis domain, and corresponding second data may include a second wheel velocity and a braking torque of each wheel, first six-degrees-of-freedom inertia information, and a steered wheel rotation angle. The third functional domain 23 is an intelligent driving domain, and corresponding third data may include a first vehicle velocity and ground image information. The central controller 10 may perform fusion based on the first wheel velocity and the driving torque of each wheel in the power domain, the second wheel velocity and the braking torque of each wheel, the first six-degrees-of-freedom inertia information, and the steering wheel rotation angle in the chassis domain, and the first vehicle velocity and the ground image information in the intelligent driving domain, to the ground state data.

In some embodiments, the ground state data includes an actual ground type, and the central controller 10 is configured to: perform feature extraction on the ground image information, to obtain ground feature information; and perform matching between the ground feature information and preset feature information, to obtain the actual ground type, where the preset feature information is in a correspondence with a ground type.

Specifically, a feature information base may be preset in the central controller 10. Preset feature information and a ground type corresponding to the preset feature information are stored in the feature information base. The ground type may include ordinary ground types such as concrete ground and cement ground, and special ground types such as sand ground, snow ground, and grass ground.

For example, the central controller 10 may first perform preprocessing (such as denoising processing or enhancement processing) on the ground image information in the intelligent driving domain, and extract the ground feature information from the preprocessed ground image information; and then perform matching between the extracted ground feature information and the preset feature information in the feature information library. If the ground feature information matches the preset feature information, the ground type corresponding to the preset feature information is used as the actual ground type. If the ground feature information does not match the preset feature information, a ground type closest to the ground type corresponding to the preset feature information may be selected as the actual ground type.

It should be noted that in actual application, an actual ground type may alternatively be obtained through classification by a neural network model. For example, an initial neural network model may be first determined, and then the initial neural network model is trained based on a ground sample image to obtain a trained neural network model. After extracting the ground feature information from the ground image information, the central controller 10 inputs the extracted ground feature information to the trained neural network model, and performs ground type classification by using the neural network model to obtain an actual ground type.

In the foregoing embodiment, recognition of an actual ground type is performed by using visual information, to realize preview control of the vehicle and improve control performance of the vehicle. In addition, the vehicle may be automatically switched to a corresponding control mode based on the actual ground type, thereby improving performance and reducing operations of the driver.

In some embodiments, the ground state data includes actual ground attachment information of each wheel, and the central controller 10 is configured to: determine first ground attachment information based on the actual ground type; determine second ground attachment information of each wheel based on the first wheel velocity of each wheel, the second wheel velocity of each wheel, the first six-degrees-of-freedom inertia information, the steered wheel rotation angle, the first vehicle velocity, the driving torque of each wheel, and the braking torque of each wheel; and determine the actual ground attachment information of each wheel based on the first ground attachment information and the second ground attachment information of each wheel.

Specifically, the central controller 10 may determine first ground attachment information from a visual perspective, where the first ground attachment information may be first ground attachment information of the whole vehicle or first ground attachment information of each wheel, and determine second ground attachment information from a dynamic perspective, where the second ground attachment information may be second ground attachment information of each wheel; and then perform attachment information fusion on the first ground attachment information and the second ground attachment information, to obtain the actual ground attachment information of each wheel.

For example, when the first ground attachment information is determined, the first ground attachment information may be determined based on an actual ground type, and there may be a plurality of specific determining manners. For example, the first ground attachment information of the whole vehicle may be determined based on an actual ground type corresponding to the whole vehicle in a table look-up manner or the like. Alternatively, the first ground attachment information of each wheel may be determined based on an actual ground type corresponding to each wheel in a table look-up manner or the like.

When the second ground attachment information is determined, the first wheel velocity and the driving torque of each wheel in the power domain, the second wheel velocity and the braking torque of each wheel in the chassis domain, the first six-degrees-of-freedom inertia information, the steered wheel rotation angle (when the steered wheel is a front wheel, the steered wheel rotation angle is the front wheel rotation angle), and the first vehicle velocity in the intelligent driving domain may be fused to determine the second ground attachment information of each wheel.

When the actual ground attachment information of each wheel is determined, the first ground attachment information of the whole vehicle and the second ground attachment information of each wheel may be fused; or the first ground attachment information and the second ground attachment information of each wheel may be fused, to obtain the actual ground attachment information of each wheel.

In some embodiments, the central controller 10 is configured to determine the first ground attachment information based on the actual ground type and a mapping relationship between a preset ground type and ground attachment information.

Specifically, a mapping relationship table of the ground type and the ground attachment information may be preset in the central controller 10. When obtaining the actual ground type in the foregoing manner, the central controller 10 may find, based on the actual ground type, the corresponding ground attachment information from the mapping relationship table as the first ground attachment information.

In some embodiments, the central controller 10 is configured to: fuse the first six-degrees-of-freedom inertia information and second six-degrees-of-freedom inertia information of the vehicle component directly connected to the central controller 10, to obtain current six-degrees-of-freedom inertia information; and fuse the first wheel velocity of each wheel, the second wheel velocity of each wheel, and a third wheel velocity of each wheel for a vehicle component directly connected to the central controller 10, to obtain a current wheel velocity of each wheel; determine a current vehicle velocity based on the current wheel velocity of each wheel, the current six-degrees-of-freedom inertia information, the steered wheel rotation angle, and the first vehicle velocity; determine a dynamic load of each wheel based on the current six-degrees-of-freedom inertia information, the steered wheel rotation angle, and an actual whole vehicle mass; determine a longitudinal force of each wheel based on the driving torque of each wheel and the braking torque of each wheel, and determine a slip ratio of each wheel based on the current wheel velocity of each wheel and the current vehicle velocity; and determine the second ground attachment information of each wheel based on the longitudinal force, the slip ratio, and the dynamic load of each wheel.

Specifically, the central controller 10 may determine the current six-degrees-of-freedom inertia information of the vehicle, the current wheel velocity of each wheel, the current vehicle velocity, and the actual whole vehicle mass in the foregoing manner. For details, refer to the foregoing, and details are not described herein again. Then, a dynamic load of each wheel is estimated based on the current six-degrees-of-freedom inertia information, the steered wheel rotation angle, geometric parameters of the vehicle, and the actual whole vehicle mass, a longitudinal force of each wheel is estimated based on the driving torque of each wheel in the power domain and the braking torque of each wheel in the chassis domain, and a slip ratio of each wheel is estimated based on the current wheel velocity of each wheel and the current vehicle velocity.

There are various manners of estimating the dynamic load of each wheel. For example, the longitudinal acceleration of each wheel may be calculated based on the current six-degrees-of-freedom inertia information, the steered wheel rotation angle, and the geometric parameters of the vehicle. For example, the current six-degrees-of-freedom inertia information may include a longitudinal acceleration, a transverse acceleration, and a longitudinal acceleration of the vehicle, and the geometric parameters of the vehicle may include a wheel track, a wheelbase, and the like of the vehicle. Then, the longitudinal acceleration of each wheel may be calculated based on the current six-degrees-of-freedom inertia information, the steered wheel rotation angle, and the geometric parameters of the vehicle through a specific conversion relationship. In addition, a static load of each wheel may be calculated based on the steered wheel rotation angle, the geometric parameters of the vehicle, and the actual whole vehicle mass. Then, according to the longitudinal acceleration and the static load of each wheel, a dynamic load of each wheel is obtained by querying a mapping relationship table of dynamic load-longitudinal acceleration-static load.

There are various manners of estimating the longitudinal force of each wheel. For example, the longitudinal force of each wheel may be obtained by obtaining a torque difference between the driving torque and the braking torque of each wheel.

There are various manners of estimating the slip ratio of each wheel. For example, the slip ratio of each wheel may be calculated based on a formula: slip ratio=(current vehicle velocity−current wheel velocity)/current vehicle velocity.

Finally, the second ground attachment information of each wheel is estimated based on the longitudinal force, the slip ratio, and the dynamic load of each wheel. There are a plurality of specific calculation manners. For example, the ratio of the longitudinal force to the dynamic load may be first obtained to obtain the second ground attachment information, then the preset mapping relationship table of the ground attachment information and the slide ratio is queried based on the slide ratio to obtain ground attachment correction information, and finally the second ground attachment information is corrected based on the ground attachment correction information to obtain the final second ground attachment information.

In some embodiments, the central controller 10 is configured to: determine a motion state of each wheel based on the current vehicle velocity and the current wheel velocity of each wheel; and perform weighting processing on the first ground attachment information and the second ground attachment information of each wheel based on the motion state of each wheel, to obtain the actual ground attachment information of each wheel.

Specifically, the central controller 10 may determine the current vehicle velocity of the vehicle and the current wheel velocity of each wheel in the foregoing manner. For details, refer to the foregoing, and details are not described herein again. Then, a motion state of each wheel is determined based on the current vehicle velocity and the current wheel velocity of each wheel. Operating states may include a gliding state, a slipping state, and a rotatable sliding state. The gliding state is a state in which the vehicle continues to travel in reliance on dynamic energy (an inertial force) or downhill potential energy of the vehicle during traveling, the slipping state is a state in which a vehicle velocity of the vehicle is greater than a wheel velocity during braking, and the rotatable sliding state is a state in which a wheel velocity of the vehicle is greater than a vehicle velocity during acceleration. For example, during braking of the vehicle, if the current vehicle velocity is greater than a current wheel velocity of a wheel (an appropriate error range may also be added), it is determined that the wheel is in a slipping state; or during driving of the vehicle, if the current vehicle velocity is less than a current wheel velocity of a wheel (an appropriate error range may also be added), it is determined that the wheel is in a rotatable sliding state. Finally, weighting processing is performed on the first ground attachment information and the second ground attachment information of each wheel based on the motion state of each wheel, to obtain the actual ground attachment information of each wheel.

In some embodiments, the central controller 10 is configured to: determine the actual ground attachment information as the first ground attachment information when the motion state is a gliding state; and determine the actual ground attachment information as the second ground attachment information when the motion state is a slipping state or a rotatable sliding state.

Specifically, when the vehicle is in the gliding state, accuracy of the second ground attachment information identified based on the dynamic information is low, so that in this case, the first ground attachment information identified based on the visual information is used as the actual ground attachment information; when the vehicle is in the slipping state or the rotatable sliding state, a reference value of the first ground attachment information identified based on the visual information is small, so that in this case, the second ground attachment information identified based on the dynamic information is used as the actual ground attachment information; and when the vehicle is in the normal traveling state, that is, an acceleration pedal or a braking pedal is stepped on and the vehicle is not in a locking state, weighting calculation is performed on the first ground attachment information and the second ground attachment information, to obtain the actual ground attachment information.

In the foregoing embodiment, the actual ground attachment information is identified by using the method for fusing the visual information and the dynamic information, and the ground attachment information may be estimated by using the visual information before being estimated by using the dynamic information, so that the actual ground attachment information with high accuracy and high real-time performance can be obtained, thereby improving the control performance of the vehicle.

In some embodiments, the central controller 10 is further configured to generate, when a matching degree between the ground feature information and each preset feature information is less than a preset matching degree, a new ground type corresponding to the ground feature information, and update a mapping relationship between the ground type and ground attachment information according to the ground feature information, the new ground type, and the second ground attachment information of each wheel.

Specifically, when identifying the actual ground type in combination with the ground feature information, if the ground feature information does not match each preset feature information in the feature information base, that is, the matching degree is less than the preset matching degree, the central controller 10 may select a ground type closest to the ground type corresponding to the preset feature information as the actual ground type, add a new ground type to the feature information base, and store the new ground type and the current ground feature information correspondingly. In addition, the central controller 10 further updates, based on the added new ground type and the current second ground attachment information of each wheel, the mapping relationship between the ground type and the ground attachment information. For example, when the ground attachment information in the mapping relationship table is the ground attachment information of the whole vehicle, an average value of the second ground attachment information of the wheels may be used as the ground attachment information corresponding to the new ground type; and when the ground attachment information in the mapping relationship table is the ground attachment information of each wheel, the second ground attachment information of each wheel may be used as the ground attachment information corresponding to the new ground type. In this way, self-learning of the algorithm is implemented.

In some embodiments, the ground state data includes actual ground profile information of each wheel, and the central controller 10 is configured to: perform height information collection on the ground image information, to obtain ground relief height information; and determine the actual ground profile information of each wheel based on the ground relief height information and trajectory planning information of each wheel.

Specifically, the central controller 10 may first perform preprocessing (such as denoising processing or enhancement processing) on the ground image information in the intelligent driving domain, and correct the preprocessed ground image information based on a position of an onboard camera that obtains the ground image information, to obtain more accurate longitudinal ground image information; then perform height information collection on the longitudinal ground image information, to obtain ground relief height information, such as a contour terrain map; and finally process the ground relief height information, for example, cut the contour terrain map according to the trajectory planning information of each wheel, to obtain actual ground profile information such as an actual ground profile curve of each wheel at the predicted trajectory. The trajectory planning information of each wheel may be predicted based on information such as the current vehicle velocity of the vehicle, the current six-degrees-of-freedom inertia information, and the steered wheel rotation angle.

In the foregoing embodiment, by fusing information in the power domain, the chassis domain, and the intelligent driving domain, the central controller can more accurately identify the ground state data, such as the actual ground profile information of each wheel, thereby facilitating control of the vehicle.

In some embodiments, the third data includes a plurality of pieces of vehicle surroundings information, and the central controller 10 is configured to perform fusion based on the plurality of pieces of vehicle surroundings information, to obtain the vehicle surrounding space data.

Specifically, the third functional domain 23 is an intelligent driving domain. Corresponding third data may include a plurality of pieces of vehicle surroundings information, and may specifically be preliminarily processed distance information, ground image information, position information, and the like. The central controller 10 may obtain, based on the distance information, the ground image information, the position information, and the like, vehicle surrounding space data, such as vehicle surrounding obstacle data and road data.

In some embodiments, the first functional domain 21 is a power domain, the second functional domain 22 is a chassis domain, the third functional domain 23 is an intelligent driving domain, and the central controller 10 is configured to perform decision-making fusion on the first data, the second data, and the third data, to obtain trajectory planning information.

Specifically, the central controller 10 may perform fusion processing on the first data, the second data, and the third data in the power domain, the chassis domain, and the intelligent driving domain. As described above, decision-making fusion mainly includes primary path planning based on surroundings information and correction planning based on a motion execution capability estimated during control fusion, to obtain more accurate trajectory planning information.

In some embodiments, the first data includes drive capability data of a drive assembly in the power domain, the second data includes braking capability data of a braking system and steering capability data of a steering system in the chassis domain, the third data includes a plurality of pieces of vehicle surroundings information, and the central controller 10 is configured to perform, based on the plurality of pieces of vehicle surroundings information, fusion to obtain vehicle surrounding space data, and perform trajectory planning based on the vehicle surrounding space data to obtain trajectory planning information, and correct, based on the drive capability data of the drive assembly, the braking capability data of the braking system, and the steering capability data of the steering system, the trajectory planning information to obtain corrected trajectory planning information.

Specifically, the central controller 10 may first obtain vehicle surrounding space data based on the foregoing manner, where for details, refer to the foregoing, and details are not described herein again, and perform primary path planning on the vehicle based on the vehicle surrounding space data, to obtain initial trajectory planning information; and then determine execution boundary information of the vehicle in combination with the drive capability data of the plurality of drive assemblies in the power domain, the braking capability data of the braking system in the chassis domain, and the steering capability data of the steering system in the chassis domain, and correct the initial trajectory planning information based on the execution boundary information, to obtain trajectory planning information of the vehicle that is more accurate and closer to the actuality.

In this way, in combination with the vehicle surroundings information and the control range of the vehicle, superior trajectory planning information can be obtained, and then a superior predictive control decision is made, to reduce hysteresis caused by feedback control, and improve performance of the vehicle.

In some embodiments, the first functional domain 21 is a power domain, a vehicle component in the power domain includes a drive assembly, the drive assembly includes a motor controller and a plurality of drive motors that are arranged in a one-to-one correspondence with wheels and that independently drive the wheels, the control information includes at least torque allocation information of each drive motor, and the central controller 10 is configured to send the torque allocation information to the motor controller according to a vehicle driving scenario.

Specifically, the plurality of different functional domains include a power domain. The power domain includes a plurality of drive motors that are arranged in a one-to-one correspondence with wheels and that independently drive the wheels, and a motor controller configured to control the drive motors to operate. The drive motor may provide a forward torque or a reverse torque, and the drive motor corresponding to each wheel may be independently controlled. That is to say, the power domain includes a four-motor power architecture. Therefore, independent driving of each wheel may be implemented based on the drive motor. For example, different wheels may be driven by torques in different directions or different magnitudes, thereby improving flexibility and stability of vehicle control, and helping satisfy a demand for safer, more reliable, and more convenient driving control in a vehicle driving scenario in a special operating condition.

The central controller 10 may further generate, according to the vehicle driving scenario, torque allocation information of each drive motor in the four-motor power architecture in the power domain, to satisfy, based on the torque allocation information, a demand for safer, more reliable, and more convenient driving control in a vehicle driving scenario in a special operating condition through the four-motor power architecture in the power domain. For example, the driving scenario includes, but is not limited to, a tire puncturing scenario, a floating scenario, an anti-skid scenario, and the like.

In this way, by designing a vehicle system architecture based on four-motor independent driving, flexibility and stability of vehicle control can be effectively improved, thereby helping satisfy a demand for safer, more reliable, and more convenient driving control in a vehicle driving scenario in a special operating condition. In addition, the electronic appliance architecture in which the central controller is directly connected to the vehicle components in each functional domain enables the central controller to obtain various state information of the vehicle most quickly and comprehensively, to provide strong data support for motor control in the power domain. Data fusion between the functional domains and the four-motor power architecture can provide fast and high-precision motor torques for motors independently, thereby increasing degrees of freedom and capabilities of vehicle control, and improving control safety of the vehicle. In addition, the electronic appliance architecture in which the central controller is directly connected to the vehicle components in each functional domain and the four-motor power architecture are complementary to each other. The electronic appliance architecture improves communication real-time performance and communication security (redundancy security), and provides a foundation for information fusion, decision-making, execution, and redundancy. The addition of the four-motor power architecture additionally provides four pieces of resolving information and four pieces of torque information corresponding to the wheels, and the torques of the wheels may be independently controlled, to provide a possibility for perception and execution expansion. The resolving provides a more real-time and accurate wheel rotation velocity, and real-time feedback of torque information of each wheel provides a more accurate reference for calculation of a relationship between the wheel and the ground. The characteristic of fast responding to the motor torque provides a possibility for fast and accurate control. The combination of the conventional domains, the electronic appliance architecture, and the four-motor power architecture can realize fast and accurate information identification, fast decision-making (decision-making is uniformly performed by the central controller and not graded), and fast, accurate, and stable execution, and finally build extreme safety of the vehicle.

In some embodiments, the torque allocation information includes at least a target torque of each drive motor, and the target torque includes a torque sign and a torque magnitude.

Specifically, the central controller 10 may generate, according to the vehicle driving scenario, target torques of the drive motors in the four-motor power architecture in the power domain, where the target torques may be positive torques or negative torques, and torque magnitudes and torque directions of the drive motors may be the same or different, and then perform differential control on the corresponding drive motors through the motor controller according to the target torques of the drive motors. In this way, flexibility and stability of vehicle control can be effectively improved, thereby helping satisfy a demand for safer, more reliable, and more convenient driving control in a vehicle driving scenario in a special operating condition.

In some embodiments, the central controller 10 is further configured to obtain a total demand torque of each drive motor according to the vehicle driving scenario, and allocate the total demand torque according to vehicle state information of the vehicle in a current driving scenario, to obtain the target torque of each drive motor.

Specifically, during traveling of the vehicle, one or more special driving scenarios may be involved, for example, including but not limited to a tire puncturing scenario, a floating scenario, an anti-skid scenario, and the like. The central controller 10 may generate, during traveling of the vehicle, related control information of the vehicle based on an actual driving demand, to control a drive assembly, a braking system, a steering system, a suspension system, and the like of the vehicle, so that the vehicle operates safely and stably; and in this process, identify the foregoing vehicle driving scenarios based on vehicle related information obtained from a plurality of functional domains, and correct a torque of a four-motor power architecture of the drive assembly for these vehicle driving scenarios, thereby realizing safe and stable operating in a special driving scenario.

For example, the central controller 10 may determine a total demand torque of each drive motor according to the actual driving demand, and then allocate the total demand torque according to the vehicle state information in the actual driving scenario, to obtain a target torque of each drive motor, including a torque magnitude and a torque direction. The vehicle state information includes, but is not limited to, a current vehicle velocity of the vehicle, current six-degrees-of-freedom of inertia information, a steering wheel rotation angle, a steered wheel rotation angle, a longitudinal acceleration, a current wheel velocity of each wheel, a wheel acceleration, a tire pressure, a driving torque, a braking torque, and the like.

For example, the vehicle driving scenario includes, but is not limited to, a tire puncturing scenario, a floating scenario, an anti-skid scenario, and the like. Using the tire puncturing scenario as an example, it is assumed that the vehicle is currently going straight ahead on a flat road at a constant velocity. According to a current driving demand of the driver, the central controller 10 may determine a total demand torque of each drive motor. When the vehicle has no tire punctured, the central controller 10 may allocate the total demand torque by using an average allocation method to obtain a target torque of each drive motor. When the vehicle has a tire punctured, the central controller 10 no longer allocates a total demand torque by using an average allocation method, but allocates a smaller or no torque to a drive motor corresponding to a wheel that has the tire punctured, to avoid vehicle destabilization, thereby satisfying a safer, more reliable, and more convenient driving control demand.

In some embodiments, the vehicle driving scenario includes a vehicle tire puncturing scenario, and the central controller 10 is configured to obtain a target corrected reverse torque of each drive motor according to the vehicle tire puncturing scenario, and allocate the target corrected reverse torque according to vehicle state information in the vehicle tire puncturing scenario, to obtain a target reverse torque of each drive motor.

Specifically, in the related art, when a vehicle has a tire punctured, a vehicle rotation direction is determined based on a steering wheel rotation angle, a yaw rate, and a center of mass slip angle, and vehicle stability control is performed in reliance on Electronic Stability Program (ESP) braking or Anti-lock Braking System (ABS) braking. However, merely relying on the EPS braking or the ABS braking cannot cover additional yaw caused by a limit operating condition such as tire puncturing, a case that stability control is performed by braking with a wheel having the tire punctured may occur, and vehicle stability control cannot be performed when a braking system fails. Based on this, in some embodiments of the present disclosure, when the vehicle has a tire punctured, a control advantage that the four-motor power architecture in the power domain can perform independent drive is fully utilized, so that the vehicle remains stable while braking and decelerating.

For example, when the vehicle has a tire punctured, the central controller 10 obtains a target corrected reverse torque (that is, a target corrected feedback torque) during vehicle tire puncturing, and allocates the target corrected reverse torque according to vehicle state information in a vehicle tire puncturing scenario, such as a wheel having the tire punctured, a current vehicle velocity, a current yaw rate, a steering wheel rotation angle, and the like, to obtain target reverse torques of the drive motors, so that based on the target reverse torques, the vehicle remains stable while braking and decelerating through the feedback braking characteristics of the drive motors.

In this way, after the vehicle has a tire punctured, the control advantage that the four-motor power architecture can perform independent drive can be fully utilized. By using the feedback braking control method, the vehicle remains stable while braking and decelerating, so that the braking control boundary of the tire puncturing is widened, and the response velocity and the control accuracy are both improved compared with those of the hydraulic braking system.

In some embodiments, the central controller 10 is configured to determine a first corrected reverse torque according to a current vehicle velocity, determine a second corrected reverse torque according to a difference between a target yaw rate and a current yaw rate, and determine the target corrected reverse torque according to the first corrected reverse torque and the second corrected reverse torque.

Specifically, the current vehicle velocity may be obtained by fusing the first wheel velocities of the wheels in the power domain, the second wheel velocities of the wheels and the first six-degrees-of-freedom inertia information in the chassis domain, the third wheel velocities of the wheels and the second six-degrees-of-freedom inertia information of the vehicle components directly connected to the central controller 10, and the first vehicle velocity in the intelligent driving domain as mentioned above. The first vehicle velocity may alternatively be used directly as the current vehicle velocity. Because the current vehicle velocity obtained by fusion has high accuracy, the current vehicle velocity obtained by fusion is preferred. Similarly, the current yaw rate may be obtained through the current six-degrees-of-freedom inertia information obtained by fusing the first six-degrees-of-freedom inertia information in the chassis domain and the second six-degrees-of-freedom inertia information of the vehicle components directly connected to the central controller 10 as mentioned above. The current yaw rate may alternatively be obtained through the first six-degrees-of-freedom inertia information or the second six-degrees-of-freedom inertia information. Since the current six-degrees-of-freedom inertia information is more accurate, the current yaw rate is preferably obtained based on the current six-degrees-of-freedom inertia information.

When the vehicle has a tire punctured, the central controller 10 may query a steering wheel-front wheel rotation angle relationship table according to the steering wheel rotation angle to obtain the front wheel rotation angle, where the table may be obtained through calibration in advance, and calculate, based on the front wheel rotation angle and the current vehicle velocity, the target yaw rate by using the following formula:

$$\gamma_{ss} = \frac{\delta}{\frac{L}{V_x} + \frac{m}{L}\left(\frac{l_f}{C_f} - \frac{l_r}{C_r}\right) \cdot V_x}$$

where $\gamma_{ss}$ is the target yaw rate, $\delta$ is the front-wheel rotation angle, $V_x$ is the current vehicle velocity, L is the front and rear wheelbase of the vehicle, m is the actual whole vehicle mass, $l_f$ is a distance between the center of mass of the vehicle and the front axle, $l_r$ is a distance between the center of mass of the vehicle and the rear axle, $C_f$ is the front-wheel cornering stiffness, and $C_r$ is the rear wheel cornering stiffness. It should be noted that The denominator in the formula includes the current vehicle velocity, and therefore division-by-zero prevention processing needs to be performed.

The central controller 10 may query, based on the current vehicle velocity, a pre-calibrated vehicle velocity-basic corrected reverse torque relationship table to obtain, as feed forward control, a basic corrected reverse torque required for correcting vehicle destabilization at the current vehicle velocity, that is, a first corrected reverse torque; additionally perform a Proportional Integral Derivative (PID) adjustment on a difference between the current yaw rate of the vehicle and the target yaw rate, to obtain, as feedback control, a PID corrected reverse torque required for adjusting the vehicle to reach the target yaw rate, that is, a second corrected reverse torque; and finally calculate weighted values of the first corrected reverse torque and the second corrected reverse torque, such as a sum of the weighted values of the first corrected reverse torque and the second corrected reverse torque, to obtain the target corrected reverse torque.

In this way, a closed loop of feed forward+feedback control is used to cope with the additional yaw caused because the vehicle has a tire punctured and is destabilized, so that the vehicle remains stable while braking and decelerating.

In some embodiments, the central controller 10 is further configured to determine a reverse torque allocation coefficient of each drive motor according to a vehicle steering state and the vehicle state information, and determine the target reverse torque of each drive motor based on the reverse torque allocation coefficient and the target corrected reverse torque.

Specifically, the vehicle steering state includes an under-steering state, an over-steering state, and a neutral state, and may be specifically determined based on a yaw rate difference between the current yaw rate and the target yaw rate. When an absolute value of the yaw rate difference is less than a preset threshold, it is considered that the vehicle is currently in the neutral state. When the current yaw rate and the target yaw rate have the same sign, the yaw rate difference is less than zero, and the absolute value of the yaw rate difference is greater than the preset threshold, it is considered that the vehicle is currently in the over-steering state; otherwise, it is considered that the vehicle is currently in the under-steering state.

The central controller 10 determines, based on the vehicle steering state and a wheel having the tire punctured, a reverse torque allocation coefficient of the drive motor corresponding to each wheel, and allocates, based on the reverse torque allocation coefficient, the target corrected reverse torque to obtain the target reverse torque of the drive motor corresponding to each wheel.

In some embodiments, the central controller 10 is configured to: determine, when the vehicle steering state is an under-steering state, that a reverse torque allocation coefficient of a drive motor corresponding to a tire punctured wheel is zero, that a reverse torque allocation coefficient of a drive motor corresponding to a normal wheel is greater than zero, and that a reverse torque allocation coefficient of a drive motor corresponding to a normal wheel on the same side as the tire punctured wheel is highest; or determine, when the vehicle steering state is an over-steering state, that a reverse torque allocation coefficient of a drive motor corresponding to a tire punctured wheel is zero, that a reverse torque allocation coefficient of a drive motor corresponding to a normal wheel is greater than zero, and that when a front wheel has a tire punctured, a reverse torque allocation coefficient of a drive motor corresponding to a normal wheel coaxial with the tire punctured wheel is highest; and that when a rear wheel has a tire punctured, a reverse torque allocation coefficient of a drive motor corresponding to a normal front wheel not on the same side as the tire punctured wheel is highest.

Specifically, when a front wheel has the tire punctured, if the vehicle is currently in the under-steering state, the front wheel has the tire punctured is no longer allocated a reverse torque, but a target corrected reverse torque is allocated to the remaining normal wheels, and a rear wheel on the same side as the front wheel is allocated a higher proportion of the target corrected reverse torque; or if the vehicle is currently in the over-steering state, the front wheel has the tire punctured is no longer allocated a reverse torque, but a target corrected reverse torque is allocated to the remaining normal wheels, and the other front wheel coaxial with the front wheel is allocated a higher proportion of the target corrected reverse torque. When a rear wheel has the tire punctured, if the vehicle is currently in the under-steering state, the rear wheel has the tire punctured is no longer allocated a reverse torque, but a target corrected reverse torque is allocated to the remaining normal wheels, and a front wheel on the same side as the rear wheel is allocated a higher proportion of the target corrected reverse torque; or if the vehicle is currently in the over-steering state, the rear wheel has the tire punctured is no longer allocated a reverse torque, but a target corrected reverse torque is allocated to the remaining normal wheels, and a front wheel not on the same side as the rear wheel is allocated a higher proportion of the target corrected reverse torque.

For example, a left front wheel is used as an example. When the left front wheel has the tire punctured, if the vehicle is currently in the under-steer state, the target corrected reverse torque is allocated to the remaining three wheels, and an allocation proportion of the left rear wheel is higher; or if the vehicle is currently in the over-steer state, the target corrected reverse torque is allocated to the remaining three wheels, and an allocation proportion of the right rear wheel is higher.

It should be noted that if the vehicle is currently in the neutral state, the wheel has the tire punctured is no longer allocated a reverse torque, but a target corrected reverse torque is evenly allocated to the remaining normal wheels.

After a reverse torque allocation coefficient of the drive motor corresponding to each wheel is determined based on the vehicle steering state and a wheel having the tire punctured, the reverse torque allocation coefficient may be multiplied by the target corrected reverse torque to obtain the target reverse torque of the drive motor corresponding to each wheel. For example, the target reverse torque of the drive motor corresponding to the left front wheel=the target corrected reverse torque×the reverse torque allocation coefficient of the drive motor corresponding to the left front wheel; the target reverse torque of the drive motor corresponding to the right front wheel=the target corrected reverse torque×the reverse torque allocation coefficient of the drive motor corresponding to the right front wheel; the target reverse torque of the drive motor corresponding to the left rear wheel=the target corrected reverse torque×the reverse torque allocation coefficient of the drive motor corresponding to the left rear wheel; the target reverse torque of the drive motor corresponding to the right rear wheel=the target corrected reverse torque×the reverse torque allocation coefficient of the drive motor corresponding to the right rear wheel.

In some embodiments, the central controller 10 may further activate, according to the target rotation direction of the vehicle and the vehicle tire puncturing status, an internal corresponding torque allocation control module to perform the foregoing torque allocation.

The target rotation direction of the vehicle may be determined based on the front wheel rotation angle. For example, when −1×the preset front wheel rotation angle threshold>the front wheel rotation angle, the target rotation direction is a left turn; when −1×the preset front wheel rotation angle threshold≤the front wheel rotation angle≤the preset front wheel rotation angle threshold, the target rotation direction is straight ahead; and when the preset front wheel rotation angle threshold<the front wheel rotation angle, the target rotation direction is a right turn.

The torque allocation control module may be a virtual module inside the central controller 10, and may include a left-turn torque allocation control module, a straight-ahead torque allocation control module, and a right-turn torque allocation control module, and each module includes a left-turn torque allocation control sub-module and a right-turn torque allocation control sub-module.

The central controller 10 may first select a corresponding torque allocation control module according to the target rotation direction of the vehicle, and then further activate, based on the vehicle tire puncturing status, a torque allocation control sub-module in the selected torque allocation control module, to perform torque allocation through the torque allocation control sub-module.

For example, when the target rotation direction is a left-turn, the left-turn torque allocation control module is selected; and when the vehicle tire punctured status is that the left wheel has the tire punctured, the left-turn torque allocation control sub-module in the left-turn torque allocation control module is activated, and when the vehicle tire punctured status is that the right wheel has the tire punctured, the right-turn torque allocation control sub-module in the left-turn torque allocation control module is activated. When the target rotation direction is straight ahead, the straight-ahead torque allocation control module is selected; and when the vehicle tire punctured status is that the left wheel has the tire punctured, the left-turn torque allocation control sub-module in the straight-ahead torque allocation control module is activated, and when the vehicle tire punctured status is that the right wheel has the tire punctured, the right-turn torque allocation control sub-module in the straight-ahead torque allocation control module is activated. When the target rotation direction is a right-turn, the right-turn torque allocation control module is selected; and when the vehicle tire punctured status is that the left wheel has the tire punctured, the left-turn torque allocation control sub-module in the right-turn torque allocation control module is activated, and when the vehicle tire punctured status is that the right wheel has the tire punctured, the right-turn torque allocation control sub-module in the right-turn torque allocation control module is activated. Then, the foregoing torque allocation is performed based on the activated torque allocation control sub-module.

In some embodiments, after the target reverse torque of the drive motor corresponding to each wheel is obtained, limit value processing may be further performed on the target reverse torque. For example, if the target reverse torque is less than or equal to the smaller of the current maximum reverse torque limit value of the vehicle and the correction torque limit value, the target reverse torque is used as the final target reverse torque. Otherwise, the smaller of the two limit values is used as the final target reverse torque. Further, smooth stabilization processing may be performed on the value-limited target reverse torque, thereby increasing smoothness in a vehicle control process, reducing vehicle destabilization, and improving riding experience of the user.

In some embodiments, the central controller 10 is further configured to obtain a total demand torque of each drive motor, and determine the target torque of each drive motor according to the total demand torque and the target reverse torque of each drive motor.

Specifically, when the vehicle has a tire punctured, the central controller 10 obtains a total demand torque of a drive motor corresponding to each wheel that is required for traveling of the vehicle; and calculates, based on an unexpected yaw rate generated by the vehicle tire puncturing, a target reverse torque of the drive motor corresponding to each wheel in the foregoing manner, and then superimposes the two torques to obtain a target torque of the drive motor corresponding to each wheel.

There are various manners of obtaining the total demand torque of the drive motor corresponding to each wheel. For example, taking the left front wheel having the tire punctured as an example, a total demand torque of the left front wheel=a whole vehicle demand torque×a front-rear demand torque allocation coefficient; a total demand torque of the right front wheel=the whole vehicle demand torque×the front-rear demand torque allocation coefficient; a total demand torque of the left rear wheel=the whole vehicle demand torque×(1−the front-rear demand torque allocation coefficient)×a left-right demand torque allocation coefficient+a reverse capability limiting torque; a total demand torque of the right rear wheel=the whole vehicle demand torque×(1−the front-rear demand torque allocation coefficient)×(1−the left-right demand torque allocation coefficient). It should be noted that The front-rear demand torque allocation coefficient is relative to the front and rear axle wheels of the vehicle, specifically, the front axle demand torque allocation coefficient, which can be obtained by pre-testing. The left-right demand torque allocation coefficient is relative to the left and right wheels of the vehicle, specifically, the left demand torque allocation coefficient, which can be obtained by pre-testing.

After the total demand torque of the drive motor corresponding to each wheel and the target reverse torque are calculated, the target torque of the drive motor corresponding to each wheel is obtained by superimposing the two torques. Finally, the central controller 10 sends the calculated target torque of the drive motor corresponding to each wheel to the motor controller, and the motor controller controls the corresponding drive motor.

In the foregoing embodiment, after the vehicle has a tire punctured, the vehicle state may be determined by using signals such as a current yaw rate of the vehicle, a steering wheel rotation angle, and a current vehicle velocity, and a target corrected reverse torque is calculated for de-skewing. The feedback braking torque is used to ensure that the vehicle remains stable while braking and decelerating. The advantage of four-motor independent control is fully utilized. In the feedback braking control manner, differential adjustment is performed on torques of wheels having no tire punctured, so that the braking control boundary of the tire puncturing is widened, and the response velocity and the control accuracy are both improved compared with those of the hydraulic braking system.

In some embodiments, the vehicle driving scenario includes a vehicle floating scenario, and the central controller 10 is configured to determine, when the vehicle is in a floating state, a pre-controlled torque and a torque correction amount of each wheel by using a motion control algorithm based on a target yaw rate, a current yaw rate, and a pre-controlled target wheel velocity and a current wheel velocity of each wheel, and determine the target torque of each drive motor according to the pre-controlled torque and the torque correction amount of each wheel.

Specifically, a control policy of an amphibious vehicle in the related art usually only distinguishes between a normal driving mode and a wading driving mode. In a floating state, an attitude of the whole vehicle cannot be controlled through torque control alone. Therefore, how to control the control accuracy and the control response characteristics of the floatable vehicle is a problem urgently to be resolved. Based on this, in some embodiments of the present disclosure, when the vehicle is in the floating scenario, the control advantage that the four-motor power architecture can perform independent drive is fully utilized, and double-closed-loop control is performed on the vehicle, to achieve floating of the vehicle, with better control accuracy and control response characteristics.

It should be noted that for obtaining the current yaw rate, reference is made to the foregoing. The current wheel velocity may be obtained by fusing the first wheel velocities of the wheels in the power domain, the second wheel velocities of the wheels in the chassis domain, and the third wheel velocities of the wheels for the vehicle components directly connected to the central controller 10 as mentioned above. The first wheel velocity, the second wheel velocity, or the third wheel velocity may alternatively be directly used as the current wheel velocity. Because the current wheel velocity obtained by fusion has high accuracy, the current wheel velocity obtained by fusion is preferred.

When determining that the vehicle is in the floating state, the central controller 10 may first determine the target wheel velocity correction amount of each wheel by using the first motion control algorithm according to the target yaw rate and the current yaw rate of the vehicle; then determine a pre-controlled torque and a torque correction amount of each wheel by using the second motion control algorithm according to the pre-controlled target wheel velocity, the current wheel velocity, and the target wheel velocity correction amount of each wheel; and finally determine the target torque of the drive motor corresponding to each wheel according to the pre-controlled torque and the torque correction amount of each wheel.

In this way, for the control advantage that the four-motor power architecture can perform independent drive, based on the double closed-loop control solution of the closed wheel velocity loop and the closed yaw rate loop, a complete double closed-loop control loop composed of the wheel velocity, the yaw rate, the feed forward control formed by the pre-controlled torque/wheel velocity, and the controller feedback control is formed, which has better control accuracy and control response characteristics.

For manners of sequentially determining the target wheel velocity correction amount, the pre-controlled torque, and the torque correction amount of each wheel by using different motion control methods, a plurality of implementations may be used, which are further specifically related to the current traveling state of the vehicle. For example, in a deep water scenario, a vehicle in a floating state may be divided into non-in-place turn traveling and in-place turn traveling. The non-in-place turn traveling may specifically include going straight ahead, slow turn or de-skewing in a process of going straight ahead, and the like. In full consideration of the characteristics that the four-motor power architecture is fast in control feedback and can perform independent control separately, in some embodiments of the present disclosure, different water-floating traveling control policies are further provided for non-in-place turn traveling and in-place turn traveling respectively.

In some embodiments, the central controller 10 is configured to: determine a target wheel velocity correction amount by using a first motion control algorithm according to the target yaw rate and the current yaw rate when the vehicle is in the floating state and makes a non-in-place turn, where the target yaw rate is determined according to a current vehicle velocity and a steering wheel rotation angle; and determine the torque correction amount by using a second motion control algorithm according to the target wheel velocity correction amount, the pre-controlled target wheel velocity, and the current wheel velocity, where the pre-controlled target wheel velocity and the pre-controlled torque are determined according to throttle information.

Specifically, the central controller 10 first determines a target yaw rate of the vehicle based on a preset steering wheel rotation angle-vehicle velocity-target yaw rate relationship according to a steering wheel rotation angle and a current vehicle velocity of the vehicle. Then, according to the target yaw rate and the current yaw rate of the vehicle, the target wheel velocity correction amount of each wheel is determined by using a first motion control algorithm, for example, a Proportional Integral (PI) control algorithm, a Proportional Derivative (PD) control algorithm, or a PID control algorithm. In addition, a pre-controlled target wheel velocity and a pre-controlled torque of each wheel are determined based on a preset throttle-target wheel velocity-motor pre-controlled torque relationship according to a throttle opening degree of the vehicle. Then, a torque correction amount of each wheel is determined by using the second motion control algorithm such as a PI control algorithm, a PD control algorithm, or a PID control algorithm according to the pre-controlled target wheel velocity, the current wheel velocity, and the target wheel velocity correction amount of each wheel. Finally, the target torque of the drive motor corresponding to each wheel is determined according to the pre-controlled torque and the torque correction amount of each wheel.

Figure 11:
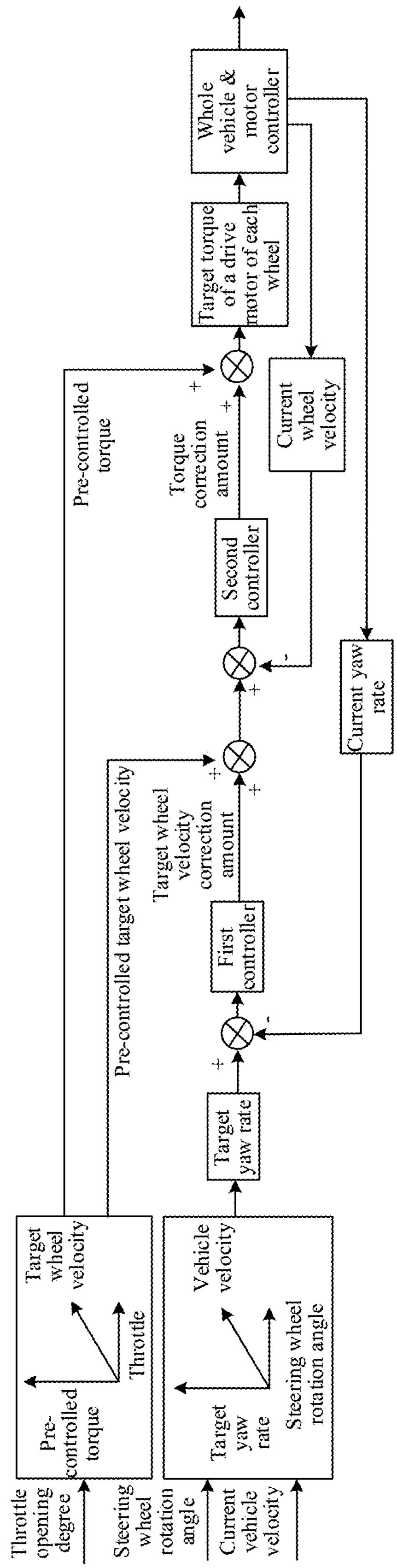
FIG. 11 is a flowchart of performing control and calculation when a vehicle is in a floating state and makes a non-in-place turn according to an embodiment of the present disclosure.

As a specific example, referring to FIG. 11, first, according to a throttle opening degree, a throttle-target wheel velocity-motor pre-controlled torque curve is looked up, to obtain a required pre-controlled target wheel velocity and a pre-controlled torque of the drive motor respectively at the throttle opening degree. In addition, according to the steering wheel rotation angle and the current vehicle velocity, a steering wheel rotation angle-vehicle velocity-target yaw rate curve is looked up to obtain the target yaw rate required for steering under the conditions of the current steering wheel rotation angle and the current vehicle velocity. The current yaw rate is subtracted from the target yaw rate by using an adder to obtain a yaw rate response deviation. Then, the yaw rate response deviation is inputted to an input end of a first controller as an input signal of the first controller. The first controller may be a PI controller, a PD controller, or a PID controller. An output signal of the first controller is used as the target wheel velocity correction amount and is added to the pre-controlled target wheel velocity by using the adder to obtain the target wheel velocity. The current wheel velocity is subtracted from the target wheel velocity by using the adder to obtain a wheel velocity response deviation. The wheel velocity response deviation is inputted to an input end of a second controller as an input signal of the second controller. The second controller may be a PI controller, a PD controller, or a PID controller. An output signal of the second controller is used as the torque correction amount and is added to the pre-controlled torque by using the adder to obtain the target torque of the drive motor corresponding to each wheel. After receiving a target torque signal of the drive motor, the motor controller performs drive motor torque control.

In this way, based on the double closed-loop control solution of the closed wheel velocity loop and the closed yaw rate loop, a complete double closed-loop control loop composed of the wheel velocity, the yaw rate, the feed forward control formed by the pre-controlled torque/wheel velocity, and the controller feedback control is formed, which has better control accuracy and control response characteristics.

In some embodiments, the central controller 10 is configured to: determine a target wheel velocity correction amount by using a first motion control algorithm according to the target yaw rate and the current yaw rate when the vehicle is in the floating state and makes an in-place turn in a driver mode, where the target yaw rate is determined according to throttle information and an initial target yaw rate; and determine the torque correction amount by using a second motion control algorithm according to the target wheel velocity correction amount, the pre-controlled target wheel velocity, and the current wheel velocity, where the pre-controlled target wheel velocity and the pre-controlled torque are determined according to the target yaw rate.

Specifically, the in-place turn traveling is further divided into an in-place turn in a driver mode and an in-place turn in an automatic mode. The in-place turn in the driver mode means that a driver directly controls a steering wheel and a throttle to drive the vehicle to make an in-place turn. The in-place turn in the automatic mode means that the driver only inputs the target rotation direction and the target rotation angle, and the autonomous driving system automatically controls the vehicle to make an in-place turn. In addition, different water-floating traveling control policies are provided for the in-place turn in the driver mode and the in-place turn in the automatic mode respectively.

When the vehicle is in the floating state and makes an in-place turn in the driver mode, the central controller 10 first determines a current target yaw rate of the vehicle based on a preset throttle-yaw rate increment relationship according to a throttle opening degree of the vehicle and an initial target yaw rate; and then determines the target wheel velocity correction amount of each wheel of the vehicle by using the first motion control algorithm such as a PI control algorithm, a PD control algorithm, or a PID control algorithm according to the current target yaw rate and the current yaw rate of the vehicle. In addition, a pre-controlled target wheel velocity and a pre-controlled torque of each wheel may be first determined based on a preset target yaw rate-target wheel velocity-motor pre-controlled torque relationship according to the target yaw rate of the vehicle. Then, a torque correction amount of each wheel is determined by using the second motion control algorithm such as a PI control algorithm, a PD control algorithm, or a PID control algorithm according to the pre-controlled target wheel velocity, the current wheel velocity, and the target wheel velocity correction amount of each wheel. Finally, the target torque of the drive motor corresponding to each wheel is determined according to the pre-controlled torque and the torque correction amount of each wheel.

Figure 12:
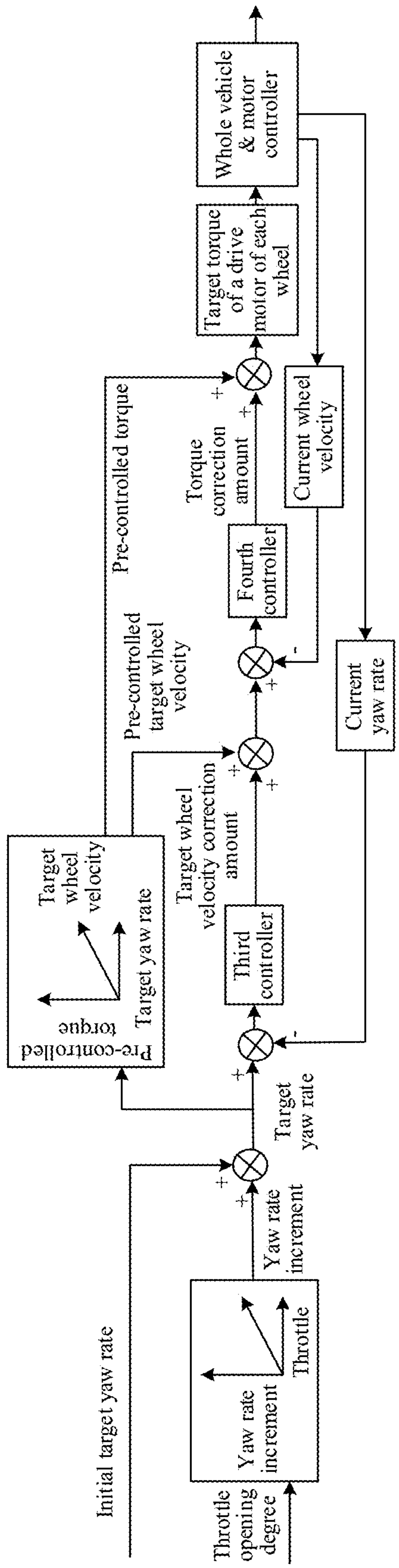
FIG. 12 is a flowchart of performing control and calculation when a vehicle is in a floating state and makes an in-place turn in a driver mode according to an embodiment of the present disclosure.

As a specific example, referring to FIG. 12, first, according to a throttle opening degree, a throttle-yaw rate increment curve is looked up, to obtain a yaw rate increment at the throttle opening degree. The yaw rate increment and an initial target yaw rate are added by an adder to obtain a total target yaw rate. The initial target yaw rate is such set that even when the driver does not step on the gas, the vehicle still has an initial default rotation velocity.

A target yaw rate-target wheel velocity-motor pre-controlled torque curve is looked up according to the total target yaw rate, to obtain a required pre-controlled target wheel velocity and a pre-controlled torque of the drive motor respectively at the target yaw rate. In addition, the current yaw rate is subtracted from the total target yaw rate by using an adder to obtain a yaw rate response deviation. Then, the yaw rate response deviation is inputted to an input end of a third controller as an input signal of the third controller. The third controller may be a PI controller, a PD controller, or a PID controller. An output signal of the third controller is used as the target wheel velocity correction amount and is added to the pre-controlled target wheel velocity by using the adder to obtain the target wheel velocity. The current wheel velocity is subtracted from the target wheel velocity by using the adder to obtain a wheel velocity response deviation. The wheel velocity response deviation is inputted to an input end of a fourth controller as an input signal of the fourth controller. The fourth controller may be a PI controller, a PD controller, or a PID controller. An output signal of the fourth controller is used as the torque correction amount and is added to the pre-controlled torque by using the adder to obtain the target torque of the drive motor corresponding to each wheel. After receiving a target torque signal of the drive motor, the motor controller performs drive motor torque control.

In this way, based on the double closed-loop control solution of the closed wheel velocity loop and the closed yaw rate loop, a complete double closed-loop control loop composed of the wheel velocity, the yaw rate, the feed forward control formed by the pre-controlled torque/wheel velocity, and the controller feedback control is formed, which has better control accuracy and control response characteristics.

In some embodiments, the central controller 10 is configured to: determine a target wheel velocity correction amount by using a first motion control algorithm according to a target rotation angle of the vehicle, the target yaw rate, and the current yaw rate when the vehicle is in the floating state and makes an in-place turn in an automatic mode; and determine the torque correction amount by using a second motion control algorithm according to the target wheel velocity correction amount, the pre-controlled target wheel velocity, and the current wheel velocity, where the pre-controlled target wheel velocity and the pre-controlled torque are determined according to the target yaw rate.

Specifically, when the vehicle is in the floating state and makes an in-place turn in the automatic mode, the central controller 10 determines the target wheel velocity correction amount of each wheel by using the first motion control algorithm such as a PI control algorithm, a PD control algorithm, or a PID control algorithm according to the target yaw rate, the current yaw rate, and the target rotation angle of the vehicle. The target rotation angle is a target rotation angle parameter inputted in the automatic mode, and the vehicle may turn left or right, which is specifically embodied in the target rotation angle. In addition, a pre-controlled target wheel velocity and a pre-controlled torque of each wheel are determined based on a preset target yaw rate-target wheel velocity-motor pre-controlled torque relationship according to the target yaw rate of the vehicle. Then, a torque correction amount of each wheel is determined by using the second motion control algorithm such as a PI control algorithm, a PD control algorithm, or a PID control algorithm according to the pre-controlled target wheel velocity, the wheel velocity, and the target wheel velocity correction amount of each wheel. Finally, the target torque of the drive motor corresponding to each wheel is determined according to the pre-controlled torque and the torque correction amount of each wheel.

As a specific example, in the water-floating in-place turn control state of the automatic mode, a control target of the vehicle is to rotate through the received inputted target rotation angle according to a preset rotational angular velocity. Correction control is performed in a closed-loop velocity control manner based on the angular rotation velocity when the actual rotational angular velocity deviates greatly from the preset angular rotation velocity. Correction control is performed in a closed-loop position control manner based on the angular rotation velocity when the actual rotational angular velocity is close to the target rotational angular velocity.

Figure 13:
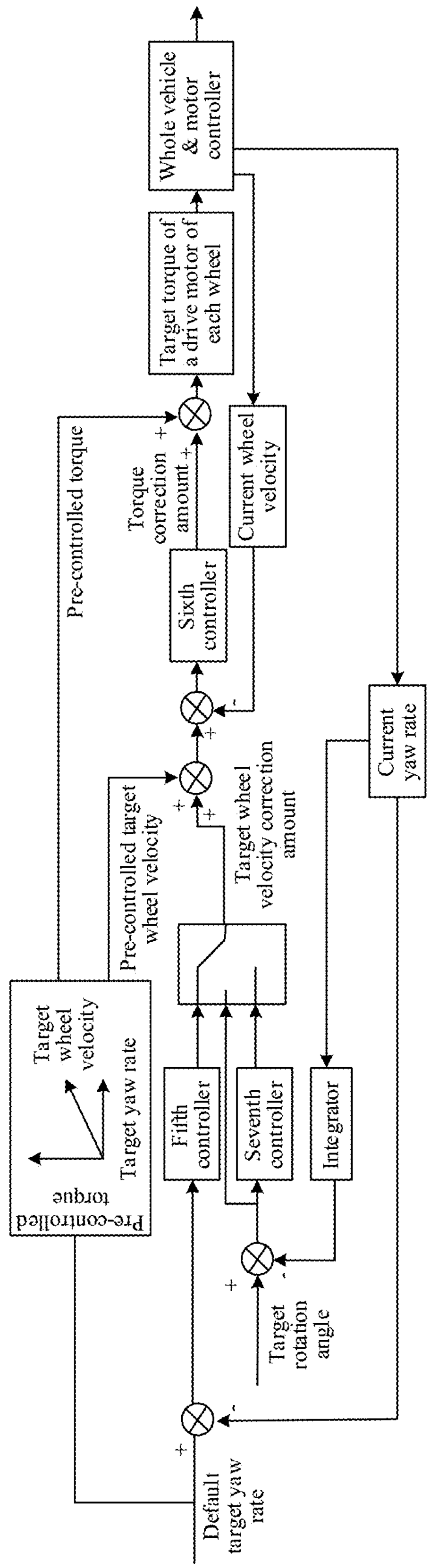
FIG. 13 is a flowchart of performing control and calculation when a vehicle is in a floating state and makes an in-place turn in an automatic mode according to an embodiment of the present disclosure.

Referring to FIG. 13, first, a target yaw rate-target wheel velocity-motor pre-controlled torque curve is looked up according to the preset target yaw rate, to obtain a required pre-controlled target wheel velocity and a pre-controlled torque of the drive motor at the rotation velocity. In an aspect, the current yaw rate is subtracted from the target yaw rate by using an adder to obtain a yaw rate response deviation. Then, the yaw rate response deviation is inputted to an input end of a fifth controller as an input signal of the fifth controller. The fifth controller may be a PI controller, a PD controller, or a PID controller. In another aspect, an actual yaw angle is obtained from the current yaw rate through an integrator. After the actual yaw angle is subtracted from the target rotation angle by using an adder, a yaw angle response deviation is obtained. Then, the yaw angle response deviation is inputted to an input end of a seventh controller as an input signal of the seventh controller. The seventh controller may be a PI controller, a PD controller, or a PID controller. The yaw angle response deviation obtained through subtraction by the adder, an output end of the fifth controller, and an output end of the seventh controller are separately inputted to a comparison selector. When the yaw angle response deviation is greater than a threshold, a target wheel velocity correction amount=an output result of the fifth controller; otherwise, the target wheel velocity correction amount=an output result of the seventh controller. In this way, switching between the two control algorithms of the fifth controller and the seventh controller is implemented.

The target wheel velocity correction amount is added to the pre-controlled target wheel velocity by using the adder to obtain the target wheel velocity. The current wheel velocity is subtracted from the target wheel velocity by using the adder to obtain a wheel velocity response deviation. The wheel velocity response deviation is inputted to an input end of a sixth controller as an input signal of the sixth controller. The sixth controller may be a PI controller, a PD controller, or a PID controller. An output signal of the sixth controller is used as the torque correction amount and is added to the pre-controlled torque by using the adder to obtain the target torque of the drive motor corresponding to each wheel. After receiving a target torque signal of the drive motor, the motor controller performs drive motor torque control.

In this way, based on the double closed-loop control solution of the closed wheel velocity loop and the closed yaw rate loop, a complete double closed-loop control loop composed of the wheel velocity, the yaw rate, the feed forward control formed by the pre-controlled torque/wheel velocity, and the controller feedback control is formed, which has better control accuracy and control response characteristics.

In the foregoing embodiment, based on the four-motor power architecture, when the vehicle is in a floating state, a pre-controlled torque and a torque correction amount of each wheel are determined by using a motion control algorithm according to a target yaw rate and a current yaw rate of the vehicle, and a pre-controlled target wheel velocity and a current wheel velocity of each wheel of the vehicle. Then, the target torque outputted by the drive motor corresponding to each wheel is determined according to the pre-controlled torque and the torque correction amount of each wheel, to control traveling of the vehicle. In this way, based on the double closed-loop control solution of the closed wheel velocity loop and the closed yaw rate loop, a complete double closed-loop control loop composed of the wheel velocity, the yaw rate, the feed forward control formed by the pre-controlled torque/wheel velocity, and the controller feedback control is formed, which has better control accuracy and control response characteristics.

In some embodiments, the vehicle driving scenario includes a vehicle anti-skid scenario, and the central controller 10 is configured to obtain, when the vehicle is in the vehicle anti-skid scenario, an adjustment torque of each wheel, determine a front axle adjustment torque and a rear axle adjustment torque according to the adjustment torque of each wheel, and determine the target torque of each drive motor according to the front axle adjustment torque and the rear axle adjustment torque.

Specifically, during traveling of the vehicle, a case that a wheel slips and a case that a wheel reversely slips in a differential operating condition often occur. Therefore, different torque control policies need to be formulated for different wheel slipping conditions to achieve vehicle anti-skid. In the related art, vehicle anti-skid is mainly implemented mainly by using a Traction Control System (TCS) and an ABS. The TCS function is aimed at driving force control after a wheel velocity of a wheel abnormally increases in a driving condition, and the ABS function is aimed at braking torque control when a wheel velocity decreases in a braking condition. The ABS function is not activated in the driving condition. When an inner wheel slips, a wheel velocity first decreases and then the inner wheel reverses. A conventional TCS cannot identify this condition, and current solutions usually use a single-wheel torque reduction technology. If single-wheel control is still used in a differential operating condition, an unexpected yaw torque is generated on a wheel, thereby affecting an attitude of the vehicle body. In conclusion, in the related art, no special identification and anti-skid control are performed on reverse wheel slipping in a differential operating condition. As a result, a differential function of the vehicle still has specific limitations in terms of safety and reliability. Based on this, in some embodiments of the present disclosure, during anti-skid, the control advantage that the four-motor power architecture can perform independent drive is fully utilized to avoid vehicle slipping.

For example, in some embodiments, the central controller 10 may calculate the PID adjustment torque corresponding to each wheel, and then determine the target torque of the drive motor corresponding to each wheel according to the PID adjustment torque corresponding to each wheel. For example, Using the left front wheel as an example, the central controller 10 obtains a difference between a current wheel velocity of the left front wheel and a current vehicle velocity, and performs PID adjustment on the difference, to obtain a torque magnitude that needs to be adjusted for the wheel end torque in order to control the wheel velocity of the left front wheel, that is, a PID adjustment torque of the left front wheel; and then may determine the target torque corresponding to the left front wheel according to the PID adjustment torque corresponding to the left front wheel. Calculation processes of the other wheels are the same as that of the left front wheel, and details are not described herein again.

In some embodiments, when the PID adjustment is performed on the difference between the current wheel velocity of each wheel and the current vehicle velocity to obtain the PID adjustment torque of each wheel, a corresponding proportional coefficient is determined based on the difference, an integral coefficient is determined based on an integral value of the difference, and a derivative coefficient is determined based on a derivative value of the difference. Still using the left front wheel as an example, after obtaining the difference between the current wheel velocity of the left front wheel and the current vehicle velocity, the central controller 10 obtains a proportional coefficient through a look-up table based on the difference, integrates the difference to obtain an integral value, obtains an integral coefficient through a look-up table based on the integral value, differentiates the difference to obtain a differential value, and obtains a differential coefficient through a look-up table based on the differential value. Calculation processes of the other wheels are the same as that of the left front wheel, and details are not described herein again.

When determining the target torque of the drive motor corresponding to each wheel based on the adjustment torque of each wheel, the central controller 10 may first determine a front axle adjustment torque and a rear axle adjustment torque according to the adjustment torque of each wheel, and then determine the target torque of each drive motor according to the front axle adjustment torque and the rear axle adjustment torque.

It may be understood that, the target torque of the drive motor corresponding to each wheel is determined according to the front axle adjustment torque and the rear axle adjustment torque, and then the torque allocation may be performed on each wheel according to the target torque of the drive motor corresponding to each wheel to achieve the torque adjustment of each wheel. The front axle adjustment torque and the rear axle adjustment torque are calculated to achieve the torque synchronization control.

Figure 14:
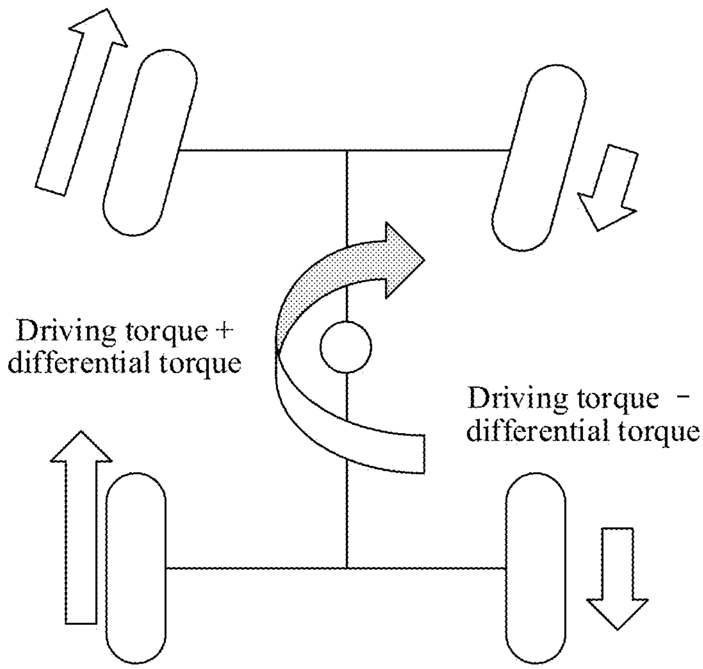
FIG. 14 is a schematic diagram of wheel torque allocation in a differential operating condition according to an embodiment of the present disclosure.

Specifically, referring to FIG. 14, Since a vehicle is currently in a differential state, in addition to a driving torque, a differential torque in an opposite direction is further exerted on coaxial wheels. If torque reduction control is performed on only a slipping wheel, an unexpected yaw torque is generated in the whole vehicle, and a longitudinal force of the vehicle changes, resulting in situations such as drifting, head pushing, or vehicle velocity anomalies of the vehicle. Therefore, in the differential state, after the wheel slips, synchronous adjustment needs to be performed on the coaxial wheels. Therefore, according to the adjustment torque of each wheel, a front axle adjustment torque and a rear axle adjustment torque corresponding to the vehicle are determined. Therefore, a target torque of a drive motor corresponding to each wheel is determined according to the front axle adjustment torque and the rear axle adjustment torque. In this way, synchronous adjustment and control of the torques of the coaxial wheels can be implemented, to avoid the generation of an unexpected yaw torque of the whole vehicle, and to prevent situations such as drifting, head pushing, or vehicle velocity anomalies of the vehicle from being caused.

For example, the central controller 10 may first determine a front axle PID adjustment torque and a rear axle PID adjustment torque corresponding to the vehicle according to the PID adjustment torque of each wheel, and then determine the target torque of the drive motor corresponding to each wheel according to the front axle PID adjustment torque and the rear axle PID adjustment torque.

In some embodiments, the central controller 10 is configured to: determine, when at least one of front axle wheels slips, the front axle adjustment torque according to a maximum adjustment torque in the front axle wheels, and determine the rear axle adjustment torque according to a maximum adjustment torque in the front axle wheels and rear axle wheels; and determine, when none of the front axle wheels slip, the rear axle adjustment torque according to a maximum adjustment torque in the rear axle wheels, and that the front axle adjustment torque is zero.

Specifically, when determining the front axle adjustment torque and the rear axle adjustment torque corresponding to the vehicle according to the adjustment torque of each wheel, the central controller 10 calculates, if at least one of the left front wheel and the right front wheel slips, that is, when the front axle slips, the front axle adjustment torque and the rear axle adjustment torque according to a first calculation policy; and calculates, if neither the left front wheel nor the right front wheel slips, that is, when the front axle does not slip, the front axle adjustment torque and the rear axle adjustment torque according to a second calculation policy.

The first calculation policy means that the maximum of the adjustment torque of the left front wheel and the adjustment torque of the right front wheel is used as the front axle adjustment torque, and the maximum of the adjustment torque of the left front wheel, the adjustment torque of the right front wheel, the adjustment torque of the left rear wheel, and the adjustment torque of the right rear wheel is used as the rear axle adjustment torque. The second calculation policy means that the front axle adjustment torque is zero, and the maximum of the adjustment torque of the left rear wheel and the adjustment torque of the right rear wheel is used as the rear axle adjustment torque.

Specifically, when a front axle wheel slips during traveling of the vehicle, occurrence of a wheel slipping problem also has a high probability when a rear axle wheel passes over the road surface. Therefore, after the front axle wheel slips, the differential torque of the rear axle is adjusted, which is beneficial to reducing the frequency of wheel slipping. To be specific, the adjustment torques of the front and rear axles are calculated by using the first calculation policy. When a front axle wheel does not slip, it cannot be determined that a rear axle wheel definitely does not slip. Therefore, the differential torque of the rear axle can be adjusted, which is beneficial to reducing the frequency at which the rear axle wheel slips. To be specific, the adjustment torques of the front and rear axles are calculated by using the second calculation policy.

In some embodiments, the central controller 10 is configured to: determine, when torque directions of an inner steered wheel and an outer steered wheel of the vehicle are opposite, a target torque corresponding to a drive motor of a front axle wheel according to a wheel end torque before anti-skid control intervention of the front axle wheel and the front axle adjustment torque, and determine a target torque corresponding to a drive motor of a rear axle wheel according to a wheel end torque before anti-skid control intervention of the rear axle wheel and the rear axle adjustment torque; or determine, when torque directions of an inner steered wheel and an outer steered wheel of the vehicle are the same, a target torque corresponding to a drive motor of a front axle wheel according to a relationship between a difference between a wheel end torque before anti-skid control intervention of the front axle wheel and the front axle adjustment torque and zero, and determine a target torque corresponding to a drive motor of a rear axle wheel according to a relationship between a difference between a wheel end torque before anti-skid control intervention of the rear axle wheel and the rear axle adjustment torque and zero.

Specifically, after obtaining the front axle adjustment torque and the rear axle adjustment torque, the central controller 10 may determine the target torque of the drive motor corresponding to each wheel according to the front axle adjustment torque and the rear axle adjustment torque. For example, referring to FIG. 14, when it is determined that the vehicle is currently in a differential operating condition, in the differential operating condition, a driving torque in a direction opposite to a traveling direction may be exerted on the inner steered wheel. Therefore, different torque adjustment solutions are respectively made for forward slipping and reverse slipping of the inner steered wheel. That is to say, when the torque directions of the inner steered wheel and the outer steered wheel of the vehicle are opposite, the target torque of the drive motor corresponding to each wheel is calculated by using a third calculation policy; and when the torque directions of the inner steered wheel and the outer steered wheel of the vehicle are the same, the target torque of the drive motor corresponding to each wheel is calculated by using a fourth calculation policy.

In this way, a separate control policy is formulated for the condition of reverse slipping of the inner turning wheel, which can improve reliability of a differential function of the vehicle and safety of the vehicle.

The third calculation policy is expressed by the following formula:

$$\begin{cases} T_{lft} = T_{lfi} + d * \Delta T_F \\ T_{rft} = T_{rfi} - d * \Delta T_F \\ T_{lrt} = T_{lri} + d * \Delta T_R \\ T_{rrt} = T_{rri} - d * \Delta T_R \end{cases}$$

where $T_{lft}$ is a target torque of a drive motor corresponding to a left front wheel, $T_{lfi}$ is a wheel end torque of the left front wheel before anti-skid control intervention, $T_{rft}$ is a target torque of a drive motor corresponding to a right front wheel, $T_{rfi}$ is a wheel end torque of the right front wheel before anti-skid control intervention, $T_{lft}$ is a target torque of a drive motor corresponding to a left rear wheel, $T_{lri}$ is a wheel end torque of the left rear wheel before anti-skid control intervention, $T_{rrt}$ is a target torque of a drive motor corresponding to a right rear wheel, $T_{rri}$ is a wheel end torque of the right rear wheel before anti-skid control intervention, $\Delta T_F$ is a front axle adjustment torque, $\Delta T_R$ is a rear axle adjustment torque, and d is a vehicle rotation direction.

It should be noted that different vehicle rotation directions correspond to different values. For example, it is set that when the vehicle turns left, the vehicle rotation direction is 1, that is, d=1, and when the vehicle turns right, the vehicle rotation direction is −1, that is, d=−1.

Based on this, when the vehicle turns left, the third calculation policy is expressed by the following formula:

$$\begin{cases} T_{lft} = T_{lfi} + \Delta T_F \\ T_{rft} = T_{rfi} - \Delta T_F \\ T_{lrt} = T_{lri} + \Delta T_R \\ T_{rrt} = T_{rri} - \Delta T_R \end{cases}$$

When the vehicle turns right, the third calculation policy is expressed by the following formula:

$$\begin{cases} T_{lft} = T_{lfi} - \Delta T_F \\ T_{rft} = T_{rfi} + \Delta T_F \\ T_{lrt} = T_{lri} - \Delta T_R \\ T_{rrt} = T_{rri} + \Delta T_R \end{cases}$$

The fourth calculation policy is expressed by the following formula:

$$\begin{cases} T_{lft} = \max(T_{lfi} - \Delta T_F, 0) \\ T_{rft} = \max(T_{rfi} - \Delta T_F, 0) \\ T_{lrt} = \max(T_{lri} - \Delta T_R, 0) \\ T_{rrt} = \max(T_{rri} - \Delta T_R, 0) \end{cases}$$

In this way, through the third calculation policy or the fourth calculation policy, the target torque of the drive motor corresponding to each wheel may be calculated, and then torque allocation is performed on a corresponding wheel according to the target torque of the drive motor corresponding to each wheel, so that an output torque of each wheel is adapted to the current traveling condition of the vehicle, to reduce the frequency of vehicle slipping, and ensure that in a differential operating condition, the vehicle does not generate an additional yaw torque after a single wheel slips and has the torque reduced, thereby avoiding affecting the attitude of the vehicle body and ensuring a riding feeling of a person in the vehicle.

In some embodiments, the central controller 10 is further configured to perform torque limitation and smooth stabilization processing on the target torque. For example, the target torque may be limited by using a maximum available torque limit of a drive motor of the vehicle. Further, Smooth stabilization processing is performed on the limited target torque. Specifically, the smooth stabilization processing may be performed through first-order filtering and a set torque change step size limit. By performing the torque limitation and the smooth stabilization processing on the target torque, smoothness in a vehicle control process can be increased, and vehicle destabilization can be reduced, thereby improving riding experience of the user.

In the foregoing embodiment, for the control advantage that the four-motor power architecture can perform independent drive, during anti-skid control of the vehicle, target torques of the drive motors corresponding to the wheels of the vehicle are calculated, and torque adjustment is performed on the wheels according to the target torques of the drive motors corresponding to the wheels, to perform anti-skid control of the vehicle in a differential operating condition. In addition, by classifying differential states of the vehicle, an identification solution is optimized for a wheel slipping problem in a differential operating condition, and different driving torque control logics are used. For example, a coaxial control policy is adopted for a slipping wheel, and a control policy is formulated for an operating condition in which an inner steered wheel reversely slips, to ensure that the wheel can be identified in time when the wheel reversely slips, expand a usage scenario of the differential function, avoid phenomena such as high-velocity wheel slipping and body attitude deflection of the vehicle, and improve reliability of the differential function of the vehicle and user experience.

In some embodiments, the central controller is further configured to identify the vehicle driving scenario.

Specifically, the central controller 10 may obtain related data of vehicle components in a plurality of functional domains, fuse the related data to obtain fused data, and then identify, based on the fused data and in combination with the related data, a vehicle driving scenario, such as a vehicle tire puncturing scenario, a vehicle floating scenario, and whether the vehicle is in an anti-skid scenario. Based on fusion of the related data, accuracy of vehicle driving scenario recognition can be improved.

In some embodiments, the central controller 10 is further configured to obtain first data of at least one vehicle component in the first functional domain 21 and second data of at least one vehicle component in the second functional domain 22, perform fusion processing on the first data and the second data to obtain fused data, and identify the vehicle driving scenario according to the fused data.

For example, the vehicle driving scenario includes one or more of a vehicle tire puncturing scenario, a vehicle floating scenario, and a vehicle anti-skid scenario. The central controller 10 may obtain data related to a to-be-identified vehicle driving scenario from a plurality of functional domains, and then identify a corresponding vehicle driving scenario based on the data. For example, first data and second data may be obtained from the first functional domain 21 and the second functional domain 22 respectively, and a corresponding vehicle driving scenario is identified based on the first data and the second data. The first data represents a vehicle state obtained by at least one vehicle component in the first functional domain 21, and the second data represents a vehicle state obtained by at least one vehicle component in the second functional domain 22. For example, the first functional domain 21 is a power domain, and a first wheel velocity and the like of each wheel may be obtained from the power domain. The second functional domain 22 may be a chassis domain, and a second wheel velocity and the like of each wheel may be obtained from the chassis domain. Specifically, the obtained data is related to the to-be-identified vehicle driving scenario.

In some embodiments, the vehicle driving scenario includes a vehicle tire puncturing scenario, the second functional domain 22 is a chassis domain, and the central controller 10 is configured to obtain first data of at least one vehicle component in the power domain and second data of at least one vehicle component in the chassis domain, perform fusion processing on the first data and the second data to obtain fused data, and identify the vehicle tire puncturing scenario according to the fused data.

Specifically, the central controller 10 may obtain related data in the power domain and the chassis domain, and accurately identify the vehicle tire puncturing scenario based on the related data, to determine the target torques of the drive motors in the foregoing manner when the vehicle has a tire punctured, and control the corresponding drive motors based on the target torques, so that the vehicle remains stable while braking and decelerating.

In some embodiments, the first data includes a first wheel velocity of each wheel, the second data includes a second wheel velocity of each wheel, and the central controller 10 is configured to: fuse the first wheel velocity of each wheel, the second wheel velocity of each wheel, and a third wheel velocity of each wheel for a vehicle component directly connected to the central controller, to obtain a current wheel velocity of each wheel; determine a first wheel velocity difference and a plurality of wheel velocity difference deviations of each wheel according to the current wheel velocity of each wheel; and identify, based on the first wheel velocity difference and the plurality of wheel velocity difference deviations of each wheel, the vehicle tire puncturing scenario and vehicle state information under the vehicle tire puncturing scenario.

Specifically, during vehicle tire puncturing scenario identification, the central controller 10 may first fuse the first wheel velocity of each wheel, the second wheel velocity of each wheel, and a third wheel velocity of each wheel for a vehicle component directly connected to the central controller 10, to obtain a current wheel velocity of each wheel. For details, reference may be made to the foregoing, and details are not described herein again. It may be understood that, the first wheel velocity, the second wheel velocity, or the third wheel velocity may alternatively be directly used. However, the current wheel velocity is more accurate than the three wheel velocities, and therefore, the current wheel velocity is preferred. Then, a first wheel velocity difference and a plurality of wheel velocity difference deviations of each wheel are determined based on the current wheel velocity of each wheel. The first wheel velocity difference of each wheel is a difference between the current wheel velocity of each wheel and an average value of current wheel velocities of all other wheels. The wheel velocity difference deviations of each wheel are deviations between the first wheel velocity difference of each wheel and the first wheel velocity differences of the other wheels.

In some embodiments, the central controller 10 is configured to obtain, for a target wheel, an average value of current wheel velocities of wheels other than the target wheel to obtain an average wheel velocity, and obtain a difference between the current wheel velocity of the target wheel and the average wheel velocity to obtain a first wheel velocity difference of the target wheel. The target wheel is any wheel of the vehicle.

Specifically, for the left front wheel, the first wheel velocity difference of the left front wheel=the current wheel velocity of the left front wheel−(the current wheel velocity of the right front wheel+the current wheel velocity of the left rear wheel+the current wheel velocity of the right rear wheel)/3; for the right front wheel, the first wheel velocity difference of the right front wheel=the current wheel velocity of the right front wheel−(the current wheel velocity of the left front wheel+the current wheel velocity of the left rear wheel+the current wheel velocity of the right rear wheel)/3; for the left rear wheel, the first wheel velocity difference of the left rear wheel=the current wheel velocity of the left rear wheel−(the current wheel velocity of the left front wheel+the current wheel velocity of the right front wheel+the current wheel velocity of the right rear wheel)/3; for the right rear wheel, the first wheel velocity difference of the right rear wheel=the current wheel velocity of the right rear wheel−(the current wheel velocity of the left front wheel+the current wheel velocity of the right front wheel+the current wheel velocity of the left rear wheel)/3.

In some embodiments, the central controller 10 is configured to: obtain, for a target wheel, differences between a first wheel velocity difference of the target wheel and first wheel velocity differences of wheels other than the target wheel, to obtain a plurality of wheel velocity difference deviations of the target wheel. The target wheel is any wheel of the vehicle.

Specifically, three wheel velocity difference deviations are included for the left front wheel. The first left front wheel velocity difference deviation=the first wheel velocity difference of the left front wheel−the first wheel velocity difference of the right front wheel. The second left front wheel velocity difference deviation=the first wheel velocity difference of the left front wheel−the first wheel velocity difference of the left rear wheel. The third left front wheel velocity difference deviation=the first wheel velocity difference of the left front wheel−the first wheel velocity difference of the right rear wheel. Three wheel velocity difference deviations are included for the right front wheel. The first right front wheel velocity difference deviation=the first wheel velocity difference of the right front wheel−the first wheel velocity difference of the left front wheel. The second right front wheel velocity difference deviation=the first wheel velocity difference of the right front wheel−the first wheel velocity difference of the left rear wheel. The third right front wheel velocity difference deviation=the first wheel velocity difference of the right front wheel−the first wheel velocity difference of the right rear wheel. Processes of obtaining wheel velocity difference deviations of the left rear wheel and the right rear wheel are the same as processes of obtaining wheel velocity difference deviations of the left front wheel and the right front wheel. Details are not described herein again. It should be noted that the wheel velocity difference deviation is positive or negative.

The central controller 10 may identify, based on the first wheel velocity difference and a plurality of wheel velocity difference deviations of each wheel, whether the vehicle has a tire punctured and a specific wheel that has the tire punctured.

In some embodiments, the central controller 10 is configured to: for a target wheel, determine that the target wheel has the tire punctured when a first wheel velocity difference of the target wheel is greater than a preset wheel velocity difference threshold and lasts for a first preset time threshold, and at least one of a plurality of wheel velocity difference deviations of the target wheel is greater than a preset wheel velocity difference deviation threshold and lasts for a second preset time threshold. The target wheel is any wheel of the vehicle.

For example, for the left front wheel, for example, the first wheel velocity difference and the three left front wheel velocity difference deviations of the left front wheel may be simultaneously determined. When the first wheel velocity difference of the left front wheel is greater than the preset wheel velocity difference threshold and lasts for the first preset time threshold, and one of the three left front wheel velocity difference deviations is greater than the preset wheel velocity difference threshold and lasts for the second preset time threshold, it is considered that the left front wheel has the tire punctured.

For another example, the first wheel velocity difference of the left front wheel may be determined first, and then the three left front wheel velocity difference deviations may be determined when it is determined that the left front wheel is abnormal. Specifically, the first wheel velocity difference of the left front wheel may be determined first. If the first wheel velocity difference of the left front wheel is greater than the preset wheel velocity difference threshold and lasts for the first preset time threshold, it is considered that the left front wheel is abnormal. In this case, the three left front wheel velocity difference deviations are determined. Otherwise, the three left front wheel velocity difference deviations are not determined. When the three left front wheel velocity difference deviations are determined, if one of the three left front wheel velocity difference deviations is greater than the preset wheel velocity difference threshold and lasts for the second preset time threshold, it is considered that the left front wheel has the tire punctured. That is to say, when the first wheel velocity difference of the left front wheel>the first wheel velocity difference of the right front wheel, and |the first wheel velocity difference of the left front wheel−the first wheel velocity difference of the right front wheel|>the preset wheel velocity difference deviation threshold and lasts for the second preset time threshold, or when the first wheel velocity difference of the left front wheel>the first wheel velocity difference of the left rear wheel, and |the first wheel velocity difference of the left front wheel−the first wheel velocity difference of the left rear wheel|>the preset wheel velocity difference deviation threshold and lasts for the second preset time threshold, or when the first wheel velocity difference of the left front wheel>the first wheel velocity difference of the right rear wheel, and |the first wheel velocity difference of the left front wheel−the first wheel velocity difference of the right rear wheel|>the preset wheel velocity difference deviation threshold and lasts for the second preset time threshold, it is considered that the left front wheel has the tire punctured.

It should be noted that The manners of determining the other wheels and the left front wheel are the same, and details are not described herein again.

In this way, by determining whether the wheel velocity and the wheel velocity difference of each wheel are abnormal, whether the vehicle has a tire punctured and a specific wheel that has the tire punctured may be indirectly determined faster compared with the identification manner based on the tire pressure.

In some embodiments, the second data further includes a tire pressure of each wheel, and the central controller 10 is further configured to: identify, based on the first wheel velocity difference, the plurality of wheel velocity difference deviations, and the tire pressure of each wheel, the vehicle tire puncturing scenario and vehicle state information under the vehicle tire puncturing scenario.

Specifically, the central controller 10 may first indirectly identify a vehicle tire puncturing status based on the first wheel velocity difference and a plurality of wheel velocity difference deviations of each wheel in the foregoing manner, and then further confirm the indirectly identified vehicle tire puncturing status based on the tire pressure of each wheel, to improve accuracy of identification of the vehicle tire puncturing status.

In some embodiments, the central controller 10 obtains a difference between the tire pressure of each wheel and a standard tire pressure to obtain a tire pressure difference of each wheel; and identify, based on the first wheel velocity difference, the plurality of wheel velocity difference deviations, the tire pressure, and the tire pressure difference, a vehicle tire puncturing scenario and a vehicle tire puncturing status in the vehicle tire puncturing scenario.

Specifically, for the left front wheel, the tire pressure difference of the left front wheel=the tire pressure of the left front wheel−the standard tire pressure; for the right front wheel, the tire pressure difference of the right front wheel=the tire pressure of the right front wheel−the standard tire pressure; for the left rear wheel, the tire pressure difference of the left rear wheel=the tire pressure of the left rear wheel−the standard tire pressure; for the right rear wheel, the tire pressure difference of the right rear wheel=the tire pressure of the right rear wheel−the standard tire pressure. The central controller 10 may identify, based on the first wheel velocity difference and the plurality of wheel velocity difference deviations of each wheel, the tire pressure, and the tire pressure difference, whether the vehicle has a tire punctured and a specific wheel that has the tire punctured.

In some embodiments, the central controller 10 is configured to: for a target wheel, determine that the target wheel has the tire punctured when a first wheel velocity difference of the target wheel is greater than a preset wheel velocity difference threshold and lasts for a first preset time threshold, and at least one of a plurality of wheel velocity difference deviations of the target wheel is greater than a preset wheel velocity difference deviation threshold and lasts for a second preset time threshold, and a tire pressure of the target wheel is less than the preset tire pressure threshold or a tire pressure difference of the target wheel is greater than the preset tire pressure difference threshold and lasts for a third preset time threshold, and the tire pressure difference of the target wheel is greater than the preset tire pressure difference threshold and lasts for a fourth preset time threshold. The target wheel is any wheel of the vehicle.

For example, for the left front wheel, the first wheel velocity difference and the three left front wheel velocity difference deviations of the left front wheel may be first determined, to preliminarily determine whether the left front wheel has the tire punctured, and then arbitration confirmation is performed based on the tire pressure and the tire pressure difference of the left front wheel when it is preliminarily determined that the left front wheel has the tire punctured. Specifically, when the first wheel velocity difference of the left front wheel is greater than the preset wheel velocity difference threshold and lasts for the first preset time threshold, and one of the three left front wheel velocity difference deviations is greater than the preset wheel velocity difference threshold and lasts for the second preset time threshold, it is preliminarily considered that the left front wheel has the tire punctured. In this case, the tire pressure and the tire pressure difference of the left front wheel are determined; otherwise, the tire pressure and the tire pressure difference of the left front wheel are not determined. Further, when the tire pressure of the left front wheel is less than the preset tire pressure threshold or the tire pressure difference of the left front wheel is greater than the preset tire pressure difference threshold and lasts for the third preset time threshold, and the tire pressure difference of the left front wheel is greater than the preset tire pressure difference threshold and lasts for the fourth preset time threshold, it is determined that the left front wheel has the tire punctured. The manners of determining the other wheels and the left front wheel are the same, and details are not described herein again.

In this way, pre-identification is performed on a possible tire puncturing status by using the wheel velocity, and then arbitration confirmation is performed by using the tire pressure, so that identification of the tire puncturing in two dimensions can be realized, with higher reliability.

After recognizing a vehicle tire puncturing scenario and a tire punctured wheel through the foregoing manner, the central controller 10 may perform, based on the tire punctured wheel, torque allocation on a drive motor corresponding to each wheel to stably control the vehicle.

In some embodiments, the plurality of different functional domains further include a third functional domain 23, and the central controller 10 is further configured to obtain first data of at least one vehicle component in the first functional domain 21, second data of at least one vehicle component in the second functional domain 22, and third data of at least one vehicle component in the third functional domain 23, perform fusion processing on the first data, the second data, and the third data to obtain fused data, and identify the vehicle driving scenario according to the fused data.

For example, the vehicle driving scenario includes one or more of a vehicle tire puncturing scenario, a vehicle floating scenario, and a vehicle anti-skid scenario. The central controller 10 may obtain data related to a to-be-identified vehicle driving scenario from a plurality of functional domains, and then identify a corresponding vehicle driving scenario based on the data. For example, the first data, the second data, and the third data may be obtained from the first functional domain 21, the second functional domain 22, and the third functional domain 23 respectively, and the corresponding vehicle driving scenario is identified based on the first data, the second data, and the third data. The first data represents a vehicle state obtained by the at least one vehicle component in the first functional domain 21, the second data represents a vehicle state obtained by the at least one vehicle component in the second functional domain 22, and the third data represents a vehicle state obtained by the at least one vehicle component in the third functional domain 23. For example, the first functional domain 21 is a power domain, and a first wheel velocity and the like of each wheel may be obtained from the power domain. The second functional domain 22 may be a chassis domain, and a second wheel velocity and the like of each wheel may be obtained from the chassis domain. The third functional domain 23 may be an intelligent driving domain, and a first vehicle velocity may be obtained from the intelligent driving domain. Specifically, the obtained data is related to the to-be-identified vehicle driving scenario.

In some embodiments, the vehicle driving scenario includes a vehicle floating scenario, the second functional domain 22 is a chassis domain, and the third functional domain 23 is an intelligent driving domain, and the central controller 10 is configured to obtain first data of at least one vehicle component in the power domain, second data of at least one vehicle component in the chassis domain, and third data of at least one vehicle component in the intelligent driving domain, perform fusion processing on the first data, the second data, and the third data to obtain fused data, and identify the vehicle floating scenario according to the fused data.

Specifically, the central controller 10 can obtain related data in the power domain, the chassis domain, and the intelligent driving domain, accurately identify a floating scenario of the vehicle based on the related data, and then perform double-closed-loop control on the vehicle in the foregoing manner by fully utilizing the control advantage that the four-motor power architecture can perform independent drive when the vehicle is in the floating state, to achieve floating of the vehicle.

In some embodiments, the first data includes a first wheel velocity of each wheel, the second data includes a second wheel velocity of each wheel, a suspension height of each wheel, first six-degrees-of-freedom inertia information, and a steered wheel rotation angle, the third data includes a first vehicle velocity and a wading depth of each wheel, and the central controller 10 is configured to: fuse the first wheel velocity of each wheel, the second wheel velocity of each wheel, and a third wheel velocity of each wheel for a vehicle component directly connected to the central controller, to obtain a current wheel velocity of each wheel; determine a current vehicle velocity according to the current wheel velocity of each wheel, the first six-degrees-of-freedom inertia information, the steered wheel rotation angle, and the first vehicle velocity; determine a slip state of each wheel based on the current wheel velocity of each wheel and the current vehicle velocity, and determine a suspension load state of each wheel according to the suspension height of each wheel; and determine whether a vehicle is in the vehicle floating scenario according to the slip state, the suspension load state, and the wading depth of each wheel.

It should be noted that The vehicle water-floating scenario may be divided into two types, one type is a vehicle wading scenario, and the other type is a vehicle floating scenario. The vehicle wading scenario means that the vehicle is in a wading state, the vehicle floating scenario means that the vehicle is in a floating state, the wading state refers to a state in which the vehicle still cannot float although the wheels of the vehicle has waded, and the floating state refers to a state in which the vehicle is floating in water. Whether the vehicle is in the wading scenario, that is, the wading state may be determined based on a request from a driver, and whether the vehicle is in the floating scenario, that is, the floating state may be identified according to related data in the power domain, the chassis domain, and the intelligent driving domain.

For example, whether the vehicle is in a floating scenario, that is, a floating state may be determined based on a wading depth, a slipping state, and a suspension load state of each wheel. The slipping state of each wheel may be determined based on a current wheel velocity of each wheel and a current vehicle velocity. It should be noted that for the manner of obtaining the current wheel velocity and the current vehicle velocity, reference may be made to the foregoing. Details are not described herein again. The suspension load state of each wheel may be determined based on a suspension height of each wheel.

There are various manners of determining the slipping state of each wheel. For example, when an absolute value of a difference between a current wheel velocity of a wheel and a current vehicle velocity is greater than a preset slipping threshold, it is considered that the wheel is in the slipping state. There are various manners of determining the suspension load state of each wheel. For example, when an absolute value of a difference between a suspension height of a wheel and a suspension height of an unloaded suspension of the vehicle in a floating state in water is less than a preset suspension height difference threshold, it is considered that the suspension of the wheel is in an unloaded state.

The central controller 10 may determine that the vehicle is in the floating state when the wading depth of each wheel of the vehicle is greater than a vehicle floating threshold, a suspension of each wheel is in the unloaded state, and each wheel is in the slipping state, thereby improving accuracy of determining whether the vehicle is in the floating state.

Alternatively, the central controller 10 may first obtain the wading depth of each wheel, and determine whether the wading depth of each wheel is greater than the vehicle floating threshold. If yes, a suspension height of each wheel is obtained, and whether a suspension of each wheel is in an unloaded state is determined according to the suspension height of each wheel. If yes, whether each wheel is in the slipping state is determined. If yes, it is determined that the vehicle is in the floating state.

In this way, based on a plurality of indicators such as the wading depth, the slipping state, and the suspension load state of each wheel, whether the vehicle is in the floating state is comprehensively determined, which can reduce the risk of misidentification caused by a single determination method, and improve the accuracy of determining whether the vehicle is in the floating state.

As a specific example, a water-floating mode button may be arranged on the vehicle. When receiving a request for entering a water-floating mode and the vehicle satisfies a preset condition, the central controller 10 controls traveling of the vehicle by using a wading traveling control policy, and determines, in the process of controlling traveling of the vehicle by using the wading traveling control policy, whether the vehicle is in a floating state. Specifically, the central controller 10 obtains button state information of the water-floating mode, to determine whether the driver gives a water-floating mode switching request instruction; and if yes, determines, when a current state of the whole vehicle is good and not abnormal, no other function mutually exclusive with a water-floating function is being activated on the whole vehicle, and the water-floating mode is not currently failing, whether a water-floating mode entry condition satisfies a preset condition, for example, whether the current vehicle velocity is less than a threshold or whether a synchronization lock is in an unlocked state. It should be noted that for a vehicle including an engine, before the water-floating mode is activated, a forced engine start request, a carbon canister solenoid valve, and a Diagnostic Module Tank Leakage (DMTL) solenoid valve circuit deactivation request are outputted first, so that the engine system is in a normal working state in advance, to avoid a case that water enters engine-related components to damage the engine.

Then, the water-floating mode is activated, and the water-floating mode is successfully entered. The central controller 10 first controls traveling of the vehicle by using the wading traveling control policy. For example, torques may be allocated to the drive motors corresponding to the wheels of the vehicle by using an equal torque allocation method. Then, in a process of controlling traveling of the vehicle by using the wading traveling control policy, whether the vehicle is in a floating state is determined. For example, if the wading depth of each wheel is greater than the vehicle floating threshold, the suspension of each wheel is in the unloaded state, and each wheel is in the slipping state, it is determined that the vehicle is in the floating state. The central controller 10 sends torque allocation information to the motor controller by using a water-floating traveling control policy. For example, the central controller 10 may allocate torques to the drive motors corresponding to the wheels based on the current yaw rate, the current wheel velocity, and the like of the vehicle. In this way, the floating state and the wading state may be well compatible and distinguished, to adapt to scenario changes of different wading degrees, so that the vehicle has a good capability to travel in water, to fill a void of a drive control policy in the related art. In addition, it is unnecessary to add a power system, and it is only necessary to adopt different drive control policies, thereby facilitating the promotion and application of the floatable vehicle.

In some embodiments, the vehicle driving scenario includes a vehicle anti-slip scenario, the second functional domain 22 is a chassis domain, and the third functional domain 23 is an intelligent driving domain, and the central controller 10 is configured to obtain first data of at least one vehicle component in the power domain, second data of at least one vehicle component in the chassis domain, and third data of at least one vehicle component in the intelligent driving domain, perform fusion processing on the first data, the second data, and the third data to obtain fused data, and determine whether a vehicle is in the vehicle anti-slip scenario according to the fused data.

Specifically, the central controller 10 obtains related data in the power domain, the chassis domain, and the intelligent driving domain, and accurately identifies, based on the related data, whether anti-skid needs to be performed on the vehicle, to fully utilize, during anti-skid, the control advantage that the four-motor power architecture can perform independent drive, to avoid vehicle slipping.

In some embodiments, the first data includes a driving torque of each wheel and a first wheel velocity of each wheel, the second data includes a second wheel velocity of each wheel, first six-degrees-of-freedom inertia information, a steered wheel rotation angle, and a braking depth of a braking pedal, the third data includes a first vehicle velocity, and the central controller 10 is configured to: fuse the first wheel velocity of each wheel, the second wheel velocity of each wheel, and a third wheel velocity of each wheel for a vehicle component directly connected to the central controller 10, to obtain a current wheel velocity of each wheel; determine a current vehicle velocity according to the current wheel velocity of each wheel, the first six-degrees-of-freedom inertia information, the steered wheel rotation angle, and the first vehicle velocity; determine whether the vehicle is in a differential operating condition based on a driving torque of each wheel, and determine whether the vehicle satisfies a condition for anti-skid control intervention based on the braking depth of the braking pedal, the current wheel velocity of each wheel, and the current vehicle velocity; and determine that the vehicle is in the vehicle anti-skid scenario when the vehicle is in the differential operating condition and satisfies the condition for anti-skid control intervention.

Specifically, the central controller 10 may perform anti-skid control on the vehicle when the vehicle is in the differential operating condition and the vehicle satisfies the condition for anti-skid control intervention, to calculate a target torque of a drive motor corresponding to each wheel.

The differential operating condition means that independent torque control and adjustment can be performed on coaxial left and right wheels of the vehicle. For example, independent torque control and adjustment can be performed on a left front wheel and a right front wheel of the vehicle, and independent torque control and adjustment can be performed on a left rear wheel and a right rear wheel of the vehicle. The differential operating condition of the vehicle may be determined based on information related to the vehicle, for example, including but not limited to determining whether the vehicle is currently in the differential operating condition based on a differential function flag of the vehicle, a driving torque of a wheel, and the like.

For example, when the differential function flag of the vehicle is at an activation flag, it is determined that the vehicle is in the differential operating condition. For example, a function option for enabling the differential function may be configured on the vehicle. When the driver enables the differential function based on the function option and determines that the driver has a huge steering demand, the differential function flag is automatically activated, and the activation flag is outputted. When it is determined that the vehicle satisfies a specific condition, for example, including but not limited to, a steering wheel rotation angle, a gear position, a vehicle velocity, and the like satisfy a specific condition (for example, the steering wheel rotation angle is greater than a specific angle, the gear position is a D gear, and the current vehicle velocity is less than a specific vehicle velocity), it is determined that the driver has a huge steering demand.

For example, when the driving torques of the wheels satisfy a specific condition, it is determined that the vehicle is currently in the differential operating condition. For example, the central controller 10 obtains an absolute value of a first difference between the driving torque of the left front wheel and the driving torque of the right front wheel, and obtains an absolute value of a second difference between the driving torque of the left rear wheel and the driving torque of the right rear wheel; and determines that the vehicle is in the differential operating condition when the absolute value of the first difference is greater than a preset torque threshold and/or the absolute value of the second difference is greater than the preset torque threshold.

In this way, by determining whether the vehicle is in the differential operating condition, the differential states of the vehicle can be classified, to formulate different driving anti-skid control policies, which can help avoid a case that the vehicle slips and improve the safety and reliability of the vehicle. In addition, by determining whether the vehicle is in the differential operating condition based on the actual driving torque of each wheel, whether the vehicle is currently in the differential operating condition can be accurately determined.

When determining that the vehicle is in the differential operating condition, the central controller 10 further determines whether the vehicle satisfies the condition for anti-skid control intervention. For example, the central controller 10 may determine whether the vehicle has a slipping wheel, and if yes, determine that the vehicle satisfies the condition for anti-skid control intervention.

For example, when it is determined that the vehicle is currently in the differential operating condition, a slipping state of each wheel may be independently determined. According to slipping states of the wheels, whether the current vehicle is currently requiring anti-skid control intervention is determined. If slipping occurs in a wheel, that is, any one of the four wheels of the vehicle is slipping, it is determined that the vehicle satisfies the condition for anti-skid control intervention, that is, the vehicle requires anti-skid control intervention.

In some embodiments, the central controller 10 is configured to determine, when determining that a braking depth of a braking pedal is less than a preset braking depth threshold, whether any wheel satisfies a first preset condition in N consecutive cycles, where N is an integer greater than 2; and if yes, determine that the corresponding wheel is slipping; otherwise, determine that the corresponding wheel is not slipping.

Specifically, when whether the vehicle has a slipping wheel is determined, whether the vehicle is in an inactive braking state is first determined. For example, whether the vehicle is in the inactive braking state may be determined according to a magnitude relationship between the braking depth of the braking pedal and the preset braking depth threshold. When the braking depth is less than the preset braking depth threshold, it is considered that the vehicle is in the inactive braking state. When the braking depth is greater than or equal to the preset braking depth threshold, it is considered that the vehicle is in an active braking state. When the vehicle is in the inactive braking state, it is determined, according to whether any wheel satisfies the first preset condition in N consecutive cycles, whether the corresponding wheel is slipping.

In some embodiments, the central controller 10 is configured to: obtain an absolute value of a third difference between a current wheel velocity of the wheel and a current vehicle velocity, and obtain an absolute value of a fourth difference between a wheel acceleration of the wheel and a longitudinal acceleration of the vehicle; and determine that the wheel satisfies the first preset condition when the absolute value of the third difference is greater than a preset wheel velocity difference threshold and/or the absolute value of the fourth difference is greater than a preset wheel acceleration difference threshold.

It should be noted that The current wheel velocity and the current vehicle velocity are determined in the foregoing manner. Details are not described herein again.

When whether a wheel satisfies the first preset condition is determined, for example, taking the left front wheel as an example, the current wheel velocity of the left front wheel is denoted as $u_{lf}$, the current vehicle velocity is denoted as $V_x$, the wheel acceleration of the left front wheel is denoted as $$u'_{lf},$$

the longitudinal acceleration of the vehicle is denoted as $a_x$, the wheel velocity difference threshold is denoted as Δu, the wheel acceleration difference threshold is denoted as Aa, an absolute value of a third difference between the current wheel velocity of the left front wheel and the current vehicle velocity is denoted as $\Delta T_3=|u_{lf}-V_x|$, and an absolute value of a fourth difference between the wheel acceleration of the left front wheel and the longitudinal acceleration of the vehicle is denoted as $$\Delta T_4 = |u'_{lf} - a_x|.$$

When $\Delta T_3$ is greater than Δu, and/or $\Delta T_4$ is greater than Δa, it is determined that the left front wheel satisfies the first preset condition. In other words, it is determined that the left front wheel satisfies the first preset condition when either of the following two conditions is satisfied:

$$\begin{cases} |u_{lf} - V_x| > \Delta u * K_1 \\ |u'_{lf} - a_x| > \Delta a * K_2 \end{cases}$$

where $K_1$ is a correction coefficient of the preset wheel velocity difference threshold, and may be obtained by looking up a table based on the vehicle velocity, and $K_2$ is a correction coefficient of the preset wheel acceleration difference threshold, and may be obtained by looking up a table based on the longitudinal acceleration of the vehicle.

In this way, by setting thresholds for the absolute value of the difference between the wheel velocity of the wheel and the vehicle velocity and the absolute value of the difference between the wheel acceleration of the wheel and the longitudinal acceleration of the vehicle, it can be ensured that both forward and reverse wheel slipping can be identified, thereby improving the identification rate of forward and reverse wheel slipping.

When it is determined that the vehicle is currently in the differential operating condition and the vehicle satisfies the condition for anti-skid control intervention, the central controller 10 performs anti-skid control on the vehicle, and calculates a target torque of a drive motor corresponding to each wheel after the anti-skid control intervention, so that torque adjustment is performed on each wheel according to the target torque of the drive motor corresponding to each wheel, thereby preventing a slipping situation of the vehicle or suppressing a wheel slipping situation, to disengage from the slipping situation as soon as possible, and avoid a high-velocity wheel slipping phenomenon of the vehicle, which helps improve reliability and safety of the vehicle, and user experience.

In conclusion, the vehicle control system in this embodiment of the present disclosure is a safety control system architecture that has a power domain for main execution in which a four-motor power architecture dominates, a chassis domain for auxiliary execution, an intelligent driving domain for main environmental perception, a central controller for information fusion, and a main decision-making system, and has sensing information shared. Based on the architecture, the central controller performs perceptual fusion on the data of the plurality of functional domains, so that the vehicle state data, the ground state data, and the like with predictability can be accurately obtained. In combination with the execution capability of the four-motor power architecture, and the like, the steering control, the yaw control, the longitudinal control, and the preview control of the vehicle can be quickly implemented, thereby achieving extreme safety of the vehicle.

In an embodiment of the present disclosure, a vehicle is further provided.

Figure 15:
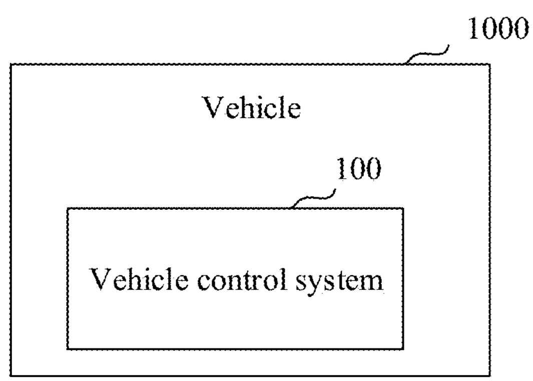
FIG. 15 is a schematic structural diagram of a vehicle according to an embodiment of the present disclosure.

Referring to FIG. 15, a vehicle 1000 includes the foregoing vehicle control system 100. The vehicle 1000 may be a pure electric vehicle, a hybrid vehicle, or the like, which is not specifically limited herein.

Figure 16:
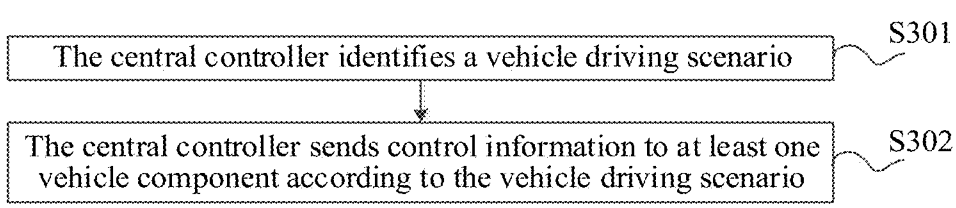
FIG. 16 is a schematic flowchart of a vehicle control method according to an embodiment of the present disclosure.

In an embodiment of the present disclosure, a vehicle control method is further provided, and is applied to the foregoing vehicle control system. Referring to FIG. 16, the vehicle control method includes:

S301: The central controller identifies a vehicle driving scenario.

S302: The central controller sends control information to at least one vehicle component according to the vehicle driving scenario.

It should be noted that the foregoing explanatory descriptions of the embodiments of the vehicle control system and the beneficial effects also apply to the vehicle and the vehicle control method in the embodiments of the present disclosure. To avoid redundancy, details are not described herein.

It should be noted that The logic and/or steps shown in the flowcharts or described in any other manner herein, for example, a sequenced list that may be considered as executable instructions configured for implementing logical functions, may be specifically implemented in any computer-readable medium to be used by an instruction execution system, apparatus, or device (for example, a computer-based system, a system including a processor, or another system that can obtain an instruction from the instruction execution system, apparatus, or device and execute the instruction) or to be used by combining such instruction execution systems, apparatuses, or devices. In the context of this specification, a "computer-readable medium" may be any apparatus that can include, store, communicate, propagate, or transmit the program for use by the instruction execution system, apparatus, or device or in combination with the instruction execution system, apparatus, or device. More specific examples (a non-exhaustive list) of the computer-readable medium include the following: an electrical connection (electronic apparatus) having one or more wires, a portable computer diskette (magnetic apparatus), a random access memory (RAM), a read-only memory (ROM), an erasable programmable read-only memory (EPROM or flash memory), an optical fiber apparatus, and a portable compact disk read-only memory (CDROM). In addition, the computer-readable medium can even be paper or other suitable media on which the program can be printed, because the program can be obtained electronically by, for example, optically scanning paper or other media, then editing, interpreting, or processing in other suitable ways if necessary, and then storing it in a computer memory.

It should be understood that, parts of the present disclosure can be implemented by using hardware, software, firmware, or a combination thereof. In the foregoing implementations, a plurality of steps or methods may be implemented by using software or firmware that are stored in a memory and are executed by a proper instruction execution system. For example, if being implemented by hardware, like another implementation, the plurality of steps or methods may be implemented by any one of following common technologies in the art or a combination thereof: a discrete logic circuit of a logic gate circuit for realizing a logic function for a data signal, an application specific integrated circuit having a suitable combined logic gate circuit, a programmable gate array (PGA), and a field programmable gate array (FPGA).

In the description of this specification, the description of the reference terms such as "an embodiment", "some embodiments", "exemplary embodiments", "example", "specific example", or "some examples" means that the specific features, structures, materials or characteristics described with reference to the embodiment or example are included in at least one embodiment or example of the present disclosure. In this specification, schematic descriptions of the foregoing terms do not necessarily refer to the same embodiment or example. Moreover, the specific features, structures, materials, or characteristics described may be combined in any one or more embodiments or examples in an appropriate manner.

In addition, the terms "first" and "second" are used merely for the purpose of description, and shall not be construed as indicating or implying relative importance or implying a number of indicated technical features. Therefore, a feature restricted by "first" or "second" may explicitly indicate or implicitly include at least one of such features. In the descriptions of the present disclosure, unless explicitly specified, "multiple" means at least two, for example, two or three.

In the present disclosure, it should be noted that unless otherwise clearly specified and limited, the terms "mounted", "connected", "connection", and "fixed" should be understood in a broad sense. For example, a connection may be a fixed connection, a detachable connection, or an integral connection; may be a mechanical connection or an electrical connection; may be a direct connection or an indirect connection through an intermediate medium; or may be internal communication between two elements or interaction relationship between two elements, unless otherwise clearly limited. Persons of ordinary skill in the art may understand the specific meanings of the foregoing terms in the present disclosure according to specific situations.

Although the embodiments of the present disclosure have been shown and described above, it can be understood that, the foregoing embodiments are exemplary and should not be understood as limitation to the present disclosure. A person of ordinary skill in the art can make changes, modifications, replacements, or variations to the foregoing embodiments within the scope of the present disclosure.

What is claimed is:

1. A vehicle control system, comprising: a central controller and a plurality of vehicle components,
- the plurality of vehicle components belonging to a plurality of different functional domains;
- at least one vehicle component in a first functional domain of the plurality of different functional domains and another vehicle component in the first functional domain being connected to each other through a first network and being directly connected to the central controller;

at least one vehicle component in a second functional domain of the plurality of different functional domains and another vehicle component in the second functional domain being connected to each other through a second network and being directly connected to the central controller;

at least one vehicle component in the first functional domain being connected to at least one vehicle component in the second functional domain through a third network; and the central controller being configured to send control information to at least one vehicle component, wherein at least one vehicle component in the first functional domain is configured to send a control instruction to at least one vehicle component in the second functional domain when the central controller fails.

2. The vehicle control system according to claim 1, wherein the first functional domain is an intelligent driving domain, the second functional domain is a power domain, and when the central controller fails, an intelligent driving controller in the intelligent driving domain sends a deceleration control instruction and/or a differential control instruction to a drive assembly in the power domain, to perform braking control and/or steering control on a vehicle, the drive assembly comprising a motor controller and a plurality of drive motors that are arranged in a one-to-one correspondence with wheels and that independently drive the wheels.

3. The vehicle control system according to claim 2, wherein the motor controller determines a reverse torque of the drive motor in response to the deceleration control instruction, and controls the drive motor according to the reverse torque, to perform braking control on the vehicle; and/or determines a reverse torque or a forward torque of the drive motor in response to the differential control instruction, and controls the drive motor according to the reverse torque or the forward torque, to perform steering control on the vehicle.

4. The vehicle control system according to claim 1, wherein the first functional domain is an intelligent driving domain, and the second functional domain is a chassis domain, and when the central controller fails, an intelligent driving controller in the intelligent driving domain sends a deceleration control instruction and/or a differential control instruction to a braking system and a steering system in the chassis domain, to perform braking control and/or steering control on a vehicle.

5. The vehicle control system according to claim 1, wherein the first functional domain is a power domain, the second functional domain is a chassis domain, and when the central controller fails, a drive assembly in the power domain sends a deceleration control instruction and/or a differential control instruction to a braking system and a steering system in the chassis domain, to perform braking control and/or steering control on a vehicle, the drive assembly comprising a motor controller and a plurality of drive motors that are arranged in a one-to-one correspondence with wheels and that independently drive the wheels.

6. The vehicle control system according to claim 1, wherein the first functional domain is a chassis domain, the second functional domain is a power domain, and when the central controller fails, a steering system and/or a braking system in the chassis domain sends a deceleration control instruction and/or a differential control instruction to a drive assembly in the power domain, to perform braking control and/or steering control on a vehicle, the drive assembly comprising a motor controller and a plurality of drive motors that are arranged in a one-to-one correspondence with wheels and that independently drive the wheels.

7. The vehicle control system according to claim 1, wherein the control information comprises first control information and/or second control information, the first control information being configured for instructing the vehicle component to perform a corresponding action, and the second control information being configured for instructing the vehicle component to feed back data information to the central controller.

8. The vehicle control system according to claim 1, wherein the central controller is further configured to implement data inter-transmission between different functional domains.

9. The vehicle control system according to claim 1, wherein the first functional domain is a chassis domain, the second functional domain is a power domain, and the central controller is configured to send, when a braking system and/or a steering system in the chassis domain fails, a deceleration control instruction and/or a differential control instruction to a drive assembly in the power domain, to perform braking control and/or steering control on a vehicle, wherein the drive assembly comprises a motor controller and a plurality of drive motors that are arranged in a one-to-one correspondence with wheels and that independently drive the wheels.

10. The vehicle control system according to claim 1, wherein the plurality of vehicle components comprise one or more of a drive assembly, a braking system, a steering system, an inertial measurement unit, an intelligent driving controller, a steering wheel rotation angle sensor, a wheel velocity sensor, a camera, and a radar.

11. A vehicle control system, comprising: a central controller and a plurality of vehicle components, the plurality of vehicle components belonging to a plurality of different functional domains;

at least one vehicle component in a first functional domain of the plurality of different functional domains and another vehicle component in the first functional domain being connected to each other through a first network and being directly connected to the central controller;

at least one vehicle component in a second functional domain of the plurality of different functional domains and another vehicle component in the second functional domain being connected to each other through a second network and being directly connected to the central controller;

at least one vehicle component in the first functional domain being connected to at least one vehicle component in the second functional domain through a third network; and the central controller being configured to send control information to at least one vehicle component, wherein the central controller is further configured to obtain first data of at least one component in the first functional domain and second data of at least one component in the second functional domain, perform fusion processing on the first data and the second data according to a current state and/or a target state of a vehicle, and send first control information to the vehicle component based on the fusion processed data, the first control information being adapted to indicate that steering control, transverse control, longitudinal control, or height direction control is performed on the vehicle.

12. The vehicle control system according to claim 11, wherein the first data represents performance of at least one component in the first functional domain, and the second data represents performance of at least one component in the second functional domain.

13. The vehicle control system according to claim 12, wherein the first functional domain is a power domain, the power domain comprises a drive assembly, the drive assembly comprises a motor controller and a plurality of drive motors that are arranged in a one-to-one correspondence with wheels and that independently drive the wheels, the second functional domain is a chassis domain, the chassis domain comprises a braking system and a steering system, the first data comprises drive capability data of the drive assembly in the power domain, the second data comprises braking capability data of the braking system, steering capability data of the steering system, and a suspension damping characteristic of a suspension system in the chassis domain, and the central controller is configured to perform fusion processing on the first data and the second data according to the current state and/or the target state of the vehicle, and send the first control information to the vehicle component based on the fusion processed data, the first control information comprising steering fusion control information, yaw fusion control information, longitudinal fusion control information, and suspension height control information.

14. The vehicle control system according to claim 13, wherein the central controller is configured to perform fusion processing on the first data and the second data according to a current vehicle velocity and a target turning radius, and send the steering fusion control information to the vehicle component based on fusion processed data.

15. The vehicle control system according to claim 14, wherein the central controller is configured to:

send, when the current vehicle velocity is in a first vehicle velocity interval and the target turning radius is in a first turning radius interval, the steering fusion control information to the steering system based on the steering capability data of the steering system, to implement steering control;

send, when the current vehicle velocity is in a second vehicle velocity interval and the target turning radius is in a second turning radius interval, the steering fusion control information to the steering system, the drive assembly, and the suspension system based on the steering capability data of the steering system, the drive capability data of the drive assembly, and the suspension damping characteristic of the suspension system, to implement differential steering control;

send, when the current vehicle velocity is in a third vehicle velocity interval and the target turning radius is in a third turning radius interval, the steering fusion control information to the steering system and the drive assembly based on the steering capability data of the steering system and the drive capability data of the drive assembly, to implement differential steering control at a steering wheel limit rotation angle; and send, when the current vehicle velocity is in a fourth vehicle velocity interval and the target turning radius is in a fourth turning radius interval, the steering fusion control information to the drive assembly based on the drive capability data of the drive assembly, to implement differential steering control at a steering wheel zero rotation angle;

wherein a vehicle velocity in the first vehicle velocity interval>a vehicle velocity in the second vehicle velocity interval>a vehicle velocity in the third vehicle velocity interval>a vehicle velocity in the fourth vehicle velocity interval, and a turning radius in the first turning radius interval>a turning radius in the second turning radius interval>a turning radius in the third turning radius interval>a turning radius in the fourth turning radius interval.

16. The vehicle control system according to claim 15, wherein when the current vehicle velocity is zero and the target turning radius is zero, the steering fusion control information comprises a reverse torque of a drive motor corresponding to an inner steered wheel and a forward torque of a drive motor corresponding to an outer steered wheel, to implement in-place U-turn control at the steering wheel zero rotation angle.

17. The vehicle control system according to claim 13, wherein the central controller is further configured to perform fusion processing on the first data and the second data according to a target yaw torque and a target yaw torque change rate, and send the yaw fusion control information to the vehicle component based on the fusion processed data.

18. The vehicle control system according to claim 17, wherein the central controller is configured to:

send, when the target yaw torque is less than a preset yaw torque, the yaw fusion control information to the drive assembly based on the drive capability data of the drive assembly, to implement yaw control;

send, when the target yaw torque is greater than or equal to the preset yaw torque and the target yaw torque change rate is greater than a preset yaw torque change rate, the yaw fusion control information to the drive assembly based on the drive capability data of the drive assembly, to implement yaw control; and send, when the target yaw torque is greater than or equal to the preset yaw torque and the target yaw torque change rate is less than or equal to the preset yaw torque change rate, the yaw fusion control information to the braking system based on the braking capability data of the braking system, to implement yaw control.

19. The vehicle control system according to claim 13, wherein the central controller is further configured to perform fusion processing on the first data and the second data according to a target longitudinal torque and a target longitudinal torque change rate, and send the longitudinal fusion control information to the vehicle component based on the fusion processed data.

20. The vehicle control system according to claim 19, wherein the central controller is configured to:

send, when the target longitudinal torque is a positive torque, the longitudinal fusion control information to the drive assembly based on the drive capability data of the drive assembly, to implement longitudinal control;

send, when the target longitudinal torque is a negative torque and the target longitudinal torque change rate is greater than a preset longitudinal torque change rate, the longitudinal fusion control information to the drive assembly based on the drive capability data of the drive assembly, to implement longitudinal control; and send, when the target longitudinal torque is a negative torque and the target longitudinal torque change rate is less than or equal to the preset longitudinal torque change rate, the longitudinal fusion control information to the braking system based on the braking capability data of the braking system, to implement longitudinal control.

21. A vehicle control method for a vehicle control system having a central controller and a plurality of vehicle components, the plurality of vehicle components belonging to a plurality of different functional domains; at least one vehicle component in a first functional domain of the plurality of different functional domains and another vehicle component in the first functional domain being connected to each other through a first network and being directly connected to the central controller; at least one vehicle component in a second functional domain of the plurality of different functional domains and another vehicle component in the second functional domain being connected to each other through a second network and being directly connected to the central controller; at least one vehicle component in the first functional domain being connected to at least one vehicle component in the second functional domain through a third network; and the central controller being configured to send control information to at least one vehicle component, wherein at least one vehicle component in the first functional domain is configured to send a control instruction to at least one vehicle component in the second functional domain when the central controller fails, the vehicle control method comprising:

identifying, by the central controller, a vehicle driving scenario; and sending, by the central controller, control information to at least one vehicle component according to the vehicle driving scenario.

* * * * *